(12) United States Patent (10) Patent No.: US 8,374,500 B2
Matsukawa et al. (45) Date of Patent: Feb. 12, 2013

(54) SONET/SDH TRANSMISSION APPARATUS

(75) Inventors: Yoshinobu Matsukawa, Kawasaki (JP); Hiroshi Yoshida, Fukuoka (JP); Yasuhiro Fuchi, Fukuoka (JP); Takaaki Itose, Fukuoka (JP); Masanori Eiro, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 12/791,343

(22) Filed: Jun. 1, 2010

(65) Prior Publication Data
US 2010/0303456 A1 Dec. 2, 2010

Related U.S. Application Data

(63) Continuation of application No. PCT/JP2007/073218, filed on Nov. 30, 2007.

(51) Int. Cl.
*G02F 1/00* (2006.01)

(52) U.S. Cl. ............. 398/8; 398/12; 398/19; 370/406; 370/419

(58) Field of Classification Search ............. 398/3, 4, 398/5, 6, 7, 12, 19; 370/257, 258, 380, 386, 370/396, 400, 404, 405, 406, 419
See application file for complete search history.

(56) References Cited

U.S. PATENT DOCUMENTS

| 6,850,660 | B2 * | 2/2005 | Notani | 385/16 |
| 7,443,843 | B2 * | 10/2008 | Matsuo et al. | 370/386 |
| 7,447,429 | B2 * | 11/2008 | Yamaguchi et al. | 398/4 |
| 7,606,224 | B2 * | 10/2009 | Notani et al. | 370/386 |
| 7,953,323 | B2 * | 5/2011 | Zarris | 398/47 |

FOREIGN PATENT DOCUMENTS

| JP | 9-274044 | 10/1997 |
| JP | 2001-238279 | 8/2001 |
| JP | 2001-309409 | 11/2001 |

OTHER PUBLICATIONS

International Search Report, mailed Jan. 22, 2008, in corresponding PCT Application No. PCT/JP2007/073218 (1 pg.).

* cited by examiner

*Primary Examiner* — M. R. Sedighian
(74) *Attorney, Agent, or Firm* — Staas & Halsey LLP

(57) ABSTRACT

A SONET/SDH transmission apparatus comprises a plurality of interface units that accommodate a plurality of lines, and mesh wiring that interconnects the interface units in a mesh pattern. Each of the interface units includes a time slot interchange (TSI) unit to output a signal selected from among a plurality of signals through the TSI processing of a plurality of signals on the lines accommodated at all the interface units, a detection unit to detect alarm information on the lines accommodated at all the interface units, and a control unit to provide the TSI unit with control data reflecting protective switching operation calculated by computation of a logic circuit which virtually executes the protective switching operation to be as for the plurality of lines.

11 Claims, 39 Drawing Sheets

SONET/SDH TRANSMISSION APPARATUS

CROSS-REFERENCE TO RELATED APPLICATION

This is a continuation of Application PCT/JP2007/073218, filed on Nov. 30, 2007, now pending, the entire contents of which are incorporated herein by reference.

FIELD

The present invention relates to a transmission apparatus that uses Synchronous Optical Network (SONET) or Synchronous Digital Hierarchy (SDH).

BACKGROUND

Recently, an increasing number of transmission systems and networks take a form in which a WDM or other types of large-capacity transmission system is merged with a transmission apparatus that accommodates many different data services.

Among those transmission systems and networks, devices that use a SONET/SDH transmission method (hereinafter, simply referred to as SONET) are in great demand. This is because an existing SONET transmission apparatus is often utilized in building a transmission system or a network. Another reason is that a protection switch function defined by GR-253, GR 1230, GR 1400, and the like which are standards in SONET is an excellent function indispensable for providing a high quality of service.

A large-scale circuit controlled by a complicated method is necessary to equip a SONET transmission apparatus with the SONET protection switch function. The SONET protection switch function has therefore been implemented by an integrated switch function unit in most cases.

FIG. 40 is a diagram illustrating a configuration example of a SONET/SDH transmission apparatus, which implements a SONET protection method that uses an integrated Time Slot Interchange (TSI) function.

As illustrated in FIG. 40, a SONET transmission apparatus 1 includes a plurality of interface units (hereinafter, also referred to as INF units) 2 that accommodate signals from customers (users), and an integrated TSI/SW control unit 3 connected to the plurality of INF units 2 to perform SONET protection switching.

The INF units 2 each include an optical reception unit 21 that receives an optical signal (main signal) from an optical transmission path (optical fiber), and a framer demultiplexing unit (framer DMUX) 22 connected to the optical reception unit 21. A main signal output from the framer DMUX 22 is sent to the integrated TSI/SW control unit. Each INF unit 2 also includes a framer multiplexing unit (framer MUX) 23 to which a main signal from the integrated TSI/SW controller 3 is input, and an optical transmission unit 24 that sends a main signal to an optical transmission path (optical fiber).

The integrated TSI/SW control unit 3 includes an integrated TSI unit 3A and an integrated switch control unit (integrated SW controller: SW CONT) 3B. The integrated TSI unit 3A includes a reception-side SONET line switch unit (SONET LINE SW) 32 that is connected to the framer DMUX 22 and implements a line switching function, an STS reception pointer unit (STS reception PTR unit) 33 that detects a reception pointer of an STS signal in a main signal on a Synchronous Transport Signal (STS) basis, an STS transmission pointer unit (STS transmission PTR unit) 34 that detects a transmission pointer of a signal on an STS basis, and a transmission-side SONET line switch unit 35. Those SONET line switch unit 32, STS reception pointer unit 33, STS transmission pointer unit 34, and SONET line switch unit 35 are provided for each INF unit 2.

The integrated TSI unit 3A also includes an STS TSI unit 31 (TSI unit 31) to which a plurality of the STS reception pointer units 33 and a plurality of the STS transmission pointer units 34 are connected. The STS TSI unit 31 executes TSI processing (interchanging (sorting) time slots), to thereby perform path switching operation on an STS basis. In other words, the TSI unit 31 performs processing of connecting a signal from each input port to a given output port. Output signals of the TSI unit 31 are connected to the STS transmission PTR units 34.

The integrated SW control unit 3B includes a SW controller 36 that controls the operation of the SONET line switch units 32 and 35, a path alarm overhead processing unit (path ALM OH processor) 37 that performs processing relevant to a path alarm (path alert) detected by the STS reception PTR units 33 and the STS transmission PTR units 34, a TSI controller 39 that controls the TSI processing in the TSI unit 31, and a path switch (path SW) control unit 39 that controls the path switching operation executed by the TSI unit 31.

The SONET transmission apparatus 1 further includes a monitoring controller 41 that monitors the operation of the INF units 2 and integrated TSI/SW control unit 3 described above as an operation monitoring function that targets those components, and a line alarm overhead (line ALM OH) processing unit 42 that corresponds to the framer demultiplexing unit 22 and the framer multiplexing unit 23 in each INF unit 2 and detects a line alarm (line alert).

With the SONET transmission apparatus 1, the number of INF units 2 accommodated that can be mounted in the SONET transmission apparatus 1 (the number of lines accommodated) can be increased by downsizing the INF units 2. Also, line switching and path switching that have a high degree of freedom can be supported by centralizing functions relevant to line switching and path layer switching in the integrated TSI/SW control unit 3.

Patent Document 1: JP 2001-238279 A
Patent Document 2: JP 9-274044 A

In the SONET transmission apparatus illustrated in FIG. 40, the SONET line switch unit (SONET LINE SW) 32 handles high-speed signals. In addition, the SONET transmission apparatus is required to implement a SONET protection switch function that depends on its apparatus configuration. The integrated TSI unit 3A is required for those reasons to be implemented by a dedicated Application Specific Integrated Circuit (ASIC) that depends on the apparatus configuration. The integrated SW control unit 3B, on the other hand, is required to exert switching control on all the INF units 2. The integrated SW control unit 3B which performs this switching control is implemented by a Field Programmable Gate Array (FPGA).

Those can cause an increase in power consumption of the SONET transmission apparatus 1. Also, taking heat generated by the integrated TSI/SW control unit 3 into account may limit the apparatus configuration and where to install the apparatus.

In the SONET transmission apparatus 1, the integrated SW control unit 3B executes switching control of all the INF units 2 and accordingly has a large-scale circuit configuration. The large-scale integrated SW control unit 3B is employed irrespective of the number of accommodated lines of the SONET transmission apparatus 1 (the number of the INF units 2 mounted). When a customer desires a SONET transmission apparatus where the number of lines accommodated is small, this makes the cost of building the SONET transmission apparatus higher than strictly necessary.

Also, SONET protection switching (the integrated TSI unit) is implemented by a dedicated ASIC as mentioned above. This makes it difficult to flexibly deal with a change brought about by adding a function to the integrated TSI unit or enhancing the integrated TSI unit. Adding a function may require developing a new ASIC.

Further, in integrated switch control as the one illustrated in FIG. 40, alarm information about every unit in the SONET transmission apparatus is required to be collected and monitored as alarm information necessary for switch control. The processing scale of this type of collection and monitoring increases in proportion to the number of lines accommodated. Accordingly, implementing a function of collecting and monitoring alarm information may require large-scale ASIC development.

SUMMARY

A SONET/SDH transmission apparatus includes:
a plurality of interface units that accommodate a plurality of lines; and
mesh wiring that interconnects the plurality of interface units in a mesh pattern in order to allow the plurality of interface units to distribute, to one another, signals on the plurality of lines accommodated by each of the plurality of interface units and information about protection switch operation that is obtained in each of the plurality of interface units, and
the plurality of interface units each include:
a transmission unit that sends a signal and information to the mesh wiring;
a reception unit that receives a signal and information from the mesh wiring;
a time slot interchange unit to which signals on a plurality of lines accommodated by the own interface unit and signals on a plurality of lines accommodated by all the other interface units which are received by the reception unit via the mesh wiring are input, and which can output a signal selected from among the plurality of signals through time slot interchange processing performed on a plurality of the input signals;
a detection unit that detects alert information about the plurality of lines accommodated by the own interface unit and alert information about the plurality of lines accommodated by all the other interface units which is received by the reception unit through the mesh wiring; and
a control unit including a logic circuit that virtually executes protection switch operation to be executed based on the alert information detected by the detection unit with respect to the plurality of lines accommodated by the own interface unit to generate control data of the time slot interchange unit which reflects the protection switch operation and is obtained through calculation by the logic circuit and supply the generated control data to the time slot interchange unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates an example of assigning TOH, which is a free area in a case where a SONET/SDH OC 48 format (2.4 G) is used as a signal in a BWB, as a storage area of VSSC data link information.

DESCRIPTION OF EMBODIMENTS

Embodiment of the present invention is described below with reference to the drawings. A configuration of the following embodiment is given as an example, and the present invention is not limited to the configuration of the embodiment.

[Outline of Embodiment]

Figure 40:
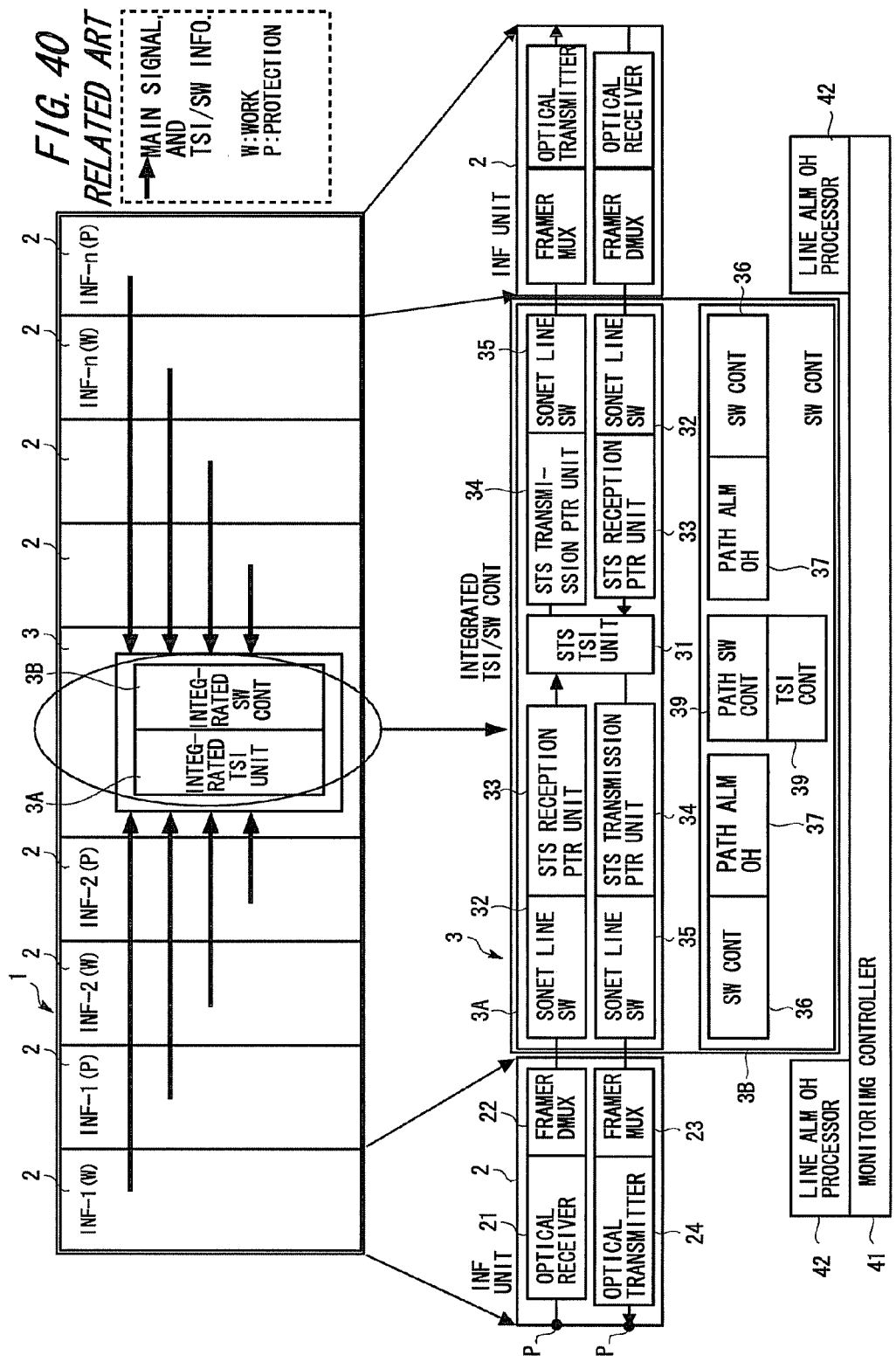
FIG. 40 is a diagram illustrating a configuration example of a SONET transmission apparatus.

Problems of a SONET/SDH transmission apparatus (hereinafter referred to as SONET transmission apparatus) that includes an integrated TSI/SW control unit as illustrated in FIG. 40 are as follows.

(Problem 1) Limitations in where to install due to increased power consumption of the integrated TSI/SW control unit and heat generated by the integrated TSI/SW control unit.

(Problem 2) High cost for the initial introduction of the SONET transmission apparatus irrespective of the number of lines accommodated, due to the integrated TSI/SW control unit being expensive.

(Problem 3) Difficulties in flexibly dealing with the addition of a function to the integrated TSI/SW control unit or other changes to the integrated TSI/SW control unit.

(Problem 4) Large-scale ASIC development required to centralize a function of collecting and monitoring alarm information.

A SONET/SDH transmission apparatus according to the embodiment has the following configuration in order to solve the above-mentioned problems.

Figure 1:
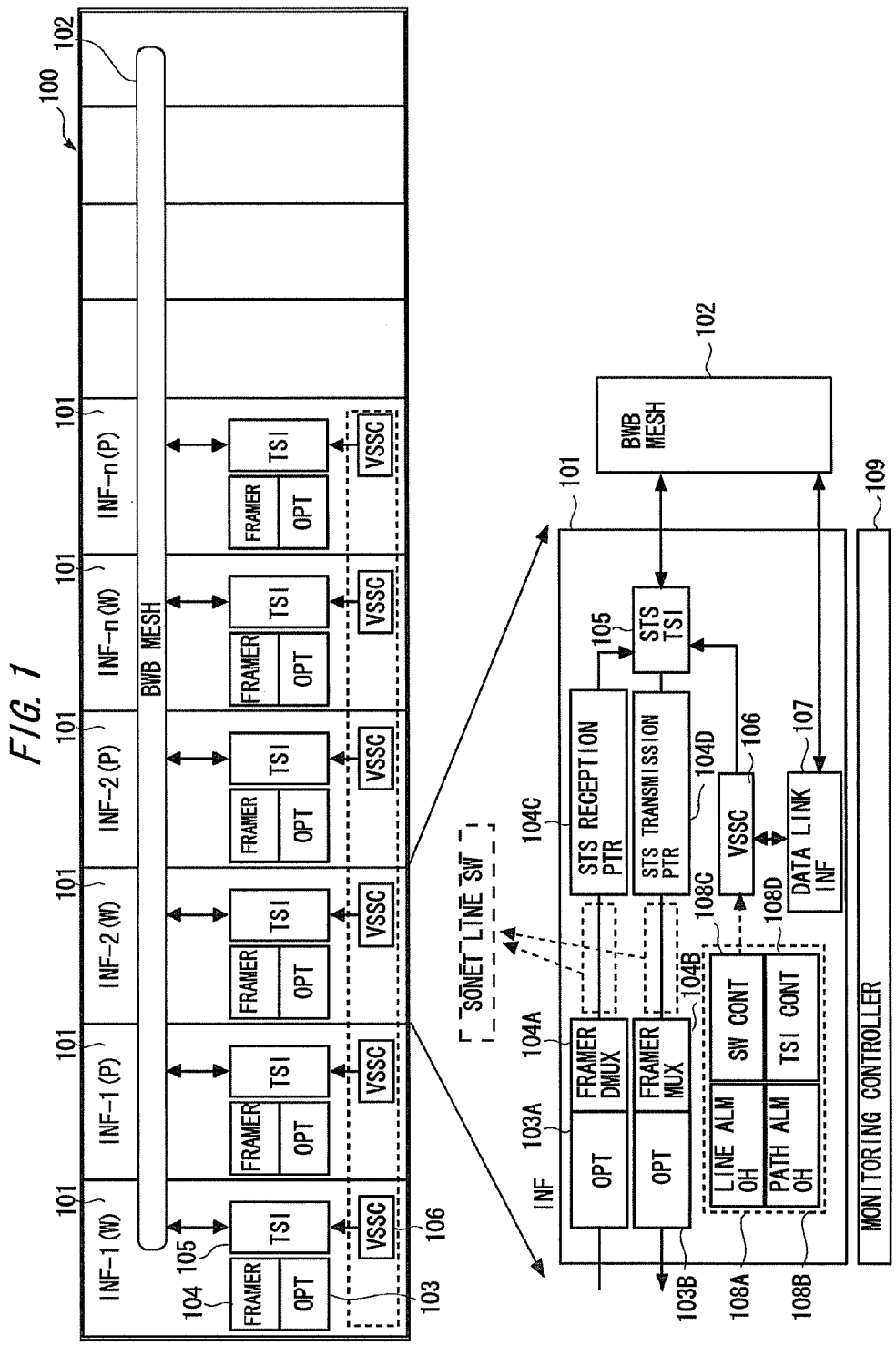
FIG. 1 illustrates a configuration example of a SONET/SDH transmission apparatus according to an embodiment.

FIG. 1 illustrates a configuration example of the SONET/SDH transmission apparatus according to the embodiment. In FIG. 1, a SONET transmission apparatus 100 according to the embodiment includes a plurality of INF units 101, which are all interconnected in a mesh pattern by a back wiring board (BWB) 102 (interconnected by BWB mesh).

Figure 2:
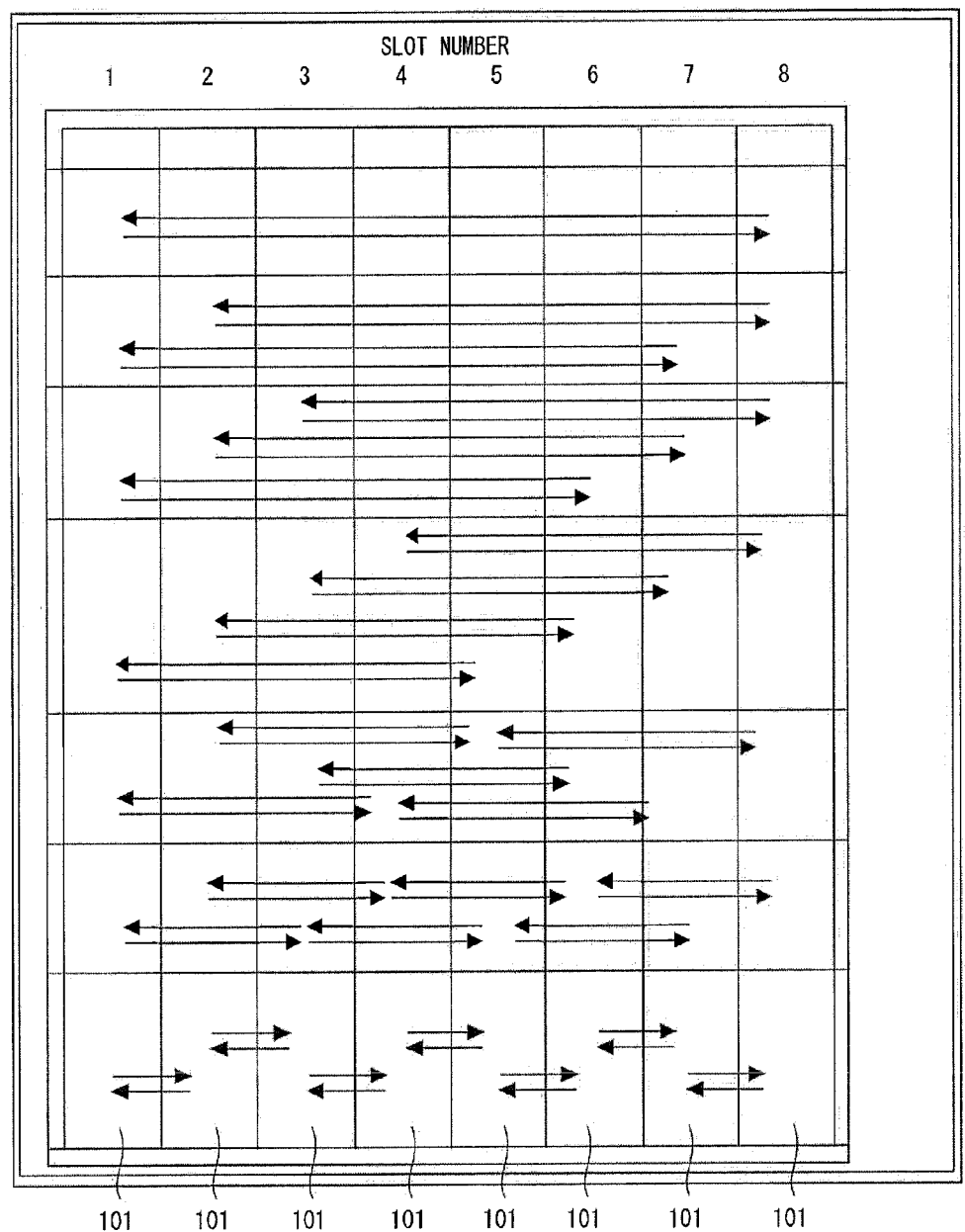
FIG. 2 illustrates a wiring example of mesh connection for eight INF units (slot numbers 1 to 8).

FIG. 2 illustrates a wiring example of mesh connection for eight INF units 101 (slot numbers 1 to 8).

The INF units 101 are thus interconnected by data links for transmitting a main signal and information (data) necessary to implement at least a protection switch function.

Returning to FIG. 1, the SONET transmission apparatus 100 according to this embodiment does not include a unit that is similar to the integrated TSI/SW control unit 3 provided in the conventional SONET transmission apparatus 1 (FIG. 40).

Each INF unit 101 has the same configuration, and roughly includes an optical transmission/reception unit (OPT) 103, a framer unit 104, an STS TSI unit (TSI unit) 105, and a virtual SONET/SDH switch core (VSSC) unit 106.

To describe in more detail, the optical transmission/reception unit (OPT) 103 includes an optical reception unit 103A and an optical transmission unit 103B as illustrated in FIG. 1. The framer unit 104 include a framer demultiplexing unit (framer DMUX unit) 104A, a framer multiplexing unit (framer MUX unit) 104B, an STS reception pointer unit (STS reception PTR unit) 104C, and an STS transmission pointer unit (STS transmission PTR unit) 104D.

The OPT unit 103 and the framer unit 104 have the same functions as those installed in the INF units 2 and integrated TSI/SW control unit 3 of the conventional SONET transmission apparatus 1 (FIG. 40). However, the SONET line switch units installed in the integrated TSI/SW control unit 3 in the conventional SONET transmission apparatus 1 are omitted from the INF units 101.

The optical reception unit 103A converts a signal received from an optical fiber into an electrical signal. The framer demultiplexing unit 104A terminates a unit layer, line layer, and path layer of SONET, and demultiplexes an input signal into a plurality of STS signals. The STS reception pointer unit 104C detects a reception pointer of an STS signal.

The TSI unit 105 is a generalized ASIC or generalized LSI for TSI processing that cross-connects an input port (port) and output port of a main signal (STS signal) through TSI processing (time slot interchange).

The TSI unit 105 is connected to the STS reception PTR unit 104C to receive signals (STS signals) from different lines which are respectively received at input ports housed in the own INF unit. The TSI unit 105 is also connected to the BWB 102 to receive main signals that have been received at input ports of another INF unit 101.

Under control of the VSSC unit 106, the TSI unit 105 determines for each INF unit the output destination (output port) of a main signal (STS signal) from the INF unit, and connects (cross-connects) the main signal to the output port through TSI processing. At this point, a main signal to be output from an output port of the own INF unit is connected to the STS transmission PTR unit 104D, and a signal to be transferred to another INF unit is connected (transferred) to the other INF unit 101 via the BWB 102.

The TSI unit 105 performs TSI processing (time slot interchange) based on a reception pointer of an STS signal, data provided from the VSSC unit 106, and the like. The TSI unit 105 thus executes path switching operation on an STS basis. Alternatively, the TSI unit 105 may execute time slot interchange type line switching operation.

The STS transmission PTR unit 104D detects a transmission pointer of an STS signal from the TSI unit 105. The framer multiplexing unit 104B multiplexes STS signals based on transmission pointers. The optical transmission unit 103B converts a multiplexed signal of STS signals into an optical signal, and outputs the optical signal to an optical fiber.

The virtual SONET/SDH switch core (VSSC) unit 106 performs virtual protection switch logical calculus for implementing a protection switch function through TSI processing by the TSI unit 105, and supplies a result of the logical calculus as control-use data of the TSI unit 105 to the TSI unit 105. The VSSC unit 106 includes a single or a combination of logic circuits that perform logical calculus for protection switching.

The VSSC unit 106 is interconnected with a data link interface unit (data link INF unit) 107, which is connected to the BWB 102.

This enables each INF unit 101 to send and receive (exchange) various types of information, including information relevant to SONET/SDH protection switch control, to and from another INF unit 101 via the BWB 102. In other words, each INF unit 101 can broadcast information (VSSC data link information) kept or obtained by the INF unit to all other INF units from the data link INF unit 107. Each INF unit 101 can receive information broadcast from another INF unit 101 at the data link INF unit 107.

Each INF unit 101 has various control functions including a line alarm overhead processing unit (line ALM OH processing unit) 108A that performs processing based on line layer alarm information (LOS, LOF, or the like), a path alarm overhead processing unit (path ALM OH processing unit) 108B that performs processing based on path layer alarm information, a switch control unit (SW control unit) 108C, and a TSI control unit 1081). Those control functions are provided in the VSSC unit 106.

A monitoring controller 109 is prepared for each INF unit 101 to monitor the operation of the INF unit 101.

In the SONET transmission apparatus 100, the SW control unit is thus disposed for each INF unit 101 so that distributed SW control is exerted. With the SW control units arranged dispersedly, SONET protection switch control is executed for each INF unit 101 separately.

In order to accomplish this distributed SW control, the VSSC unit 106 that implements switch control through logical calculus by means of virtual logic is newly provided. With the VSSC unit 106, SONET line switching is supported. A SONET LINE SW unit that needs high-speed processing is accordingly eliminated.

Power consumption is reduced by dispersing heat sources (SW control units) among the INF units 101 and eliminating a unit that performs high-speed processing as well in this manner. In addition, the degree of freedom in determining where to install the device is increased. In other words, Problem 1 described above is solved.

In the SONET transmission apparatus 100 according to the embodiment, the SW control unit 108C is provided for each INF unit 101 as illustrated in FIG. 1, to thereby execute SW control in each INF unit 101 in a distributed manner. This eliminates the need for a unit dedicated to SW control (integrated TSI/SW control unit), which means that a SONET transmission apparatus can be built at a cost proportional to the amount of lines accommodated.

Figure 3:
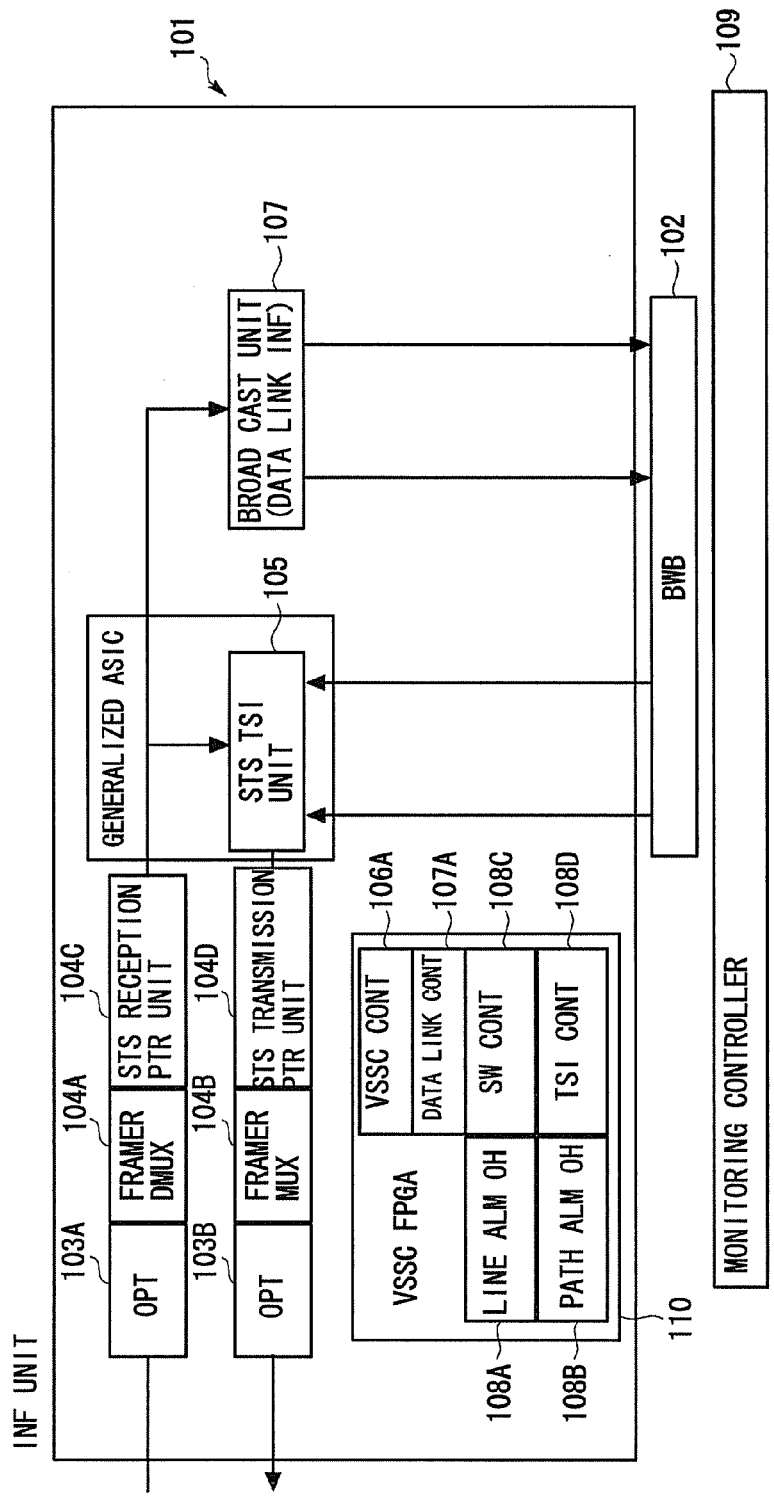
FIG. 3 illustrates a configuration example of the SONET/SDH transmission apparatus illustrated in FIG. 1.

As illustrated in FIG. 3, the TSI unit 105 of FIG. 1 is implemented by a generalized ASIC for TSI processing. The VSSC unit 106 of FIG. 1 is built from an FPGA (VSSC FPGA 110). The VSSC unit 106 (VSSC FPGA 110) implements the functions of the line alarm OH processing unit 108A, path alarm OH processing unit 108B, SW control unit 108C, and TSI control unit 108D illustrated in FIG. 1, and also implements a VSSC control unit 106A and a data link control unit 107A.

This way, when a request to add or change a SW control function is made, the SW control function can be added or changed with ease by merely changing the VSSC FPGA 110. The VSSC unit 106 performs RAM address-data conversion for TSI control, instead of actually performing high-speed switching operation, and therefore is capable of low-speed processing, which helps to reduce power consumption.

In other words, while a SW control unit, a path ALM OH processing unit, a path SW control unit, and a TSI control unit are required to be implemented by a large-scale FPGA in the conventional SONET transmission apparatus configuration as illustrated in FIG. 40, those units in the INF unit 101 of FIG. 3 can be implemented by a small-scale FPGA that is prepared for each INF unit 101. This helps to reduce power consumption and at the same time relax the heat condition with respect to where to install the device.

Further, protection switch control in the SONET transmission apparatus 100 is executed in each INF unit 101 in a distributed manner as illustrated in FIG. 1 and FIG. 3. Monitoring of alarm information (line alarm and path alarm) necessary for protection switch control in each INF unit 101 is therefore limited to the own INF unit. The scale of alarm information monitoring is thus small and the development of an FPGA that implements the alarm information monitoring function can be kept on a small scale. The development scale of the monitoring controller 109, which needs to monitor only the own INF unit, is kept small as well.

All INF units 101 mounted in the SONET transmission apparatus 100 are interconnected by mesh wiring of the BWB 102. Further, each INF unit 101 performs protection switch control via the VSSC unit 106 and the TSI unit.

Figure 4:
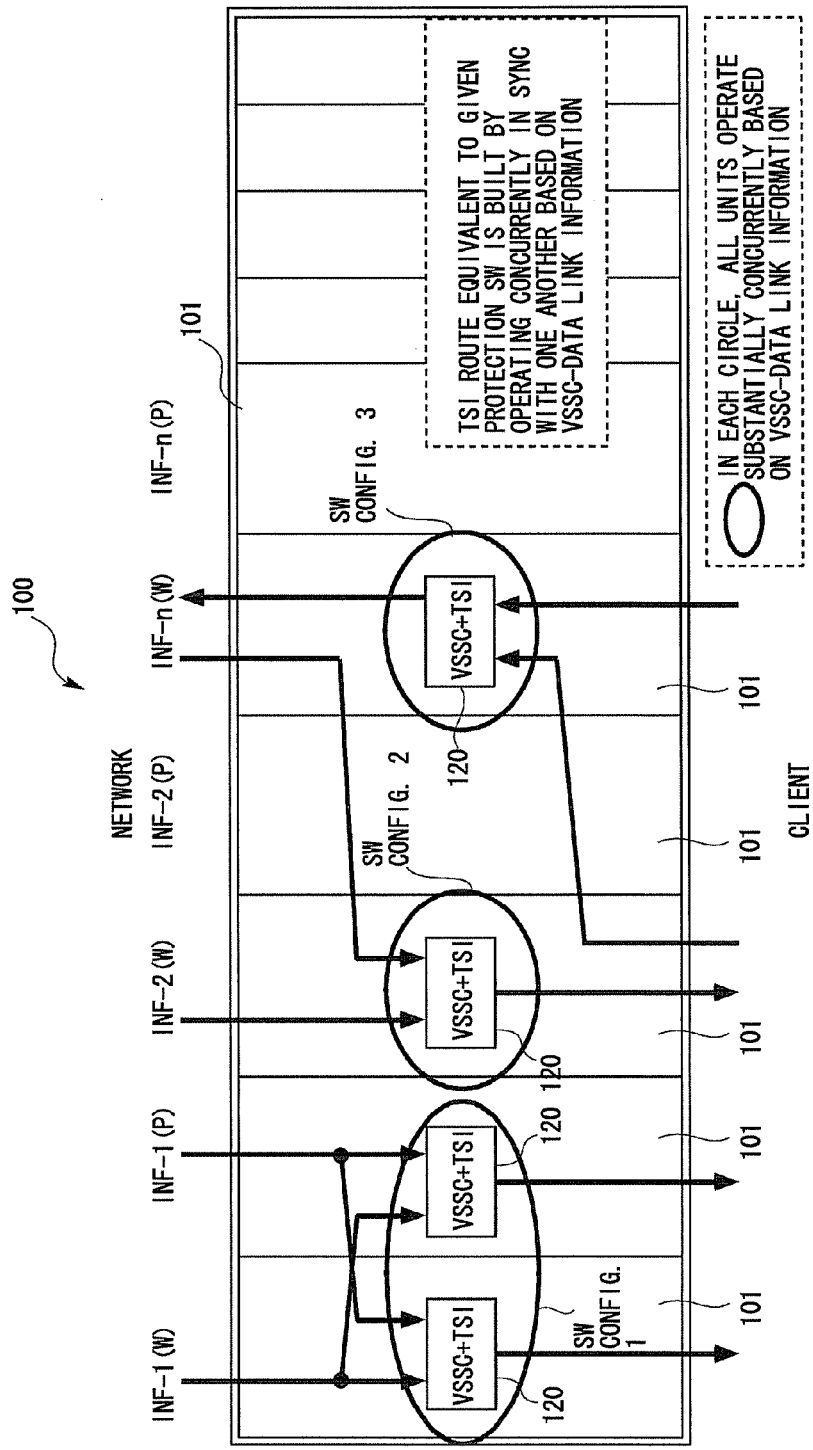
FIG. 4 schematically illustrates protection switching.
Figure 5:
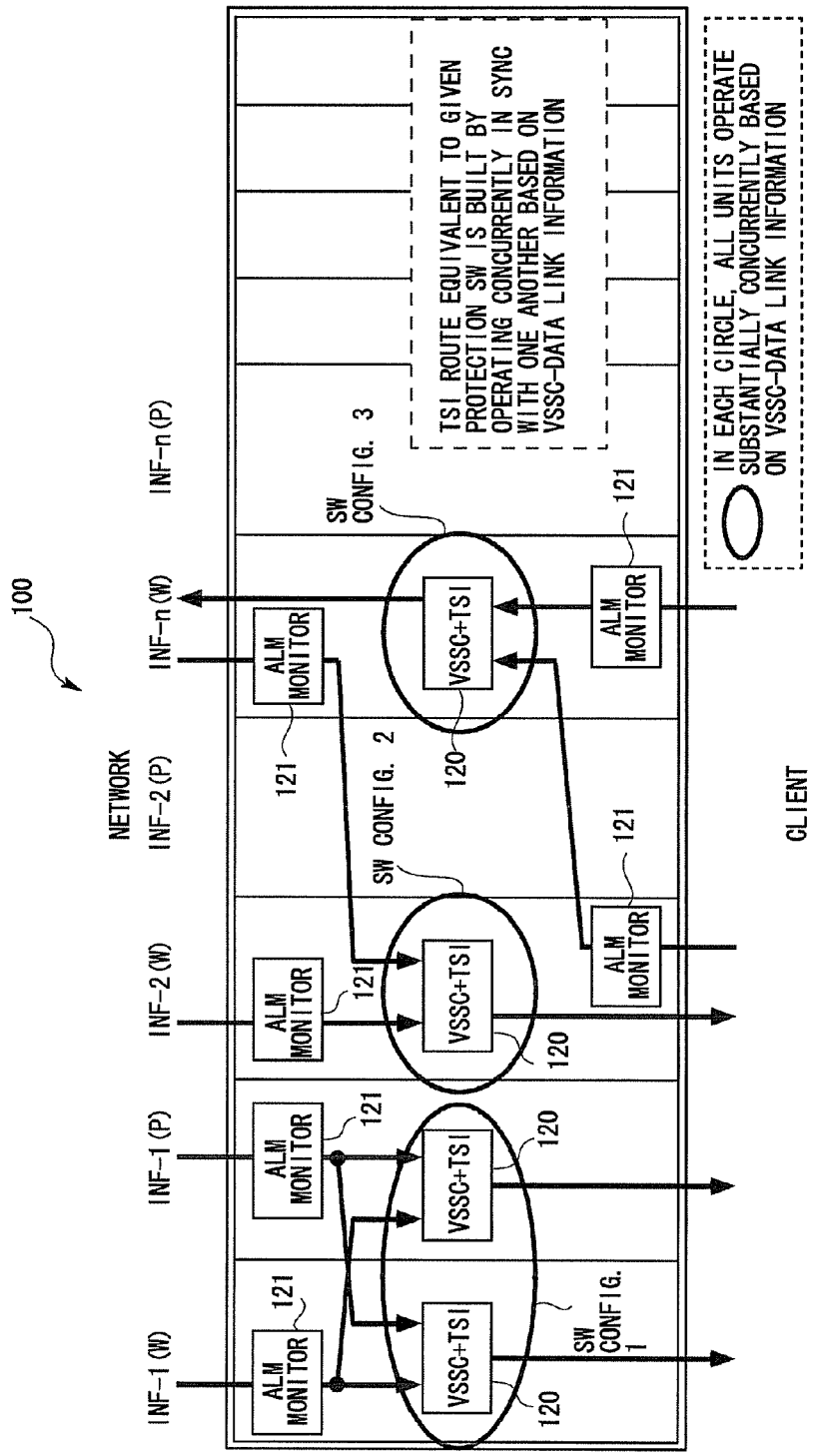
FIG. 5 schematically illustrates protection switching.

FIG. 4 and FIG. 5 are explanatory diagrams schematically illustrating the protection switch control. FIGS. 4 and 5 illustrate three protection switch configuration examples (SW configuration 1, SW configuration 2, and SW configuration 3). The SONET transmission apparatus 100 illustrated in FIG. 4 houses a plurality of INF units 101.

The plurality of INF units 101 form a plurality of pairs each of which constitutes a working side (W: active system) and a protection side (P: standby system). Each INF unit 101 has network-side input/output ports and client-side (user-side) input/output ports. Each INF unit 101 is provided with the VSSC unit 106 and the TSI unit 105 (together referred to as "VSSC+TSI block 120") that perform protection switch control.

An alarm monitoring block (ALM monitoring block 121) that monitors alarm information (alert information) is also provided in each INF unit 101 (FIG. 5). The alarm monitoring block 121 corresponds to the monitoring controller 109 illustrated in FIG. 1.

In the SW configuration 1, a signal received at the network-side input port of INF-1 (W), and a signal received at the network-side input port of INF-1 (P) and transferred to INF-1 (W) via the BWB 102 are input to the VSSC+TSI block 120 of INF-1 (W). The VSSC+TSI block 120 of INF-1 (W) can connect one of the signal from INF-1 (W) and the signal from INF-1 (P) to its client-side output port.

Similarly, a signal received at the network-side input port of INF-1 (P), and a signal received at the network-side input port of INF-1 (W), and transferred to INF-1 (P) via the BWB 102 are input to the VSSC+TSI block 120 of INF-1 (P). The VSSC+TSI block 120 of INF-1 (P) can connect one of the signal from INF-1 (W) and the signal from INF-1 (P) to its client-side output port.

The alarm monitoring block 121 in INF-1 (W) and the alarm monitoring block 121 in INF-1 (P) respectively monitor signal input (line/path) from the network side.

When signal input to INF-1 (W) and INF-1 (P) is normal, a signal received at the network-side input port of INF-1 (W), for example, is connected to the client-side output ports via the VSSC+TSI block 120 in INF-1 (W) and the VSSC+TSI block 120 in INF-1 (P). Alternatively, the signal may be output to the client side only from the working side.

On the other hand, when the alarm monitoring block 121 of INF-1 (W), for example, detects an anomaly (line/path alarm information) in signal input from the network side, the VSSC+TSI block 120 in INF-1 (W) and the VSSC+TSI block 120 in INF-1 (P) respectively perform protection switch operation such that a signal received at the network-side input port of INF-1 (P) is connected to the client-side output ports of INF-1 (W) and INF-1 (P). This protection switch operation (protection switching) can be executed on a line basis and/or a path basis.

Alarm information detected in INF-1 (W) is notified to INF-1 (P) via the BWB 102, and the VSSC+TSI block 120 in INF-1 (W) and the VSSC+TSI block 120 in INF-1 (P) execute the line/path switching operation described above at once in synchronization with each other.

When it is the alarm monitoring block 121 of INF-1 (P) that has detected line/path alarm information, the alarm information is notified to INF-1 (W) via the BWB 102, and the VSSC+TSI block 120 in the INF unit of INF-1 (W) and the VSSC+TSI block 120 in the INF unit of INF-1 (P) perform protection switch operation.

In the SW configuration 2, the VSSC+TSI block 120 of INF-2 (W) receives a signal received from the network-side input port of INF-2 (W), and a signal received at the network-side input port of INF-n (W) and transferred to INF-2 (W) via the BWB 102, and chooses one of those signals to connect the signal to the client-side output ports.

When the alarm monitoring block 121 of INF-2 (W) and the alarm monitoring block 121 of INF-n (W) detect no anomaly (line/path alarm information) in signal input, a signal received at the network-side input port of INF-2 (W), for example, is connected to the client-side output ports via the VSSC+TSI blocks 120.

On the other hand, when the alarm monitoring block 121 of INF-2 (W), for example, detects an anomaly (alarm information), the alarm information is notified to the VSSC+TSI block 120 of INF-2 (W). Then, the VSSC+TSI block 120 makes a switch so that a signal from INF-n (W) is connected to the client-side output ports instead of a signal from INF-2 (W).

In the opposite case where the signal chosen by the VSSC+TSI block 120 to be connected to the client side has been a signal from INF-n (W) at the time the alarm monitoring block 121 of INF-n (W) detects alarm information, the alarm information is delivered to the VSSC+TSI block 120 of INF-2 (W) via the BWB 102. Then, the VSSC+TSI block 120 performs switching operation for connecting a signal that is input to INF-2 (W) to the client side. This protection switch operation can be executed on a line basis and/or a path basis.

In the SW configuration 3, the VSSC+TSI block 120 of INF-n (W) receives a signal received at the client-side input port of INF-n (W), and a signal received at the client-side input port of INF-2 (W) and transferred to INF-n (W) via the BWB 102, and connects one of those signals to the network-side output ports.

When the alarm monitoring block 121 of INF-2 (W) and the alarm monitoring block 121 of INF-n (W) detect no anomaly (line/path alarm information) in signal input on the client side, a signal received at the network-side input port of INF-n (W), for example, is connected to the client-side output ports.

On the other hand, when the alarm monitoring block 121 of INF-n (W) detects an anomaly (alarm information), the alarm information is delivered to the VSSC+TSI block 120 of INF-n (W). Then, the VSSC+TSI block 120 makes a switch (performs protection switch operation) so that a signal from INF-2 (W) is connected to the network-side output ports instead of a signal from INF-n (W).

In the opposite case where the signal connected by the VSSC+TSI block 120 to the network side has been a signal from INF-2 (W) at the time the alarm monitoring block 121 of INF-2 (W) detects an anomaly (alarm information), the alarm information is delivered to the VSSC+TSI block 120 via the BWB 102. Then, the VSSC+TSI block 120 performs protection switch operation for connecting a signal that is input from INF-n (W) to the network side. This protection switch operation can be executed on a line basis and/or a path basis.

In order to accomplish the protection switch operation (protection switching) described above, the alarm monitoring block 121 in each INF unit 101 monitors alarm information.

As described above, alarm information detected in one INF unit is notified (broadcast) to all the other INF units via the BWB 102. This enables the other INF units to execute protection switch operation for lines (channels) accommodated by their own units that are relevant to the alarm information in synchronization with the source of the alarm information.

The BWB 102 is used to send and receive not only control information as the alarm information described above but also main signals exchanged between the INF units 101. Control information can be stored in other areas of a main signal than a user data storage area to be sent as VSSC data link information.

A SONET frame can be employed as a data block transmitted within the BWB 102. In this case, unused overhead (OH) in a SONET frame can be used as an area for storing VSSC data link information.

Figure 6:
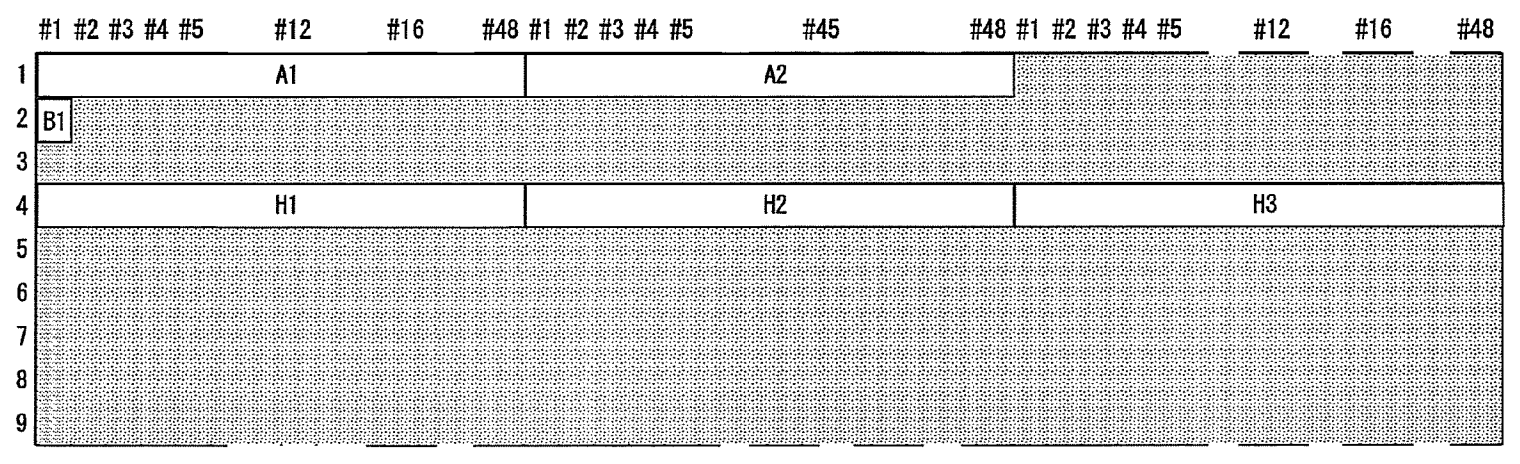

FIG. 6 illustrates an example of assigning a transport overhead (TOH) byte, which is a free area in the case where a SONET/SDH OC 48 format (2.4 G) is used as a signal in the BWB 102, as the storage area of VSSC data link information.

In this case, A1, A2, B1, H1, H2, and H3 bytes are left alone. The A1 and A2 bytes are frame synchronization bytes, the B1 byte is a parity byte for monitoring the frame, and the H1, H2, and H3 bytes are pointer signal bytes for positioning an STS or AU signal, which is an actual signal. Other byte areas than those can be utilized as a byte for storing VSSC data link information.

Figure 7:
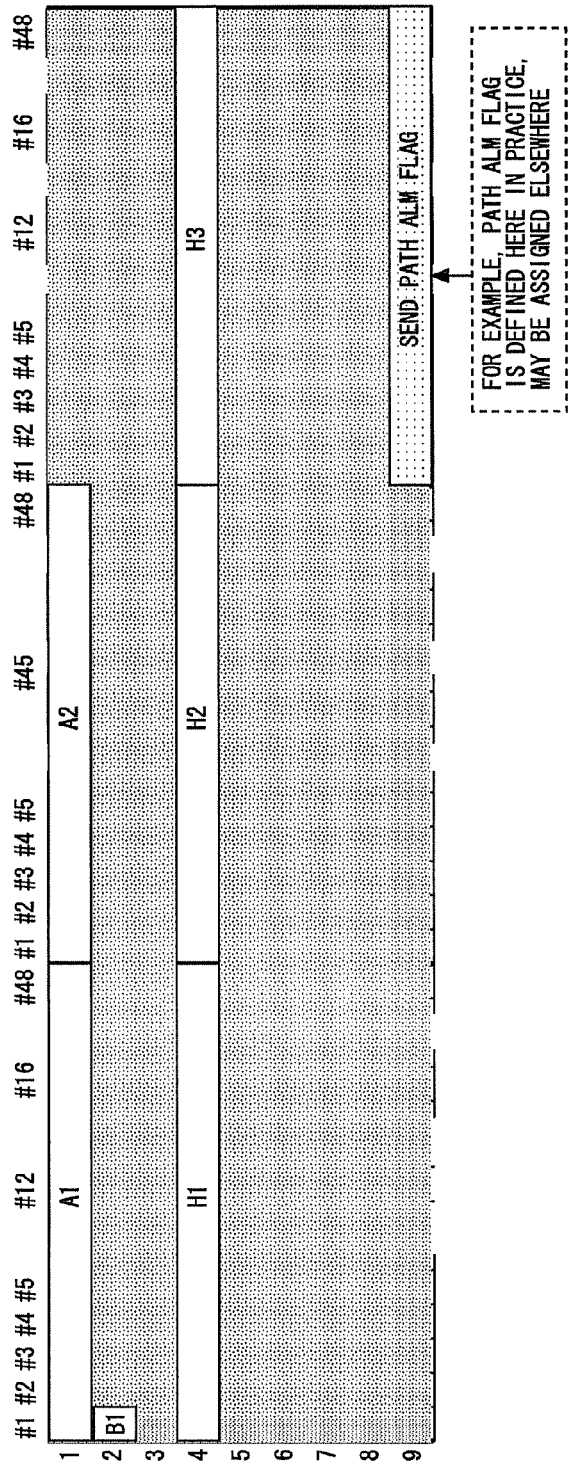
FIG. 7 illustrates an example of defining a storage area of a path alarm flag in the format illustrated in FIG. 6.

It may also be defined that a path alarm flag (path alarm information) is stored in a given area as illustrated in FIG. 7. However, the storage site for the path alarm information can be allocated freely as long as it is a free area.

VSSC data link information is made up of dynamic information and static information. Dynamic information is information that is allocated to a free area in a frame as it is and transmitted immediately. Static information is a large quantity of information which is sent cyclically in a given cycle (about 5 ms) to a specified address. The path alarm flag described above is contained in dynamic information.

In the example of FIG. 7, path alert information (path alarm flag) is stored in a SONET E2 area to notify the path alert information to the protection side. The transmitted path alert information is used in the VSSC+TSI block 120 (FIG. 5: the TSI unit 105 and the VSSC unit 106) as a factor for performing path switch control.

Each INF unit 101 can thus execute protection switch operation by merely performing alert detection for the own INF unit. Compared to the conventional method where alert detection and protection switch operation (SW control) are executed by a dedicated LSI or FPGA, the scale of circuit design is greatly reduced.

In the case where distributed TSI processing is executed as in this embodiment, a new problem (Problem 5) arises in that switching through SONET path protection such as a unidirectional path switched ring (UPSR) which has conventionally been executed by an integrated SW unit based on the respective path alarms needs to be executed by each INF unit separately. In the case where SONET path protection is executed under monitoring and control by a host device such as an operation system (OPS), GR-253 or other standards defining that the switching should be made within 50 ms are not satisfied. The switching therefore has to be executed autonomously by hardware that constitutes the INF unit.

Similarly, with the integrated SW unit removed, cross-connection control of main signals accommodated through the respective slots (insertion slots of the INF units) which has conventionally been executed by the integrated SW unit has to be performed in each INF unit separately.

Means for solving the above-mentioned Problem 5 is described. As illustrated in FIG. 1, each INF unit 101 is connected by mesh connection to the BWB 102. Each INF unit 101 sends VSSC data link information (dynamic information and static information) to the other INF units 101 by broadcasting the VSSC data link information through its data link INF unit 107 to the BWB 102.

In the case where a SONET frame is employed in the transmission of the VSSC data link information, the VSSC data link information is stored (inserted) in a free area in the SONET frame as illustrated in FIG. 6 and FIG. 7. This SONET frame is sent to all INF units 101 within a shelf that constitutes the SONET transmission apparatus.

Static information contains automatic protection switching (APS) settings information of a customer which is provided from the OPS or the like, STS concatenation information (STS size) which is information about the internal architecture of a main signal, STS cross-connection information of all INF units 101 within the shelf, and various tables for bidirectional line switched ring (BLSR).

To give a more detailed description, static information includes the following.

(1) Facility size and protection switch mode (FFP) information

Information indicating the transmission rate (for example, OC1, OC3, OC2, OC48, OC192, or OC768) of INF ports housed.

Type of line protection (unprotected, 1+1, 1:N, UPSR, 2F-BLSR, 4F-BLSR) and information indicating a combination (group) of line protection types (WK (active), PT (standby), East, West).

(2) STS path concatenation information

Information indicating the concatenation size (conc. size: STS1, STS3c, STS6c, STS12c, STS24c, STS48c, STS192c, STS 384c, STS768c) of an STS that is received by the framer.

(3) STS logical cross-connection table (STS logical XCON table) "Side A" and "Side B" information (only for the output of its own unit (for example, 20 G))

Information indicating two sides (Side A and Side B) (for path switching) of connected TSI ("from" point and "to" point) information.

(4) Pre-provisioning table information (2F-BLSR or 4F-BLSR ring topology table)

Node ID information of its own node in a BLSR group and ring topology table information built among ring nodes in the BLSR.

(5) Pre-provisioning table information (2F-BLSR or 4F-BLSR squelch table)

Squelch table information built among the ring nodes in the BLSR.

(6) Pre-provisioning table information (2F-BLSR or 4F-BLSR ring interconnection protection channels (RIP) table)

RIP table information built among the ring nodes in the BLSR.

(7) Pre-provisioning table information (2F-BLSR or 4F-BLSR NUT set table)

Settings information of basic NUT supported by the BLSR and settings information of enhanced NUT supported by the BLSR.

(8) Parameter information (keywords defining path selector operation)

A J1 trace expectation value, a path signal label expectation value, a J1 trace format expectation value, and BERSFP and BERSDP thresholds.

Dynamic information, on the other hand, includes information that has real-time-ness (immediacy) such as an STS path alert (path alarm) collected by each INF unit 101 separately, 1+1 APS SW information, BLSR SW information, and RIP control information.

To give a more detailed description, dynamic information includes the following.

(1) Line TOH information
APS byte (K1 or K2 byte) information
TOH byte for ring topology
TOH byte for building a squelch/RIP table
(2) Line alarm information
Line SF (LOS, LOF, AIS-L)
Line SD (BERSD-L)
INF unit RMVD (dropped unit) information
(3) Switch settings information by APS protocol determination (1+1 APS, 1:N APS, 2F-BLSR, 4F-BLSR)
Settings information of an APS CPU determination result
(4) STS path alarm flag information (LOP-P, AIS-P, UNEQ-P, PLM-P, etc.)

Upon receiving static information and dynamic information, each INF unit 101 performs filtering on the static information to take in as VSSC control information only information that is relevant to the slots (ports) of its own unit. The dynamic information, on the other hand, is handed over to the VSSC unit 106 as it is.

Figure 8:
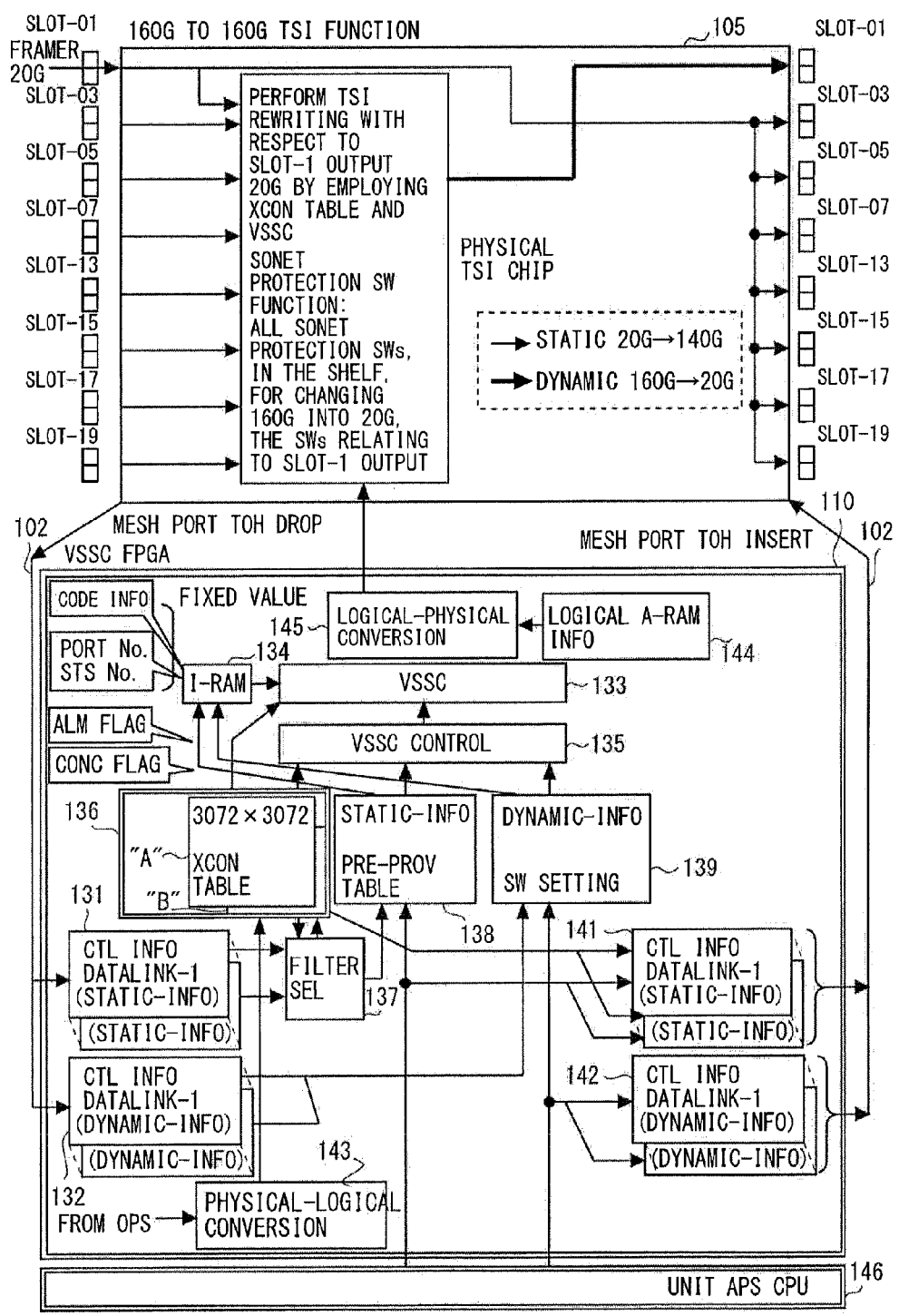
FIG. 8 is an explanatory diagram of function blocks of a VSSC unit (VSSC FPGA) and a TSI unit.

FIG. 8 is an explanatory diagram of function blocks of the VSSC unit 106 (VSSC FPGA 110) and the TSI unit 105, and illustrates a control information data link unit within the VSSC FPGA 110. In this example, eight INF units are housed in a shelf.

In FIG. 8, each static information receiving unit 131 extracts OH in which static information delivered while multiplexed with a main signal is stored. There are as many static information receiving units 131 as the number of the other INF units. In this example where eight INF units constitute the SONET transmission apparatus, seven static information receiving units 131 are provided.

A cross-connection table (XCON table) unit 136 generates cross-connection information (Side A and Side B) of the own INF unit from settings information from the OPS. The settings information received from the OPS is input to the cross-connection table unit 136 after converted by a physical-logical conversion unit 143 into logical data. Cross-connection information is given as static information to static information transmitting units 141.

A filter selector 137 extracts a part (output 20 G) relevant to the own INF unit through filtering from static information received by each static information receiving unit 131. In filtering, the filter selector 137 extracts relevant static information based on cross-connection information of the own INF unit which is found in the cross-connection table unit 136. The filter selector 137 gives the extracted static information to a pre-provisional table generating unit 138.

From the static information which is input from the filter selector 137, the pre-provisional table generating unit 138 generates pre-provisional information for controlling a VSSC control unit 135. The pre-provisional table generating unit 138 is also capable of making information that is received from a UNIT APS CPU 146 reflected on the pre-provisional information.

The UNIT APS CPU 146 is a processor for monitoring and control in the INF unit. By running firmware for INF unit monitoring and control (unit FIRM) and a program for executing APS protocol (unit FIRM APS engine), the UNIT APS CPU 146 can supply information for generating a pre-provisional table to the pre-provisional table generating unit 138 and the static information transmitting units 141, and can monitor the APS (K1 or K2) byte in a SONET frame that is received by the own INF unit to supply alarm information to a switch setting unit 139 and dynamic information transmitting units 142. The UNIT APS CPU 146 corresponds to the monitoring/controller 109 (FIG. 1).

Each dynamic information receiving unit 132 extracts OH in which dynamic information delivered while multiplexed with a main signal is stored. As many dynamic information receiving units 132 as the number of the other INF units are provided (seven in this example). The dynamic information is notified to the switch setting unit 139 as it is.

The switch setting unit 139 generates control information (switch settings information) of the VSSC control unit 135 based on dynamic information from all the other INF units which is received from the dynamic information receiving units 132 and dynamic information (alarm information) of the own INF unit which is received from the UNIT APS CPU 146.

As many static information transmitting units 141 as the number of the other INF units are provided. Each static information transmitting unit 141 sends static information (pre-provisional table) of the own INF unit and cross-connection table (XCON table) information in the cross-connection table unit 136 as static information to each of the other INF units via the BWB 102. In this manner, static information of the own INF unit is broadcast to all the other INF units.

As many dynamic information transmitting units 142 as the number of the other INF units are provided. Each dynamic information transmitting unit 142 sends dynamic information (switch settings information generated by the switch setting unit 139) relevant to the own INF unit as dynamic information to each of the other INF units via the BWB 102. In this manner, dynamic information of the own INF unit is broadcast to all the other INF units.

The VSSC control unit 135 controls the operation of a VCCS unit 133 based on cross-connection table information from the cross-connection table unit 136, pre-provisional information (static information) from the pre-provisional table generating unit 138, and switch settings information (dynamic information) from the switch setting unit 139. The VSSC control unit 133 functions as a line switch control unit such as a BLSR and/or a path switch control unit such as a UPSR.

Under control of the VSSC control unit 135, the VSSC unit 133 performs logical calculus for protection switch operation in the own INF unit with the use of input data from an input RAM (I-RAM) 134, and writes a result of the logical calculus (protection switch operation-use data) in an ACM RAM 144. The protection switch operation-use data (logical data) written in the ACM RAM 144 is converted into physical data by a logical-physical conversion unit 145, and supplied as protection switch control data to the TSI unit 105 (physical TSI chip).

A main signal (20 G) from the reception-side framer unit of the own INF unit (SLOT-01 in this example) and main signals that are input from all the other INF units to the own INF unit via the BWB 102 are input to the TSI unit 105.

The TSI unit 105 has a cross-connection table for the output (output 20 G) of the own INF unit. Based on the cross-connection table, the TSI unit 105 selects an STS signal for the output (20 G) of the own INF unit from among a plurality of main signals (160 G: 20 G×8) that are input from all INF units including the own INF unit, and connects the STS signal to the output port of the own INF unit (160 G→20 G).

Alternatively, based on the cross-connection table, the TSI unit 105 may distribute a main signal (20 G) input to the own INF unit to all the other INF units (20 G→140 G).

The TSI unit 105 also executes SONET protection switch operation by performing TSI processing (time slot interchange) on an STS basis in accordance with the protection switch operation control data from the VSSC unit 133. Through TSI processing performed by the TSI unit 105, desired protection switch operation (line protection (line switching), path protection (path switching)) is accomplished.

Through single protection switch operation in the own INF unit, or concurrent protection switch operation executed in synchronization with the other INF units, line switching and/or path switching is executed for implementing various protection switch functions such as 1+1 APS line SW, 1:1 APS line SW, 1:N APS line SW, UPSR/dedicated path protection mesh (DPPM) SW, and 2F/4F-BLSR (NUT, RIP).

Figure 9:
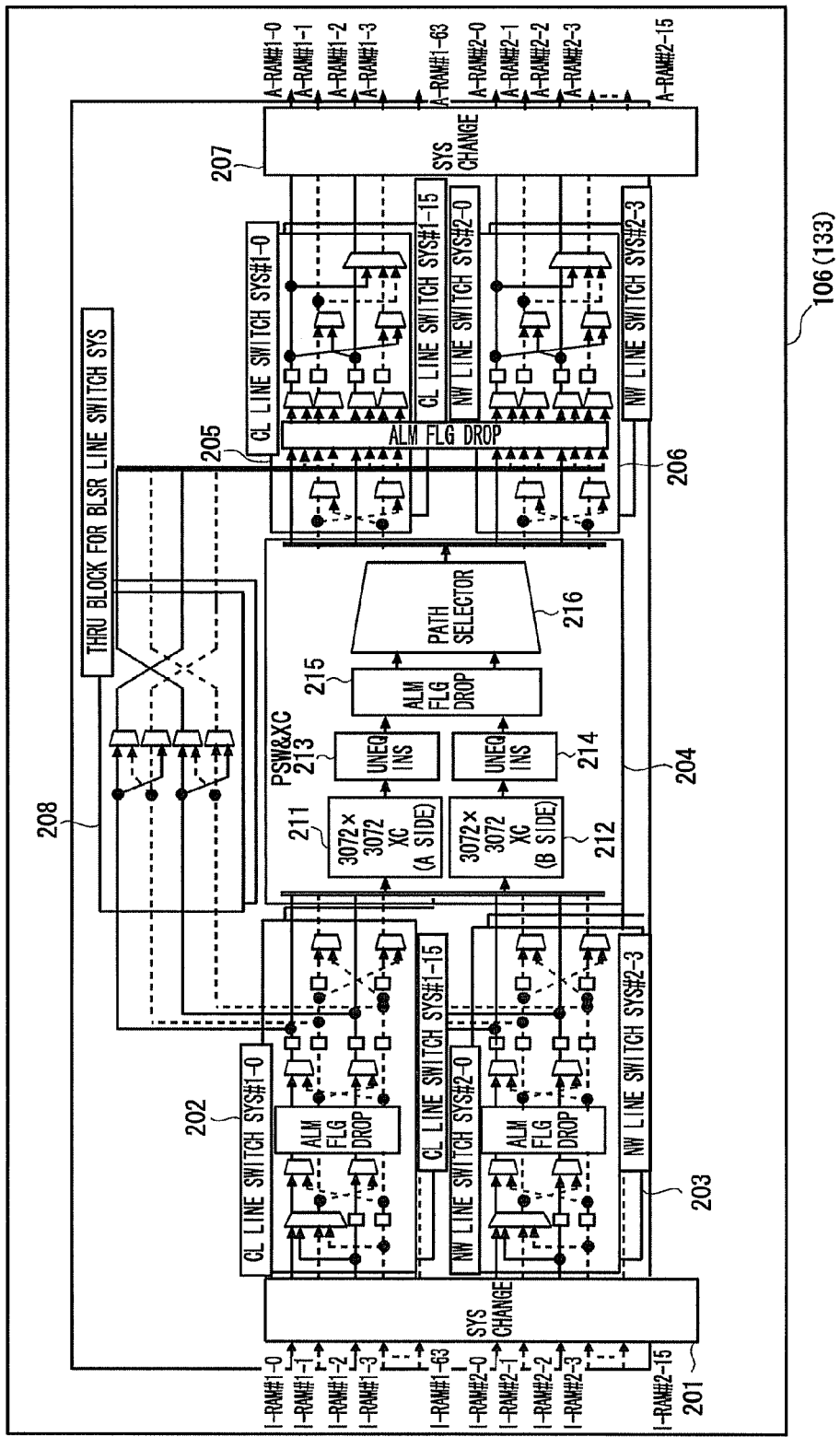
FIG. 9 illustrates a configuration example of the VSSC unit.

FIG. 9 illustrates a configuration example of the VSSC unit 133 (VSSC unit 106). In the example of FIG. 9, the VSSC unit 133 includes an input-side signal connection control unit (SYS change) 201, an input-side client-side line protection block group (client line switch system group) 202, an input-side network-side line protection block group (network line switch system group) 203, a path switch and cross-connection unit (path protection block and TSI cross-connection unit: PSW & XC) 204, an output-side client-side line protection block group (client line switch system group) 205, an output-side network-side line protection block group (network line switch system group) 206, an output-side signal connection control unit (SYS change) 207, and a BLSR line protection block group (through block for BLSR line switch system group) 208.

The input RAM 134 illustrated in FIG. 8 stores for each input port of the own INF unit, information including an input port number and an STS number (a number assigned to an STS signal (STS frame) that is input to the input port: used as a path identifier). The information stored for each input port also includes code information. The code information contains an STS concatenation flag (STS size information) provided from the pre-provisional table generating unit 138 and an alarm flag (line/path alarm information) provided from the switch setting unit 139.

Data indicating the state of a main signal input from each input port (a signal containing the input port number, STS number, and code information described above) is output from the input RAM 134 to a signal connection control unit 111. The signal connection control unit 111 connects data of each input port which is input from the input RAM 134 to the associated one of the line protection block groups 202 and 203. This connection control is performed in accordance with an instruction from, for example, the VSSC control unit 135.

Line protection blocks constituting the line protection block groups 202 and 203 are each built from a logic circuit that performs virtual line protection operation based on data input to its own block. A logic circuit that performs line switching and line selection such as a line switch selector or a bridge switch for performing protection switch operation through an actual BLSR (NUT, RIP) is incorporated in each of the line protection blocks in a manner that takes into account the actual BLSR configuration. The logic circuit outputs a result of performing protection switch operation in accordance with line alarm information in the data.

Through logical calculus performed in each of the line protection blocks, the line protection block groups 202 and 203 output for each input port data that indicates a result of executing line protection operation (switching operation by a line switch selector or a bridge switch) in accordance with alarm information.

The path switch and cross-connection unit 204 is a block constituted of logic circuits which virtually perform path protection operation. The path switch and cross-connection unit 204 includes two logical cross-connection tables, 211 (Side A) and 212 (Side B), to which output data (line outputs) from the line protection block group 202 and output data (line outputs) from the line protection block group 203 are input respectively, insertion units (UNEQ-P INS) 213 and 214 which are associated with the logical cross-connection tables 211 and 212, a quality comparing unit (ALM FLG drop) 215, and a path switch (path selector) 216.

The logical-cross connection tables 211 and 212 each follow actual cross-connection table settings in the cross connection table unit 136 in cross-connecting a path (STS) that is input from the input side to a given output side.

The insertion units 213 and 214 insert signals (UNEQ-Ps) for unused paths which indicate that the paths are not in use to outputs (cross-connection results) of their respectively associated logical cross-connection tables 211 and 212.

The quality comparing unit 215 drops an alarm flag and a concatenation flag that are contained in OH of a path (STS) and, based on those flags, determines which of Side A and Side B has a better quality. The path switch 216 outputs a signal of a side that is determined by the quality comparing unit 215. Through switching operation by the path switch 216, a result of performing path protection operation is output.

The output from the path switch 216 is connected to the associated one of line protection blocks constituting the line protection block groups 205 and 206. The line protection blocks constituting the block groups 205 and 206 are each built from a logic circuit that performs virtual line protection operation as in the block groups 202 and 203.

A logic circuit that performs line switching and line selection such as a line switch selector or a bridge switch for performing protection switch operation through an actual BLSR (NUT, RIP) is incorporated in each of the line protection blocks in a manner that takes into account the actual BLSR configuration.

Through logical calculus performed in each of the line protection blocks, the line protection block groups 205 and 206 output for each line data that indicates a result of executing line protection operation (switching operation by a line switch selector or a bridge switch) in accordance with alarm information.

The output-side signal connection control unit 207 outputs for each output port a result of logical calculus in accordance with connection settings set by, for example, the VSSC control unit 135. The ACM RAM 144 stores for each output port a result of virtual protection switch operation executed by the VSSC unit 133. In other words, data indicating for each input port the output destination (output port) of an STS signal input from the input port is written in the ACM RAM 144.

This data is supplied to the TSI unit 105, which performs TSI processing in accordance with the data. An STS signal (real signal) input to the TSI unit 105 is thus output to a destination suited to the result of protection switch operation. The SONET protection switch function is implemented in this manner.

The BLSR line protection block group 208 is a logic circuit block that is provided with BLSR in mind. In BLSR, a state in which path switching is prohibited is sometimes created during ring protection. In order to make this prohibited state reflected on the VSSC unit 133, the block group 208 functions such that data (a signal) is transmitted from the input-side line protection block groups 202 and 203 to the output-side line protection block groups 205 and 206, bypassing the path switch and cross-connection unit 204.

The VSSC unit 133 performs logical calculus with a logic circuit that is based on the actual line/path configuration as described above, and outputs a result of executing line/path switching.

In this manner, hardware can set cross-connection settings dynamically and autonomously without an integrated SW unit, and the path protection switching time is shortened to a degree that the switching is completed within a time demanded by the standard.

The VSSC unit 133 of FIG. 9 shows a configuration that can implement 1+1 APS SW, 1:1 APS SW, 1:N APS SW, UPSR/DPPM, and 2F-BLSR. The VSSC unit 133 can also implement 4F-BLSR if the configuration of the BLSR line protection unit 208 is changed. With the VSSC unit 133 (VSSC logic circuit) of FIG. 9, an arbitrary combination selected from 1+1 APS line SW, 2F-BLSR, UPSR, and DPPM is implemented with ease.

Figure 10:
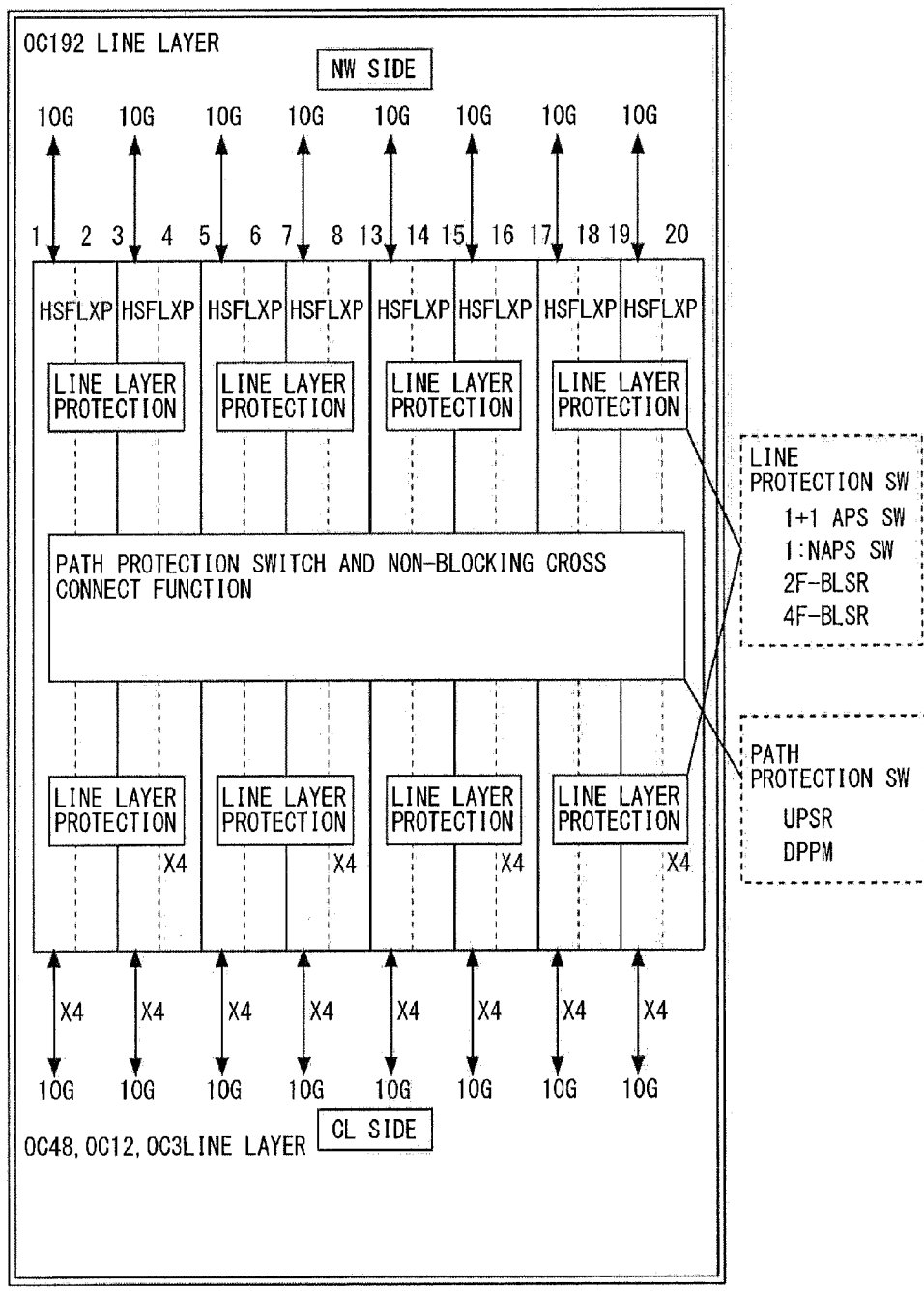
FIG. 10 illustrates a TRIB shelf view of a SONET transmission apparatus.

FIG. 10 illustrates a TRIB shelf view of the SONET transmission apparatus 100 described above. As illustrated in FIG. 10, the SONET transmission apparatus 100 is capable of providing line layer protection (1+1 APS SW, 1:N APS SW, 2F/4F-BLSR) on the network side and the client side each, and can also provide path layer protection such as UPSR or DPPM.

Application Example 1

Figure 11:
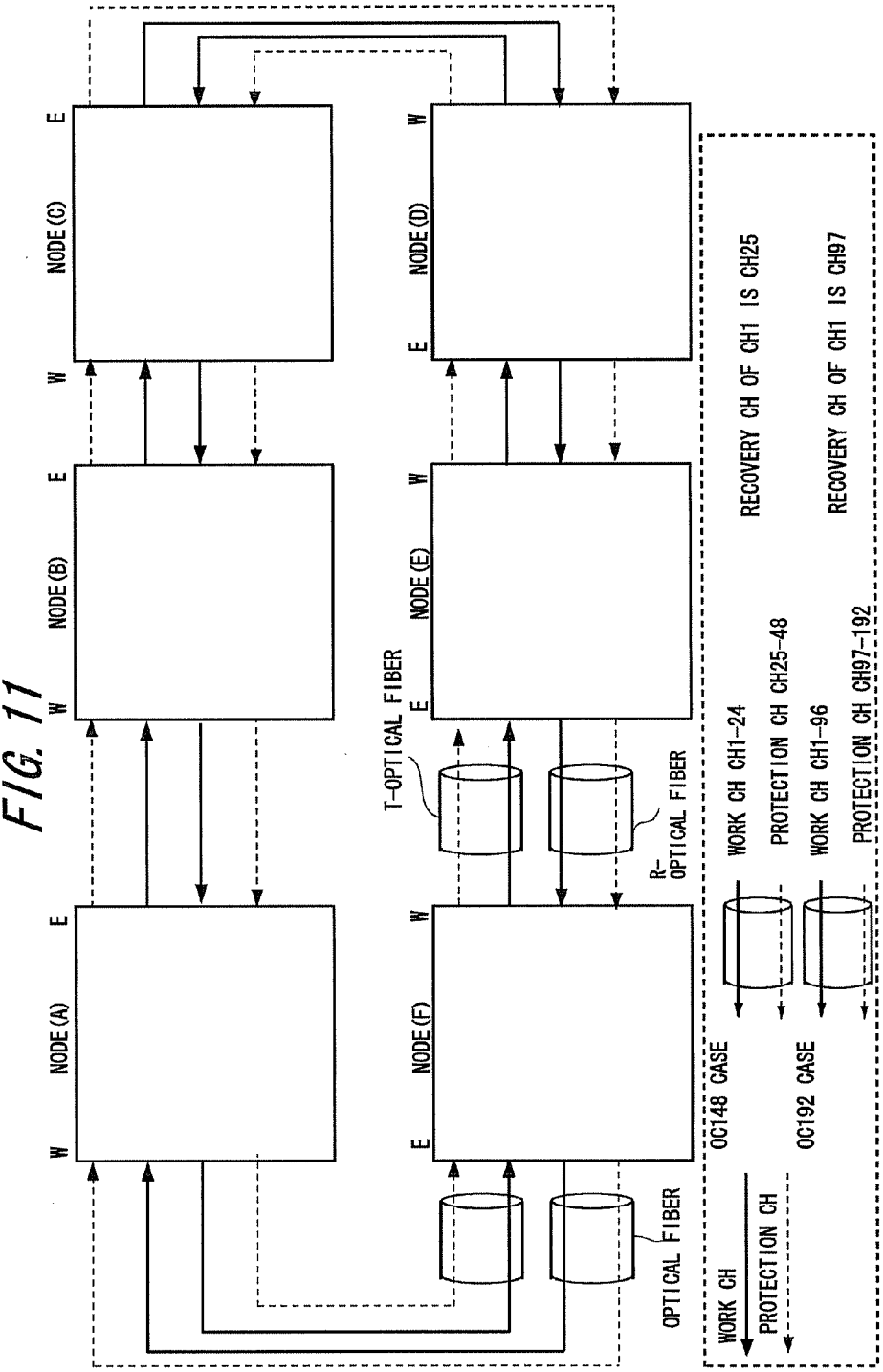
FIG. 11 illustrates a basic configuration example of 2F-BLSR.

An application example of a SONET transmission apparatus according to this embodiment is described below. An example of application to 2F-BLSR is presented as Application Example 1. FIG. 11 illustrates a basic configuration example of 2F-BLSR. FIG. 11 illustrates nodes A to F each of which corresponds to the SONET transmission apparatus 100.

In the example of FIG. 11, a ring network using two optical fibers is formed. The optical fibers each have an active system (WK: working line) and a standby system (PT: protection line). For example, in the case where the transmission rate is OC192, channels 1 to 96 are active system channels and channels 97 to 192 are standby system channels. A recovery channel of the channel 1 is the channel 97.

Figure 12:
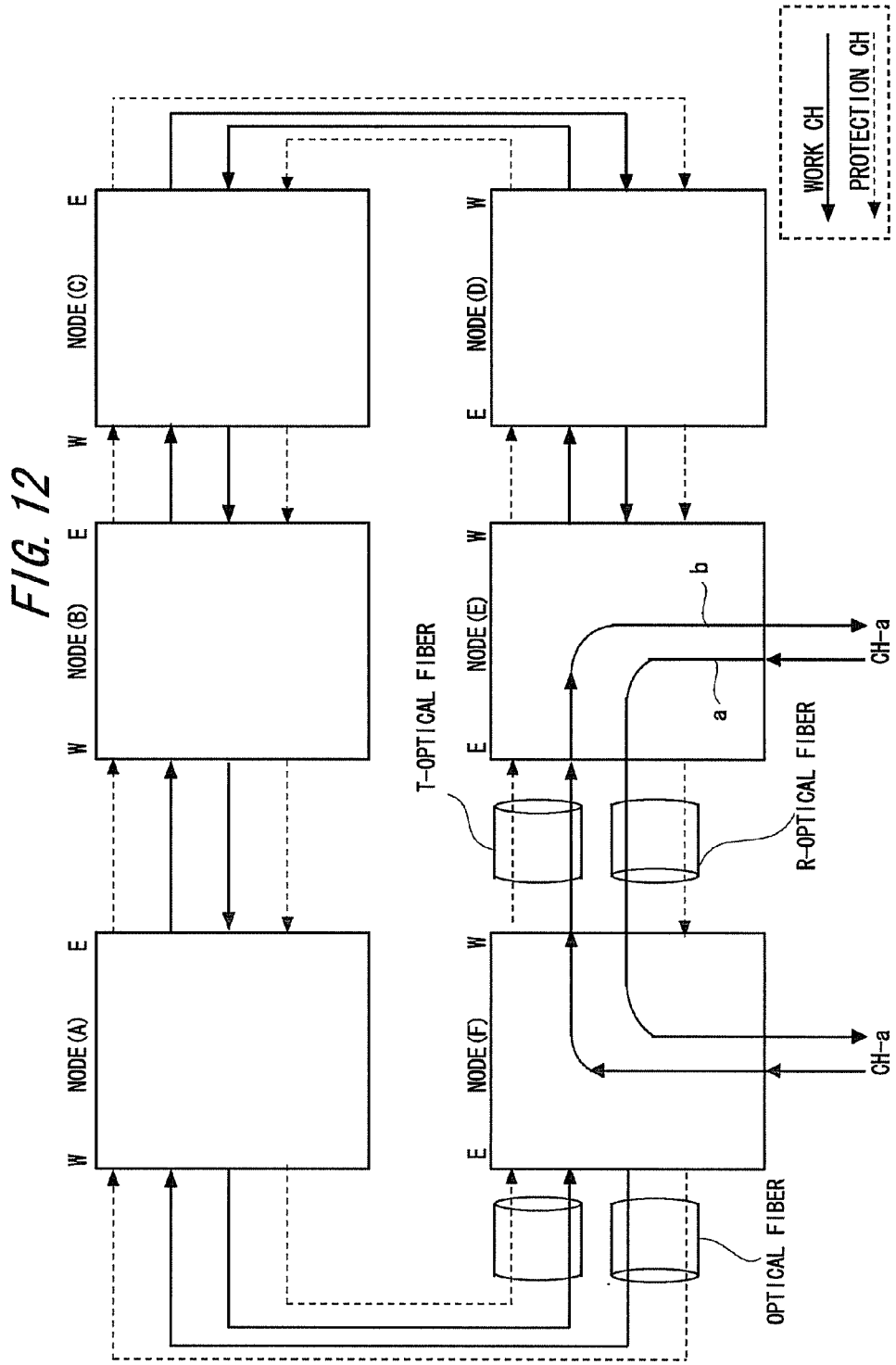
FIG. 12 illustrates how a network illustrated in FIG. 11 normally looks.
Figure 13:
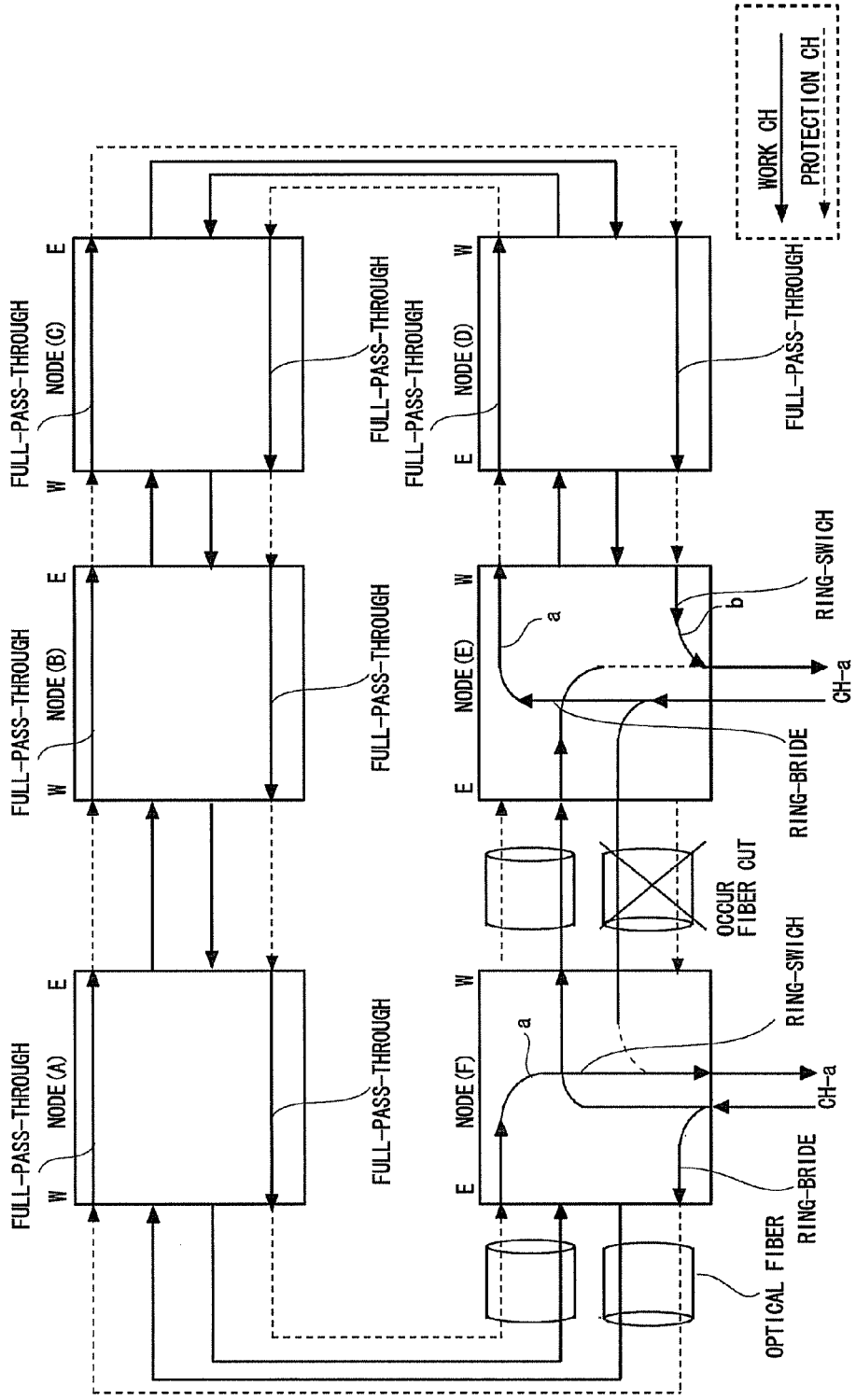
FIG. 13 illustrates how the network illustrated in FIG. 11 looks when a failure occurs.

In FIG. 12, a line using a channel "a" is set between the node E and the node F, a signal a is transmitted from the node E to the node F, and a signal b is transmitted from the node F to the node E. Assume that the optical fiber that transmits the signal a from the node E to the node F is thereafter broken, causing a line fault between the node E and the node F as illustrated in FIG. 13. In this case, alarm information is detected in the node E and, through bridge operation by a ring bridge based on the alarm information, the signal a input to the channel "a" of the node E is sent to the East-side WK line (WK line (E)) and the West-side PT line (PT line (W)) both. The nodes D, C, B, and A enter a state called full pass-through in which the signal a from the node E is let pass. The signal a thus reaches the node F. In the node F, a switch from the WK line (W) to the PT line (E) is made by a ring switch, so that the signal a from the node E is connected to the transmission-side channel "a".

Upon detection of the alarm information, the node F undergoes bridge operation by a ring bridge, with the result that the signal b inserted to the channel "a" is sent to the WK line (W) and the PT line (E) both. The signal b sent to the PT line passes through the nodes A, B, C, and D and reaches the node E. In the node E, the chosen line is switched from the WK line (E) to the PT line (W) by a ring switch, so that the signal b from the node F is connected to the reception side (for example, client side) of the channel "a".

Figure 14:
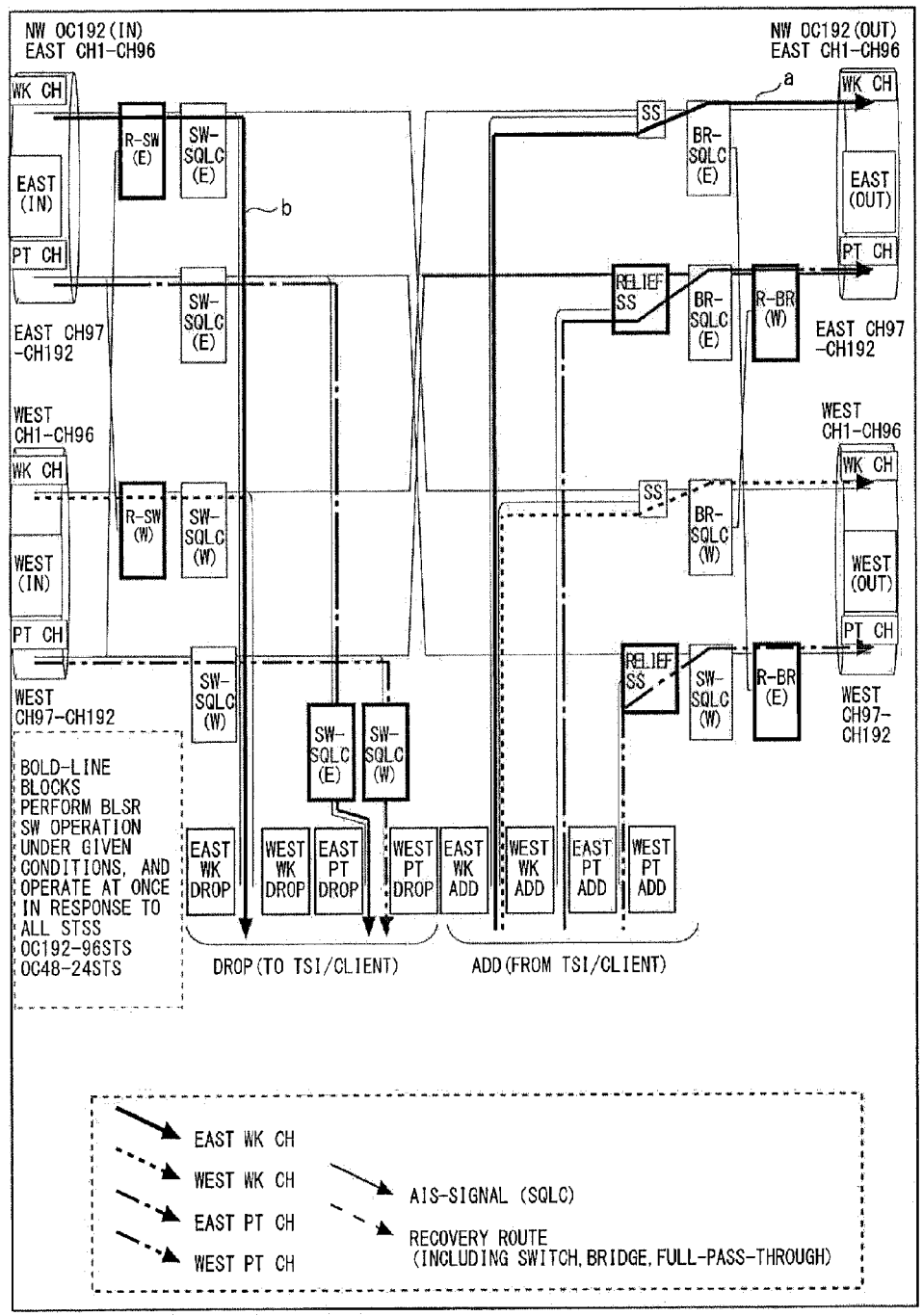
FIG. 14 illustrates a configuration of a protection switch circuit of a node illustrated in FIG. 12.

The node E of FIGS. 12 and 13 logically has a protection switch circuit configuration as the one illustrated in FIG. 14. When there is no failure, the signal a inserted (added) in the node E is sent to the WK line (E) as in FIG. 12, and the signal b received from the WK line (E) is dropped, for example, on the client side.

Figure 15:
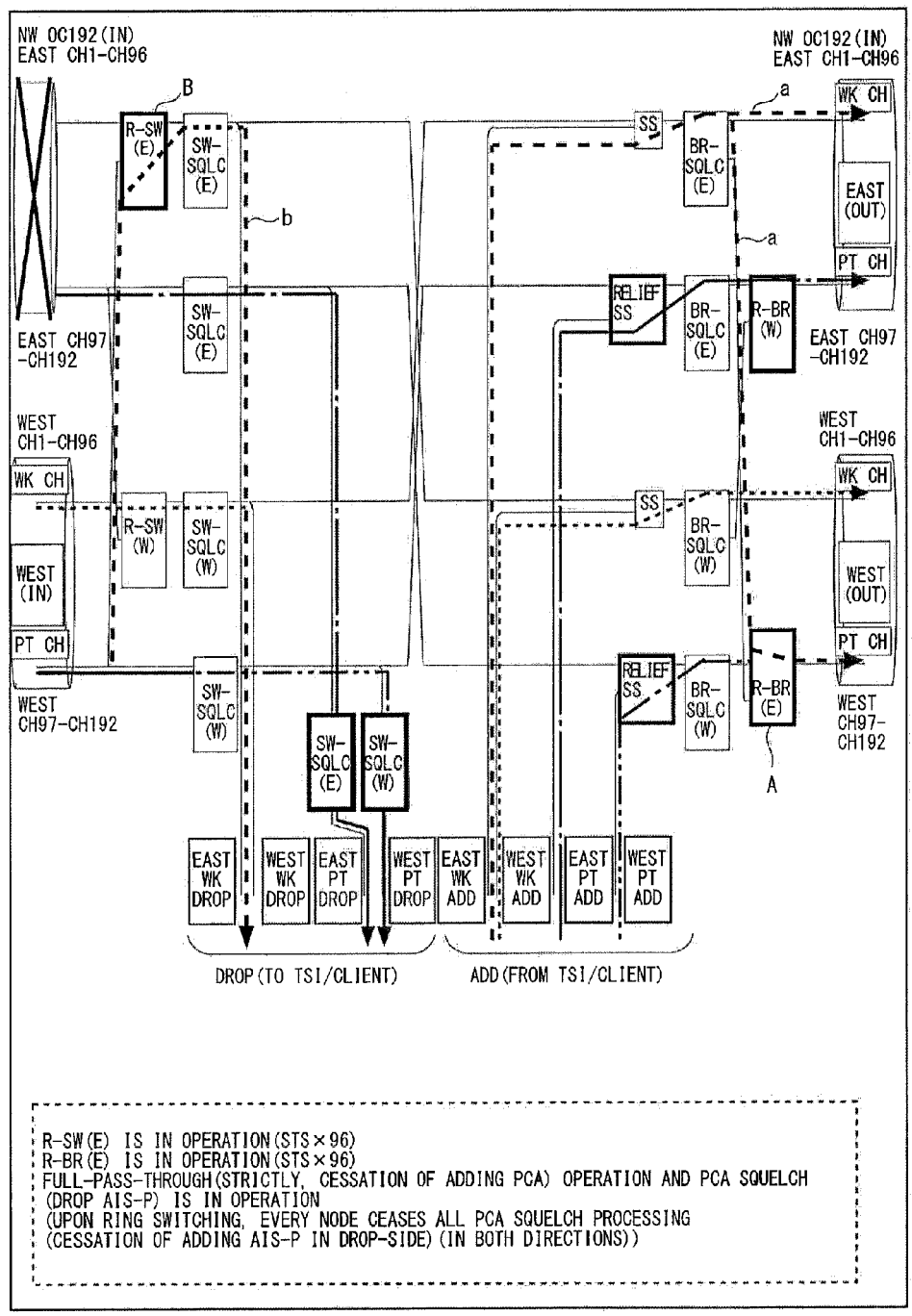
FIG. 15 illustrates a configuration of a protection switch circuit of a failure detection node illustrated in FIG. 12.

If the line fault illustrated in FIG. 13 subsequently occurs, an INF unit in the node E that accommodates the channel "a" detects a line alarm or a path alarm. Then a state illustrated in FIG. 15 is created in which the signal a is sent to the PT line (W) as well through bridge operation by a ring bridge A. An East-side ring switch B, on the other hand, chooses the PT line (W) and the signal b from the PT line (W) is dropped on the client side.

Figure 16:
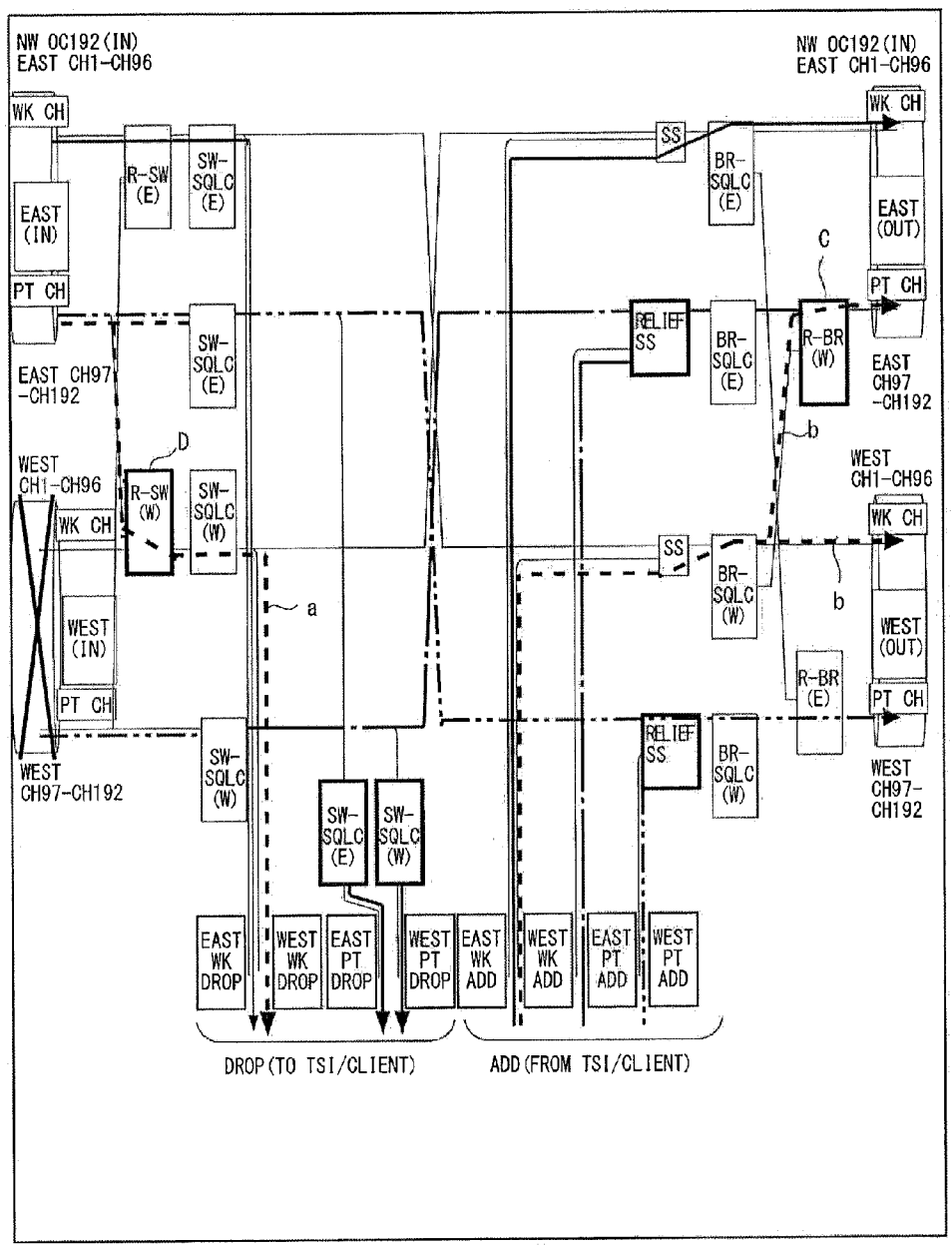
FIG. 16 illustrates a configuration of a protection switch circuit of a failure detection node illustrated in FIG. 13.

Upon failure, the node F undergoes bridge operation by an East-side ring bridge C as illustrated in FIG. 16, with the result that the signal b is sent to the East-side PT line as well. A West-side ring switch D, on the other hand, makes a switch so that the East-side PT line is chosen, and the signal a received from this PT line is dropped.

Figure 17:
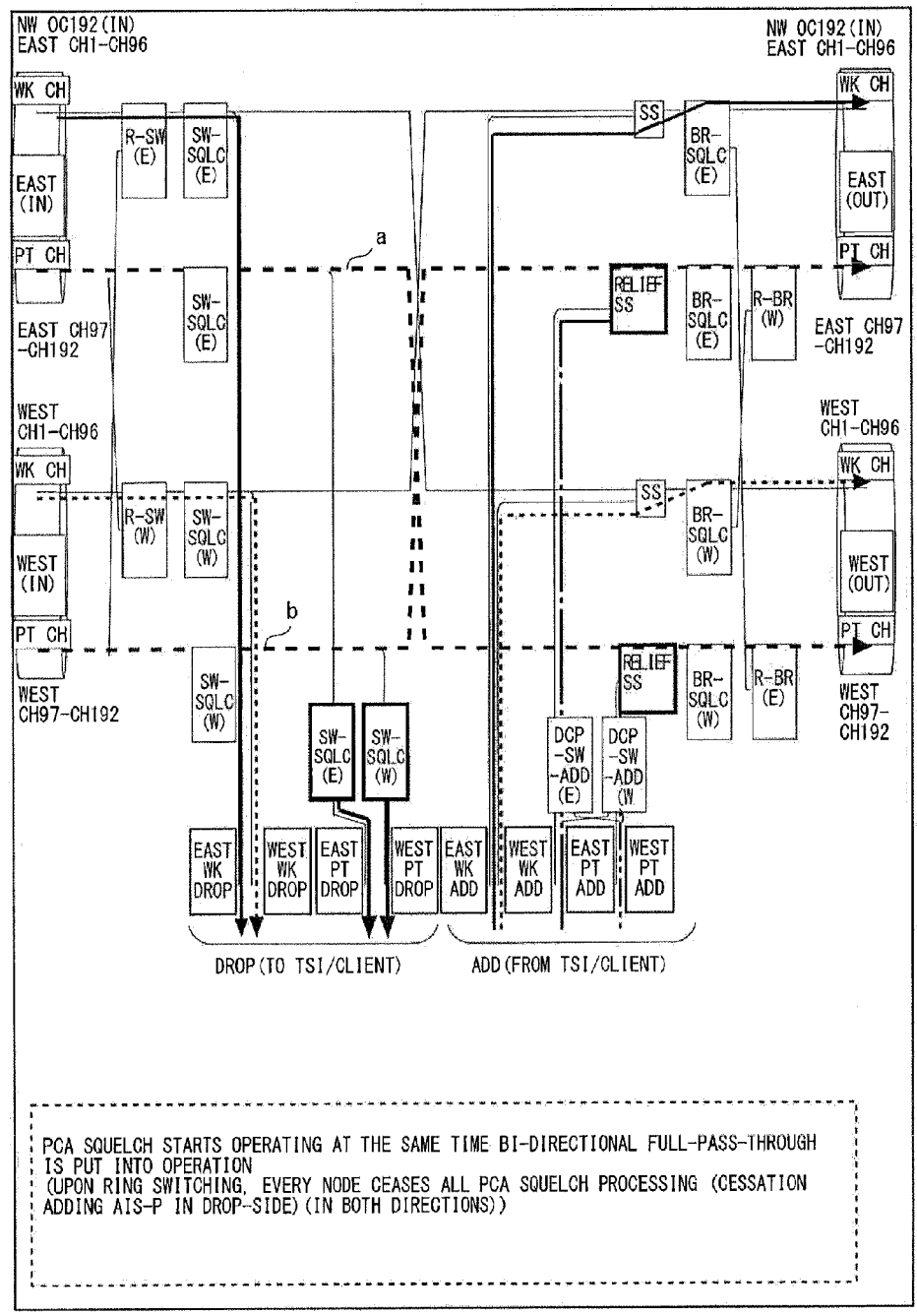
FIG. 17 illustrates a configuration of protection switch circuits of the failure detection nodes illustrated in FIG. 12 and FIG. 13.

When the failure occurs, the other nodes A, B, C, and D act as full pass-through nodes and let signals from the East-side and West-side PT lines pass to the West side and the East side as illustrated in FIG. 17.

A circuit configuration that uses real signals to control the operation illustrated in FIGS. 14 to 17 requires an expensive, dedicated ASIC. Accordingly, the VSSC unit 106 (133) is put to performing pseudo-logical calculus for the operation described above.

The logic circuit which performs through 2F-BLSR the protection switch operation (bridges and switches) illustrated in FIGS. 14 to 17 is incorporated in the VSSC unit 106. The operation of the ring bridges and the ring switches here can be configured as that of a so-called "2:1 selector." This keeps the logic scale from increasing. Also, being of serial logic, the operation is controlled with a serial signal. The operation can therefore be implemented by a low-speed logic circuit.

A result of the pseudo-calculation (TSI ACM data) performed in the VSSC unit 206 is distributed among all INF units that constitute the SONET transmission apparatus 100 to be written in each TSI unit 105. The TSI units 105 in all INF units execute TSI processing in accordance with the ACM data concurrently in synchronization with one another. The TSI units 105 thus implement the above-mentioned operation as a ring bridge and a ring switch. Outwardly, however, it seems as though utterly normal 2F-BLSR protection switch is in effect.

Figure 18:
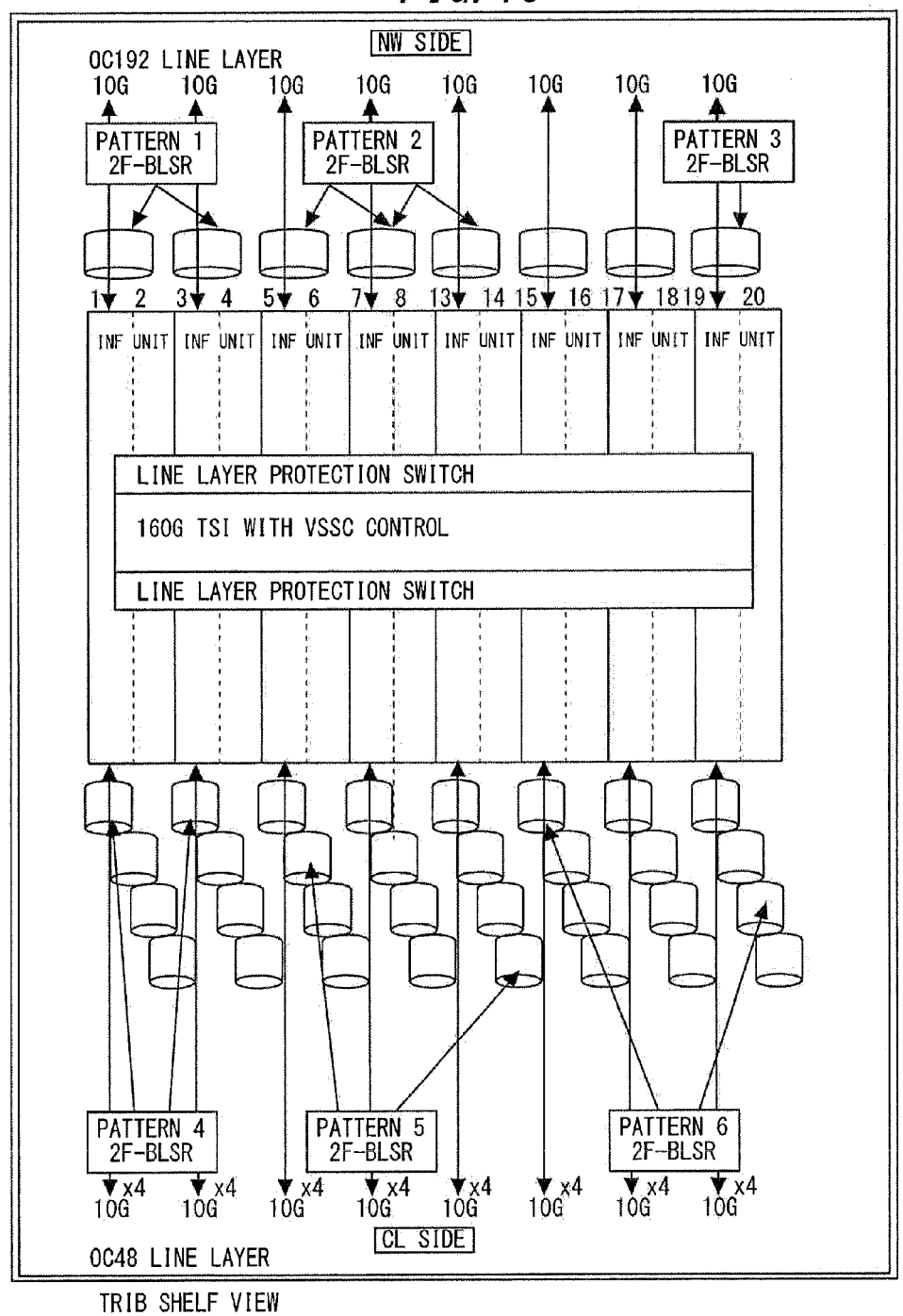
FIG. 18 illustrates a shelf view image observed when a SONET transmission apparatus with a 160 G capacity supports 2F-BLSR.

FIG. 18 illustrates a shelf view image observed when the SONET transmission apparatus 100 of a 160 G capacity supports 2F-BLSR. Because the BWB connects all INF units by mesh connection, any combination of INF units can be defined as a 2F-BLSR group, which means that an APS CPU mounted in any INF unit can be used for control. FIG. 18 illustrates as an example six combination patterns.

Application Example 2

An example of applying the SONET transmission apparatus 100 of this embodiment to 4F-BLSR is described next.

Figure 19:
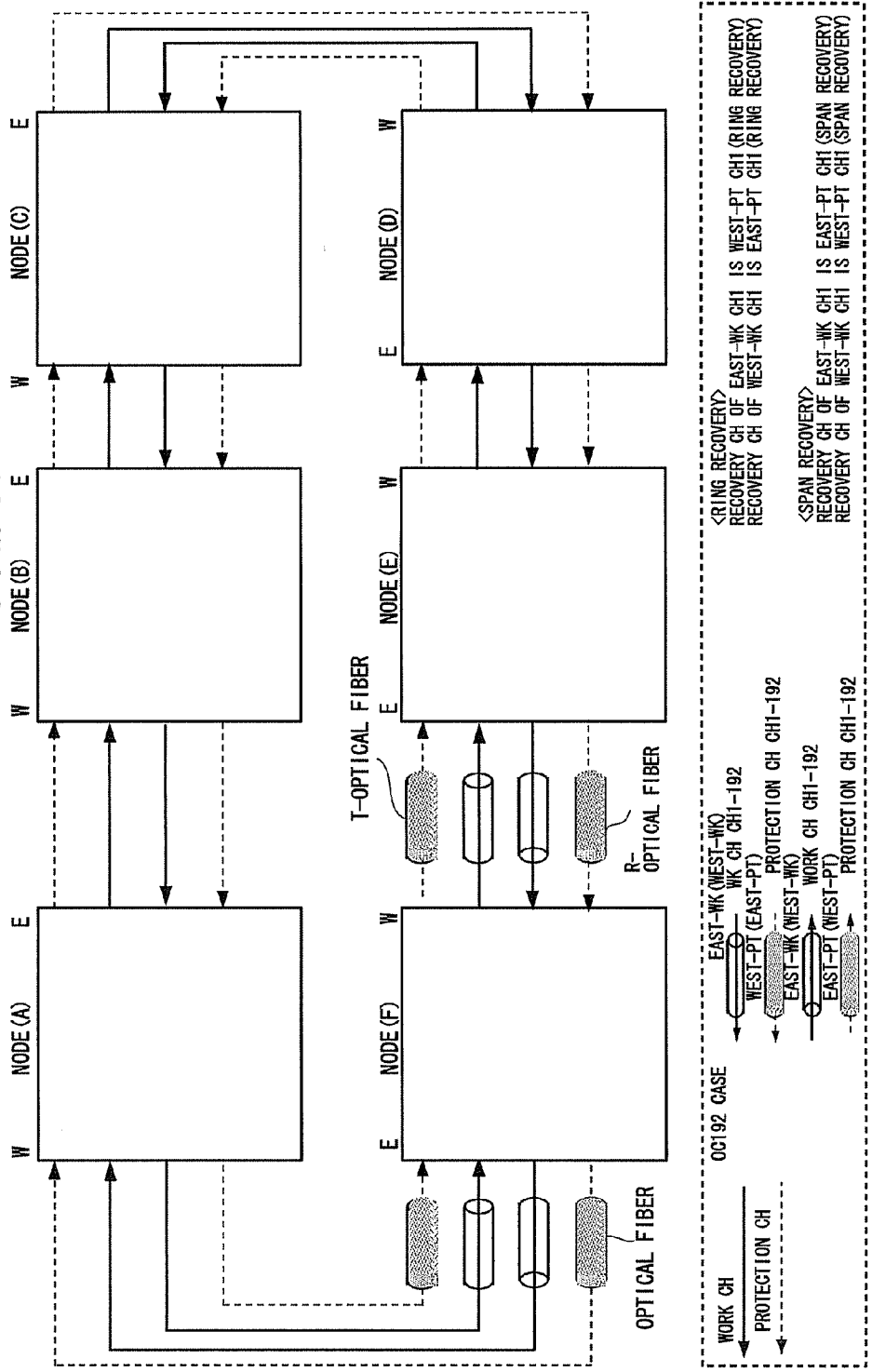
FIG. 19 illustrates a basic configuration example of 4F-BLSR.

FIG. 19 is a basic configuration example of 4F-BLSR. In the 4F-BLSR, a ring is formed from four optical fibers, and two WK lines (East, West) and two PT lines (East, West) are prepared.

Figure 20:
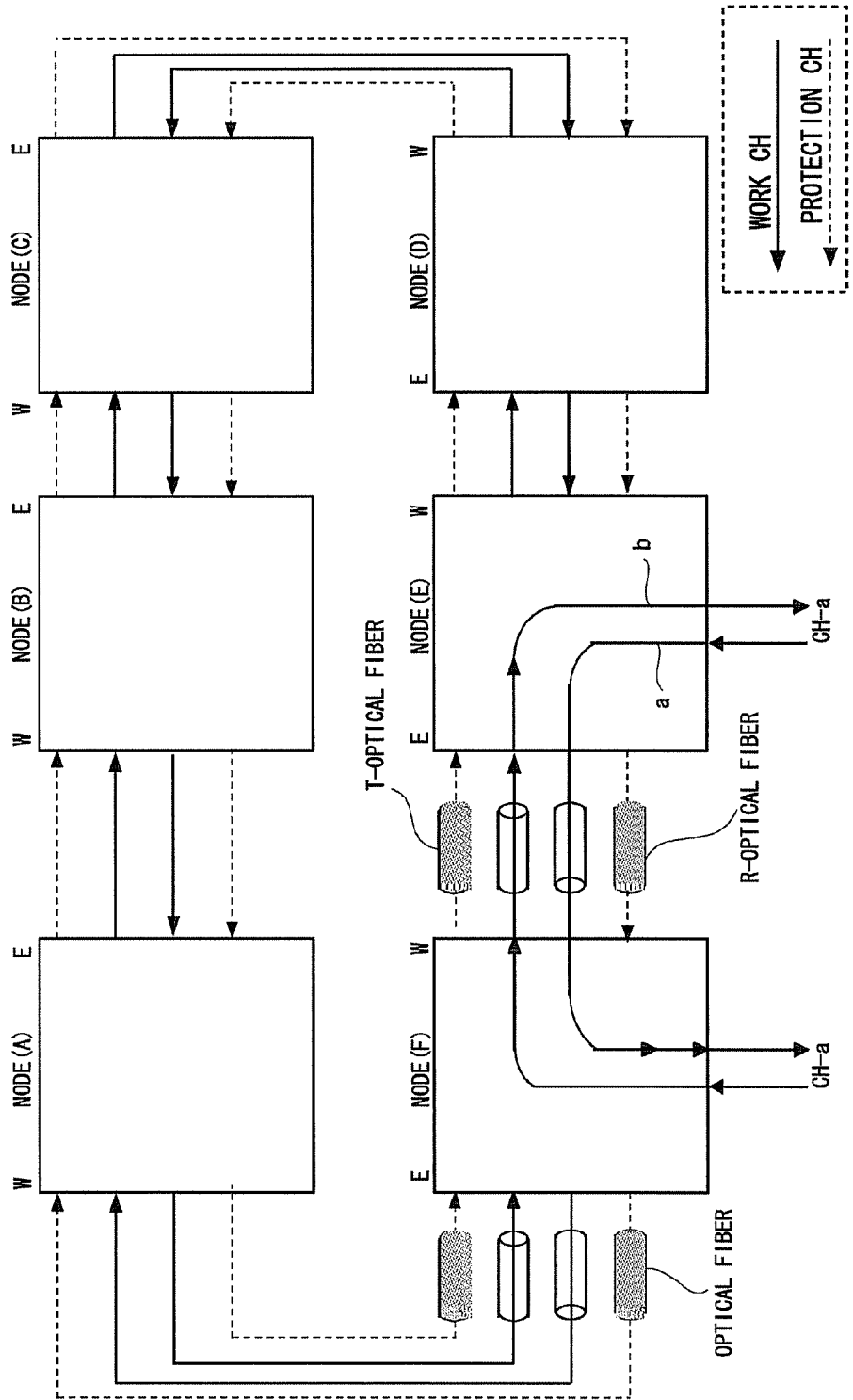
FIG. 20 illustrates how a network illustrated in FIG. 19 looks before a failure occurs.

FIG. 20 illustrates a state before a failure occurs. In the example of FIG. 20, the signal a inserted from the node E travels through the WK line (E) of the channel "a" to the node F, where the signal a is dropped, and the signal b inserted from the node F travels through the WK line (W) of the channel "a" to the node E, where the signal b is dropped.

Figure 21:
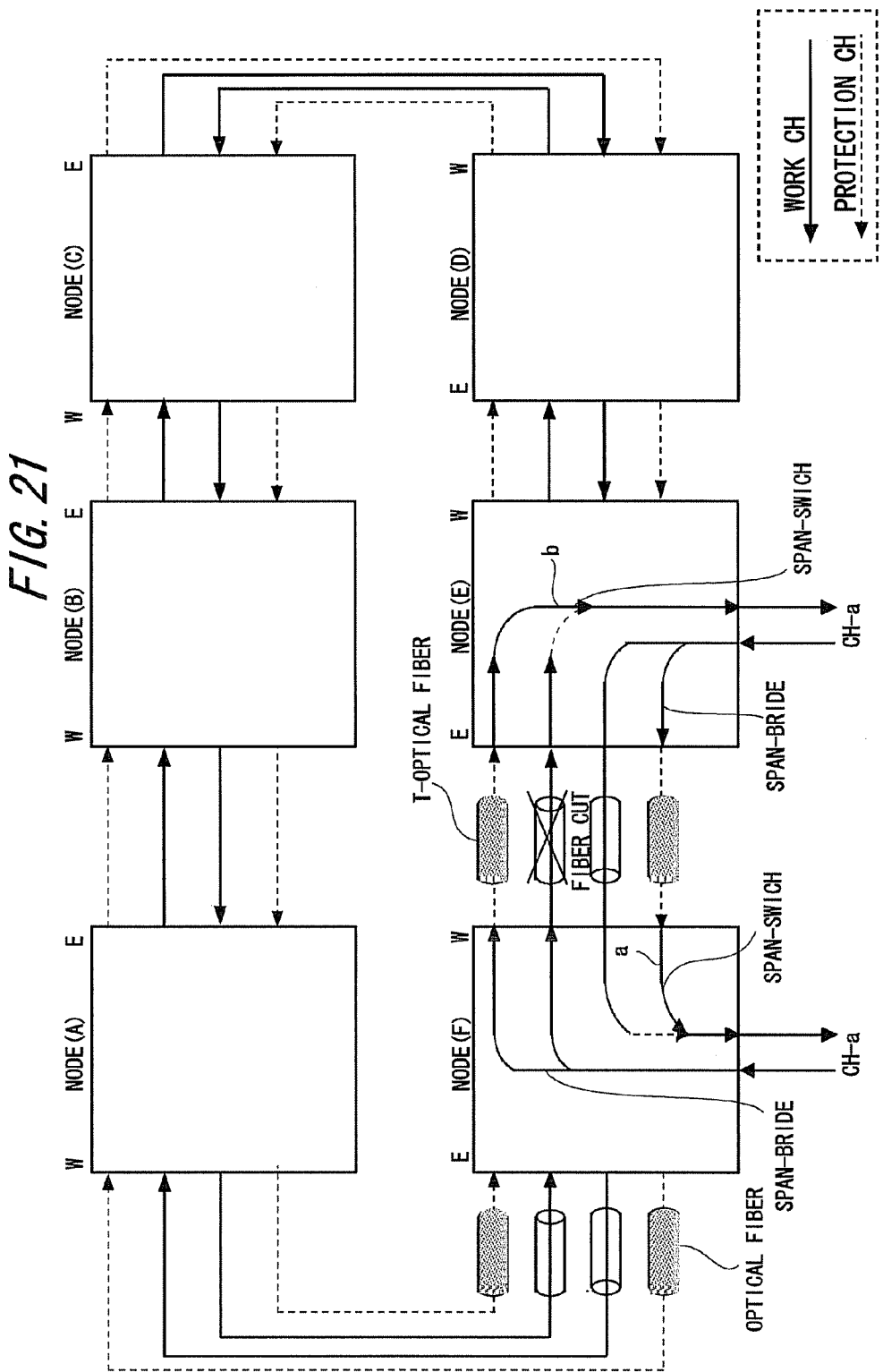
FIG. 21 illustrates how span recovery is executed in the network illustrated in FIG. 19.

FIG. 21 illustrates how span recovery is executed when the optical fiber of the WK line (W) is broken between the node F and the node E and a failure occurs in the state illustrated in FIG. 20. In this case, in the node E, a span bridge is put into operation upon detection of alarm information to send the signal a to the WK line (E) and the PT line (E) both. In the node F, on the other hand, a span switch switches the chosen line from the WK line (E) to the PT line (E). The signal a that has arrived from the node E is thus dropped in the node F.

Upon detection of the alarm information, a span bridge in the node F is put into operation to send the signal b to the WK line (W) and the PT line (W) both. On the other hand, a span switch in the node E switches the chosen line from the WK line (W) to the PT line (W). The signal b that has arrived from the node F is thus dropped in the node E. Span recovery between the node E and the node F is accomplished in this manner.

Figure 22:
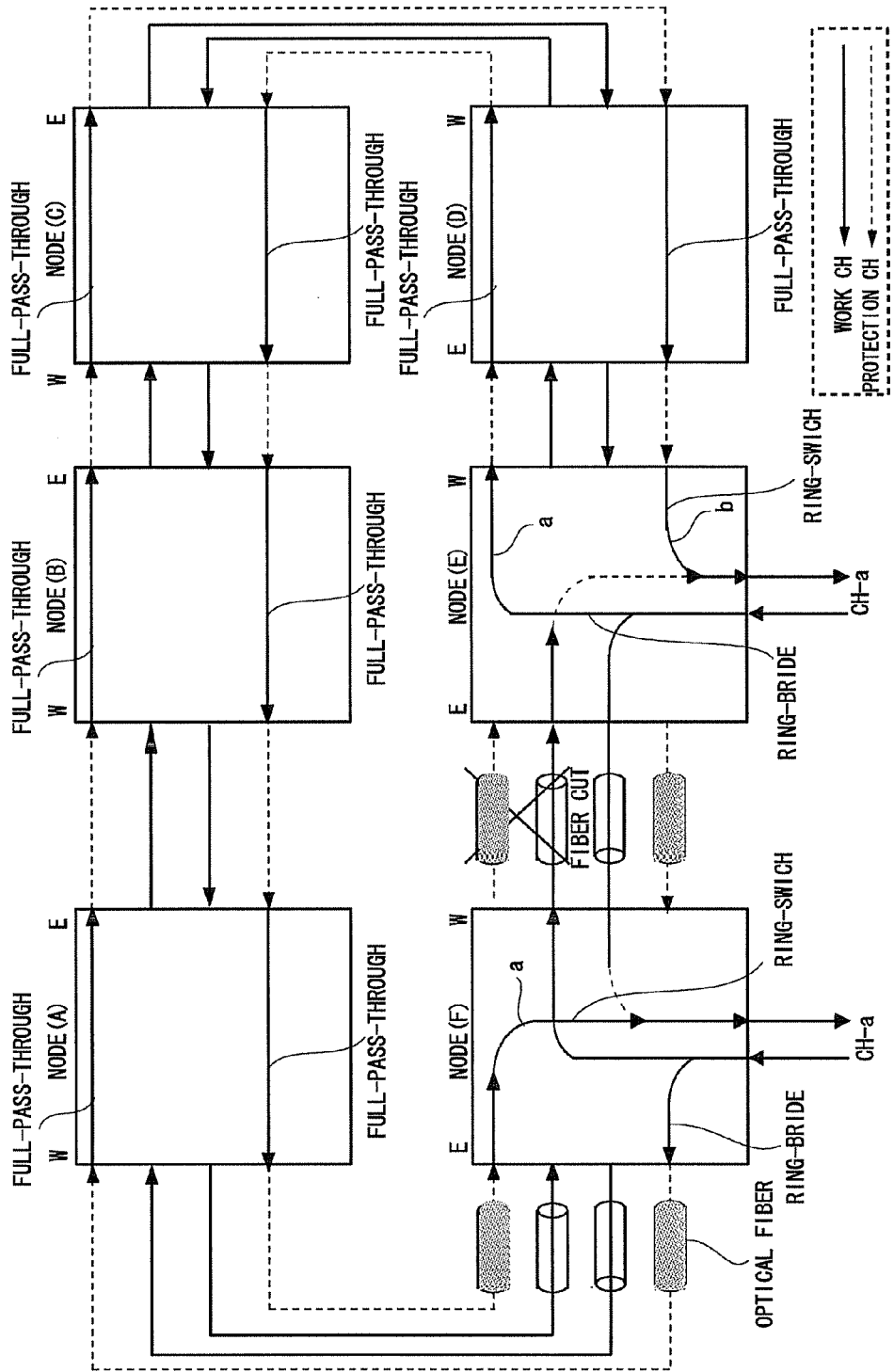
FIG. 22 illustrates how ring recovery is executed in the network illustrated in FIG. 19.

FIG. 22 illustrates how ring recovery is executed when fibers that serve as the WK line (E) and the PT line (E) from the viewpoint of the node E are both broken.

In this case, a ring bridge mounted in the node E performs bridge operation through which the signal a inserted to the channel "a" of the node E is sent to the WK line (E) and the PT line (W) both.

The nodes D, C, B, and A enter a full pass-through state and let the signal a from the node E pass. This allows the signal a from the node E to reach the node F. In the node F, a ring switch makes a switch from the WK line (W) to the PT line (E), so that the signal a from the node E is connected to the transmission-side channel "a".

A rink bridge in the node F performs bridge operation through which an input signal from the channel "a" is sent to the WK line (W) and the PT line (E) both. The signal b sent to the PT line passes through the nodes A, B, C, and D and reaches the node E. In the node E, a ring switch switches the chosen line from the WK line (E) to the PT line (W), and the signal b from the node F is dropped on the client side of the channel "a".

Figure 23:
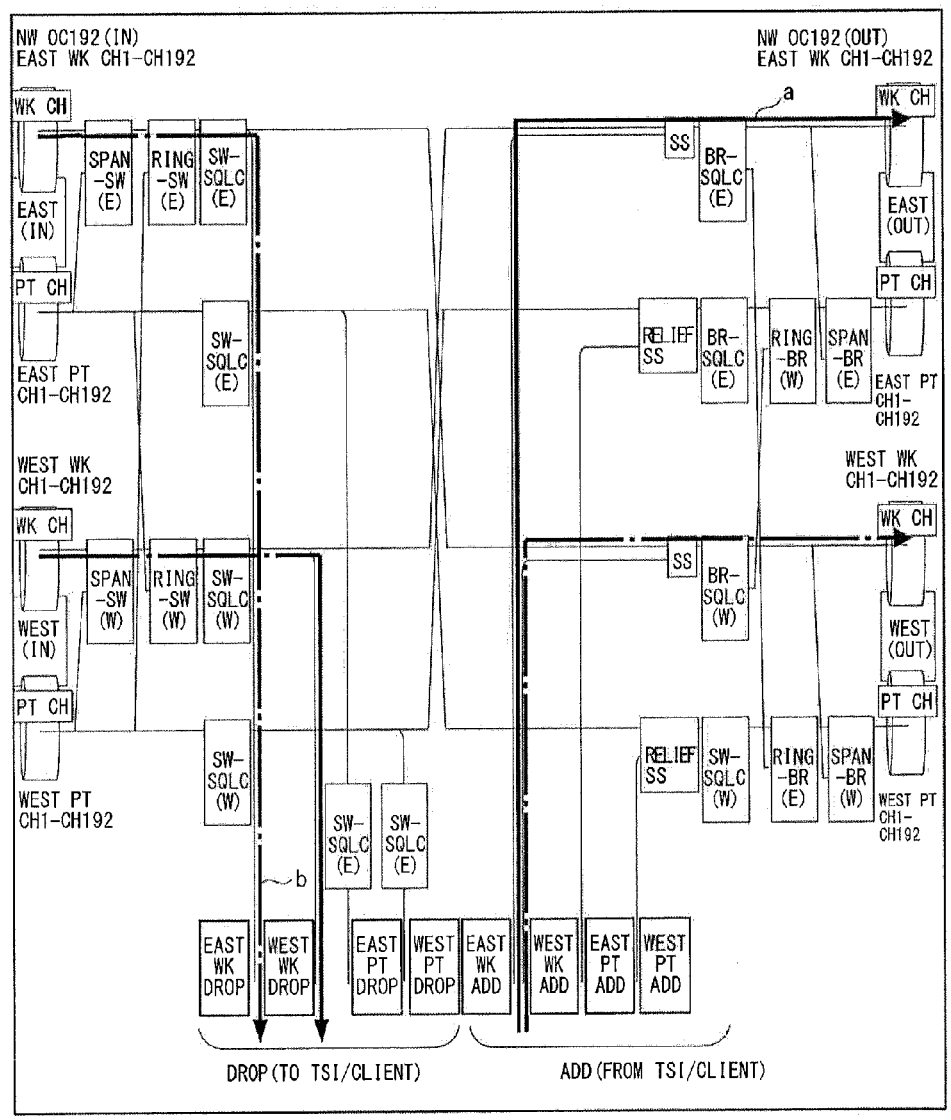
FIG. 23 illustrates a circuit configuration example for implementing 4F-BLSR of nodes illustrated in FIG. 19.

The node E of FIG. 20 logically has a protection switch circuit configuration as the one illustrated in FIG. 23. When there is no failure, the signal a inserted (added) in the node E is sent to the WK line (E) as illustrated in FIG. 23. Further, in the node E, the signal b received from the WK line (E) is dropped.

Figure 24:
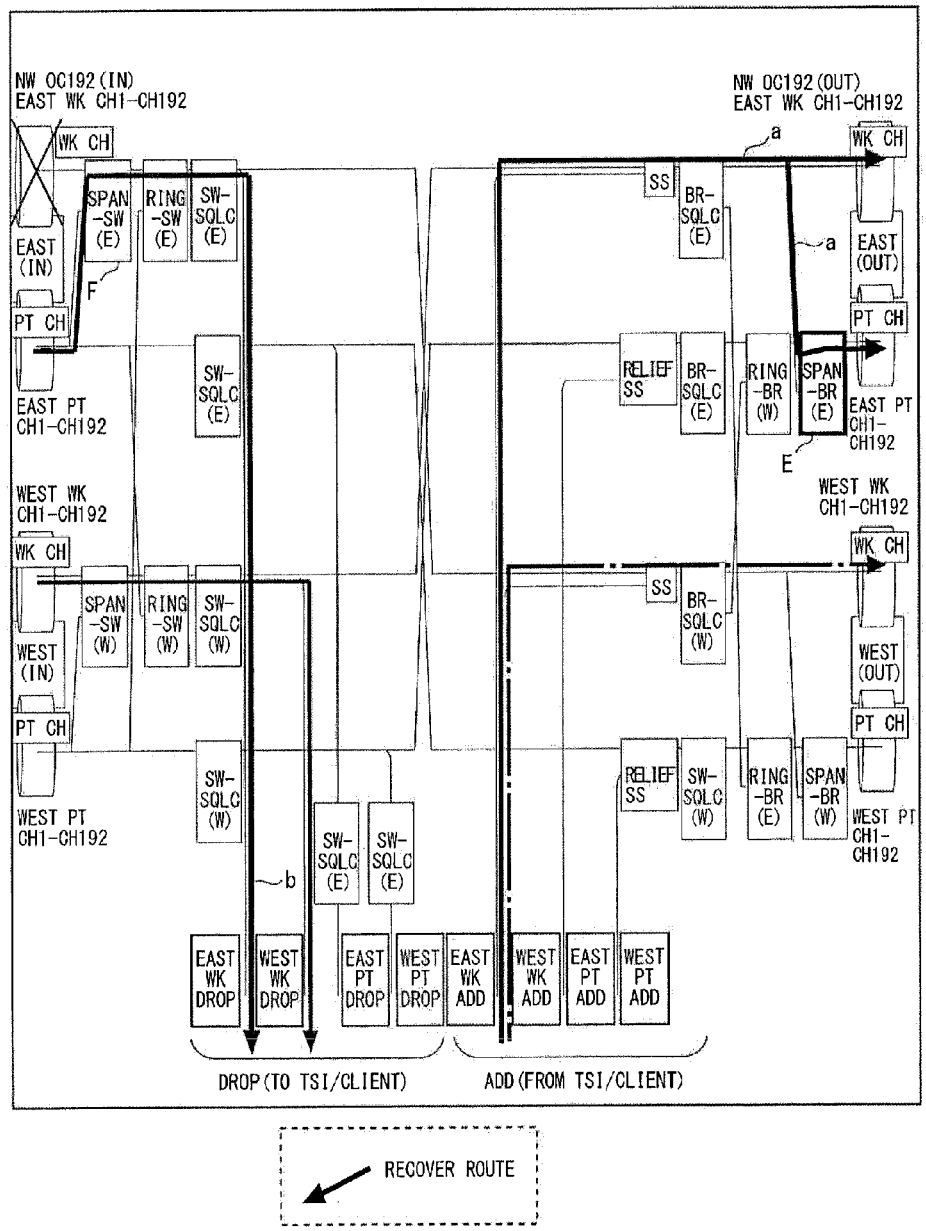
FIG. 24 illustrates how span recovery is executed in the circuit configuration illustrated in FIG. 23.
Figure 25:
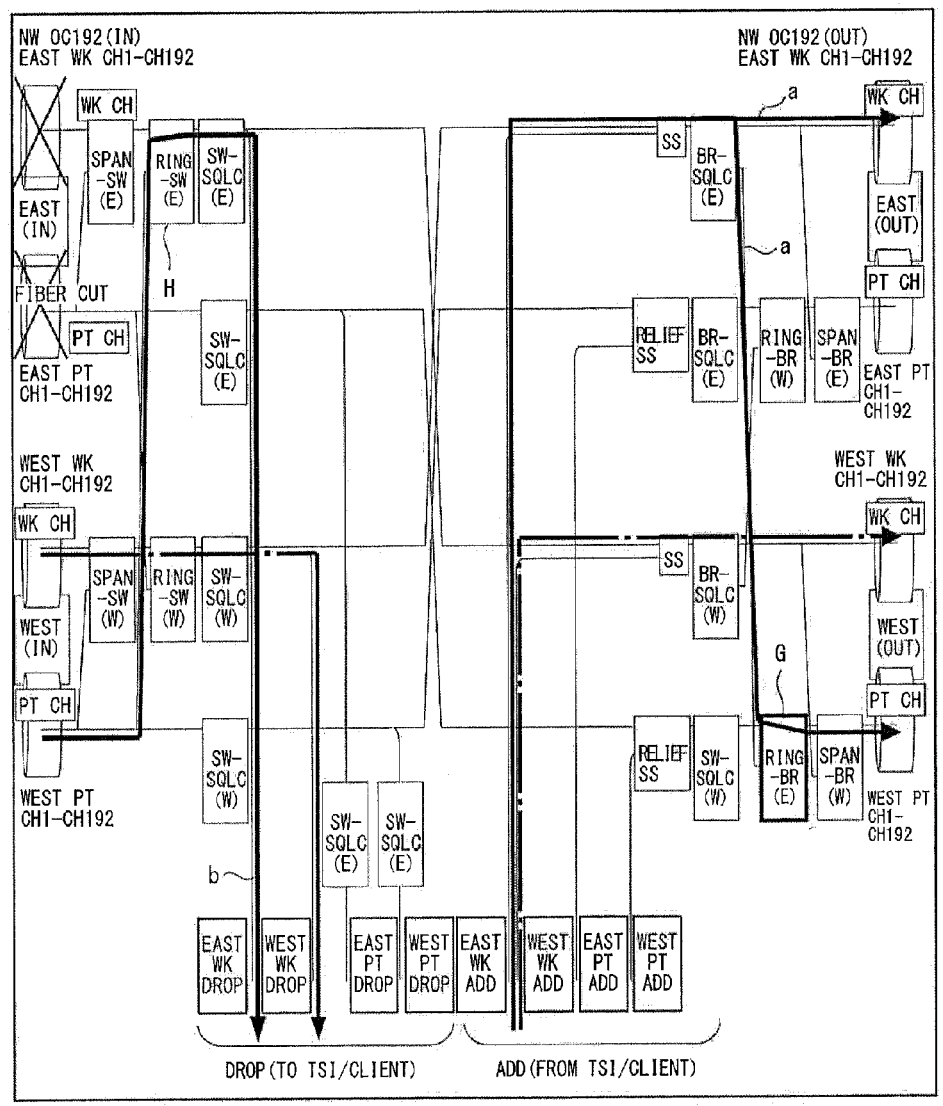
FIG. 25 illustrates how ring recovery is executed in the circuit configuration illustrated in FIG. 23.

If the fault illustrated in FIG. 21 subsequently occurs, an INF unit in the node E that accommodates the channel "a" detects a line alarm or a path alarm. Then a state illustrated in FIG. 24 is created in which the signal a is sent to the WK line (E) and the PT line (W) as well through bridge operation by a span bridge E. An East-side span switch F, on the other hand, chooses the PT line (E) and the signal b from the PT line (E) is dropped.

In the case where a failure as the one illustrated in FIG. 22 occurs, on the other hand, a ring bridge G puts the node E into a state in which the signal a is sent to the WK line (E) and the PT line (W) both. On the other hand, a ring switch H causes the node E to choose and drop the signal b from the PT line (W).

When the failure occurs, the other nodes A, B, C, and D act as full pass-through nodes and let signals from the East-side and West-side PT lines pass to the West side and the East side.

A circuit configuration that uses real signals to control the operation of 4F-BLSR described above requires an expensive, dedicated ASIC. Accordingly, the VSSC unit 106 (133) is put to performing pseudo-logical calculus for the operation described above.

The logic circuit which performs through 4F-BLSR the protection switch operation (span bridges, span switches, ring bridges, and ring switches) as illustrated in FIG. 23 is incorporated in the VSSC unit 106. The operation of the bridges and the switches here can be configured as that of a so-called "2:1 selector." This keeps the logic scale from increasing. Also, being of serial logic, the operation is controlled with a serial signal. The operation can therefore be implemented by a low-speed logic circuit.

In the SONET transmission apparatus 100, a result of the logical calculus of the 4F-BLSR by the VSSC unit 106 is sent to each INF unit 101 as dynamic information. TSI information set in the TSI switch unit 105 of each INF unit 101 is changed to reflect this logical calculus result, and the change is made in all INF units 101 concurrently in synchronization with one another. Span recovery or ring recovery of 4F-BLSR is thus accomplished. Outwardly, it seems as though utterly normal 4F-BLSR protection switch is in effect.

Figure 26:
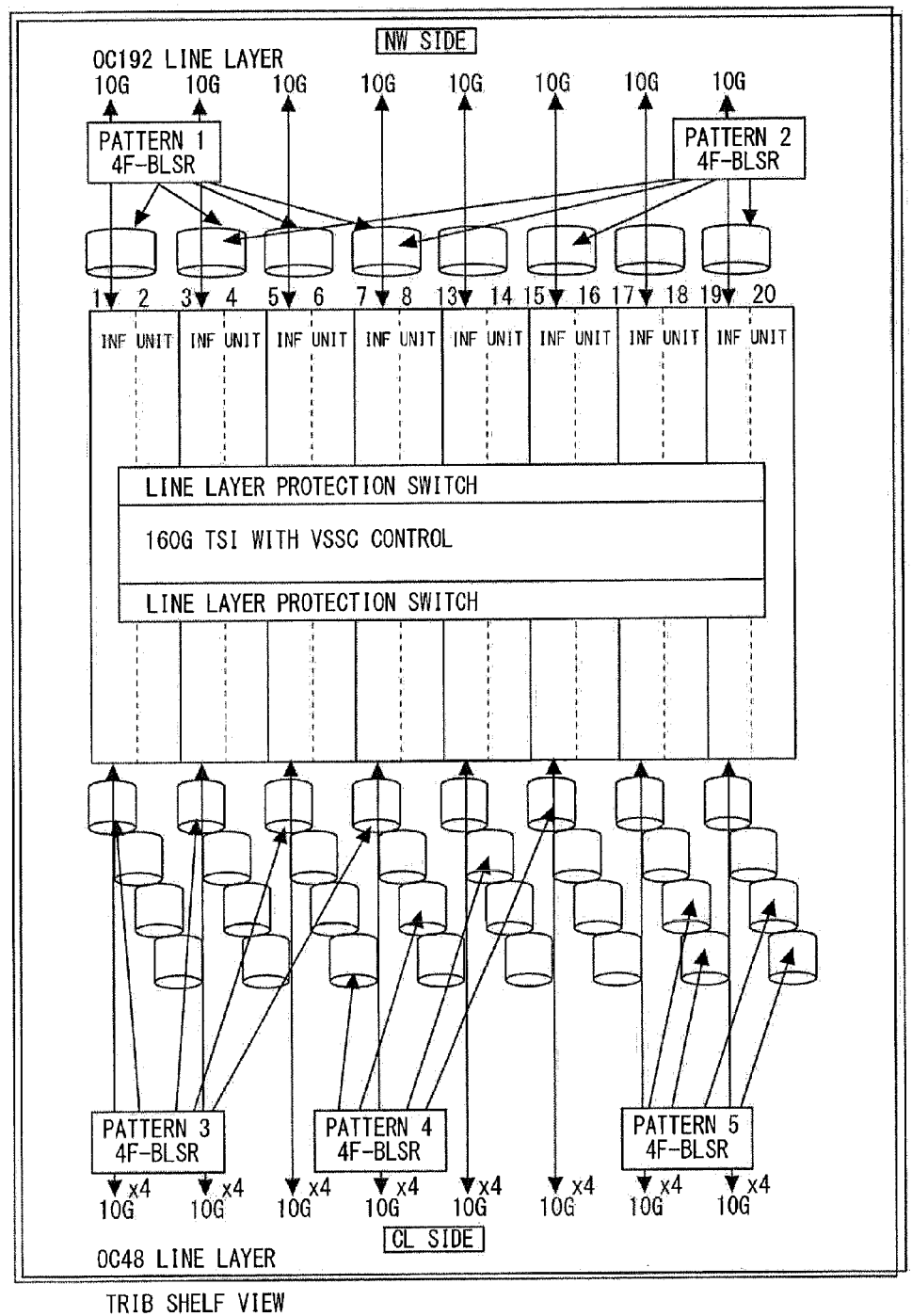
FIG. 26 illustrates a shelf view image observed when a SONET transmission apparatus supports 4F-BLSR.

FIG. 26 illustrates a shelf view image observed when the SONET transmission apparatus 100 of a 160 G capacity supports 4F-BLSR. Because the BWB 102 connects all INF units by mesh connection, any combination of INF units can be defined as a 4F-BLSR group, which means that an APS CPU mounted in any INF unit can be used for control. FIG. 26 illustrates as an example six combination patterns.

Pre-provisioning information for protection switch that is necessary for the 2F-BLSR/4F-BLSR described above is as follows.

The BLSR protection SW function described above can be implemented by concurrently putting "VSSC" logic and "distributed TSI settings" into operation in distributed INF units that are connected by mesh connection.

At that time, a trigger for the execution of switching control is determined from the result of a BLSR APS protocol and pre-provisioning information, which is created in advance.

In this embodiment, the BLSR APS and BLSR pre-provisioning information are shared among all INF units 101 with the use of "VSSC-Datalink" (BWB 102).

<1> Access to the BLSR APS (K1 or K2) Byte

GR-1230 lays down a protocol procedure for this, and its access method is defined here as "dynamic information" of "VSSC-Datalink," thereby enabling all INF units to recognize and set the information.

Basically, APS CPUs which process an APS protocol can be arranged freely. In BLSR, however, high-speed switching performance is required. The basic concept in a configuration where the BWB 102 connects a plurality of INF units 101 by mesh connection is therefore to accomplish high performance by providing an APS CPU in each INF unit 101 and distributing the processing performance through parallel processing.

<2> Sharing and Access to Pre-Provisioning Information

Pre-provisioning information necessary for BLSR is as follows (1) Node ID information In the case where the node ID of its own device is unknown, the APS protocol (APS CPU) cannot operate. This information is set in the SONET transmission apparatus (INF units) by the operation system (OPS) when a BLSR ring is built.

(2) Ring topology table information

The order in which the IDs of nodes within the ring are sorted is kept as a ring topology table. If ring topology information is unknown, a fault unit cannot be identified.

For example, in the network illustrated in FIG. 11, the node ID of the node F is "F(15)" and a ring topology (table) viewed from the node F is {F, E, D, C, B, A} from East to West.

All nodes can have a common ring topology table (ring topology table information) if activated by the OPS.

(3) SQLC table/RIP table

An SQLC table is relevant cross-connection information for finding out whether or not a cross-connect path is relevant to its own node. The SQLC table is used to determine whether to insert a signal AIS-P (SQLC: called squelch) to a channel (Ch) that mis-connects in the case of a double failure which occurs in separate units.

An RIP table is information about the primary node and secondary node of a Ch that is redundantly connected in connecting a BLSR ring, and information indicating which method out of dual transmit on protection channel (DTP) and drop and continue on protection channel (DCP) is used in giving the channel the redundancy.

The information is used by the secondary node or a terminal node (the original signal inserting node of the Ch) to determine operation when a failure occurs in the primary node (active Ch) in a ring connection.

For example, a squelch table viewed from the nodes in the ring network of FIG. 11 has "F" as a source (transmission source) ID, "E" as a destination ID, "EW (East→West)" as a direction (DIRN), "F" as another source ID, "E" as another destination ID, and "WE (West→East)" as another direction. The RIP table is substantially the same.

(4) The above-mentioned information (2) and information (3) are automatically updated by automatic provisional (autoprov.) processing as the need arises. Usually, the update is synchronized with the use of a free TOH area of SONET/SDH and a communication procedure.

Those pieces of pre-provisioning information are defined as static information in VSSC data link information.

The information described above can be shared among all INF units 100 via the BWB 102.

Figure 27:
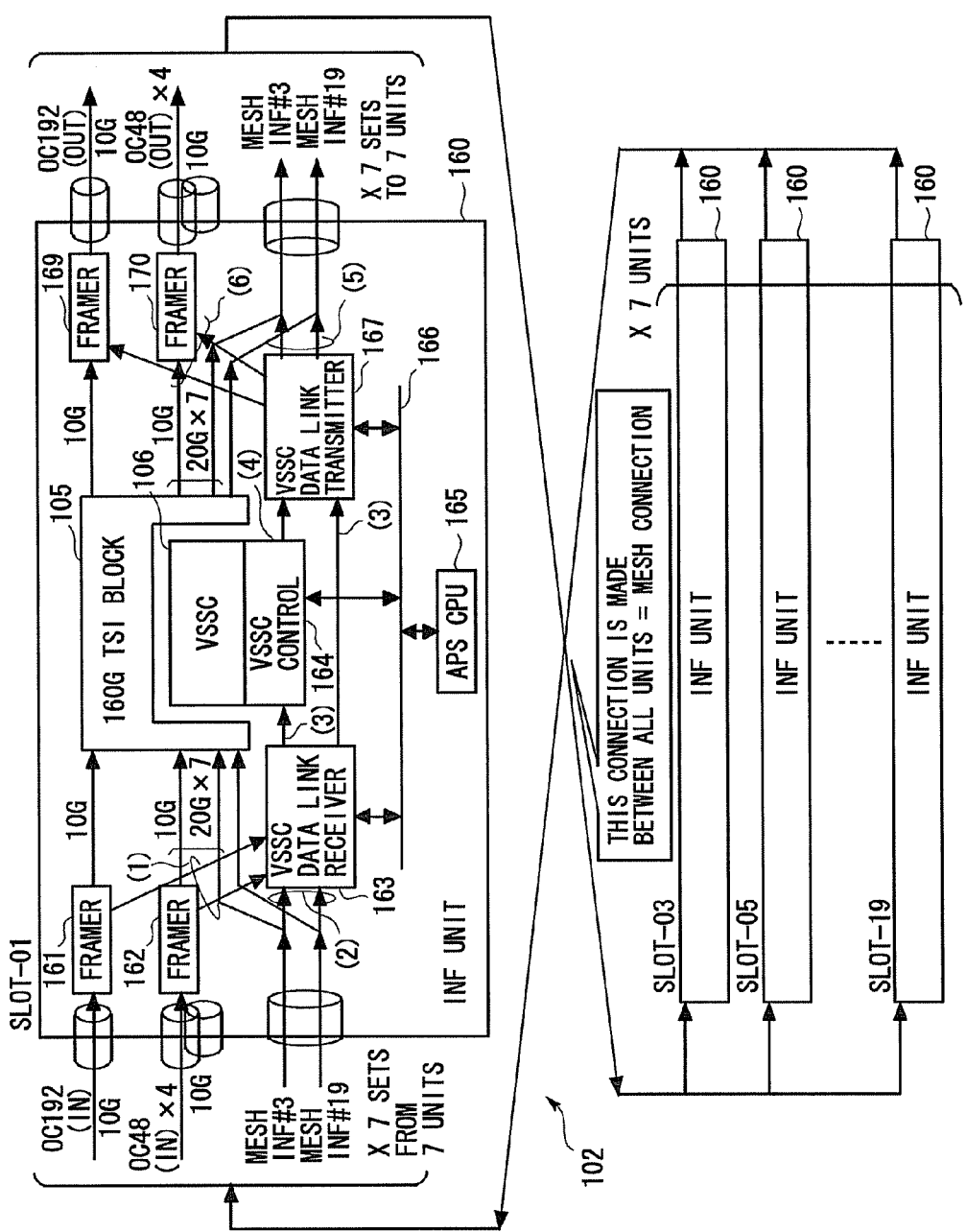
FIG. 27 illustrates a block image example of an INF unit that is observed when a BLSR is incorporated in a SONET transmission apparatus.

FIG. 27 illustrates an example of a block image observed when a BLSR is incorporated in the SONET transmission apparatus 100. Illustrated in FIG. 27 is a configuration example of INF units 160. In FIG. 27, main signal reception-side framer (OC192) 161 and framer (OC48) 162 receive and extract APS (K1 or K2 byte), ring topology generation OH, SQLC/RIP table generation OH from TOH of SONET/SDH, and hands over to a VSSC data link receiving unit 163 (FIG. 27 (1)).

The VSSC data link receiving unit 163 (corresponds to the static information receiving units 131 and the dynamic information receiving units 132 (FIG. 8)) also receives VSSC data link information (static information and dynamic information) that is sent from the other INF units 160 (seven other INF units 160) and received by the own INF unit via the BWB 102 (FIG. 27 (2)).

The VSSC data link receiving unit 163 hands over ring topology tables and SQCL/RIP tables generated by APS CPUs of the other INF units 160 to a VSSC control unit 164 as static information. When an APS CPU 165 of another INF unit 160 recognizes a switching trigger and sets APS information thereof in its own VSSC control unit 164, the VSSD data link receiving unit 163 receives the APS information as dynamic information from the BWB 102 and sets the APS information in the VSSC control unit 164 of the own INF unit (FIG. 27 (3)).

In order to transfer BLSR-related OH information (for example, APS (K1 or K2 byte)) that is received by itself to the other INF units 160 immediately with a given delay (e.g., a delay of one frame), the VSSC data link receiving unit 163 sends the OH information to a VSSC data link transmitting unit 167 (corresponds to the static information transmitting units 141' and the dynamic information transmitting units 142 (FIG. 8)) (FIG. 27 (3)).

In order to send a ring topology table and an SQLC/RIP table that are generated by the APS CPU 165 of the own INF unit 160 as static information to all the other INF units 160, the VSSC control unit 164 sends the static information to the VSSC data link transmitting unit 167 (FIG. 27 (4)).

The APS CPU 165 detects line alarm information or path alarm information to recognize a line/path switching trigger, and sets APS information in the VSSC control unit 164 via a system bus 166.

At this point, in order to send the set SPS SW information as dynamic information to all the other INF units 160, the VSSC control unit 164 sends this information to the VSSC data link transmitting unit 167 (FIG. 27 (4)).

The VSSC data link transmitting unit 167 sends VSSC data link information to the other INF units 160 by broadcasting (FIG. 27 (5)).

The send VSSC data link information is received via the BWB 102 by all the other INF units 160, and the processing described above is performed in the other INF units.

The VSSC data link transmitting unit 167 also generates APS relevant to the own INF unit, ring topology generation OH, and SQLC/RIP table generation OH to insert to transmission-side framers 169 and 170 (FIG. 27 (6)).

Application Example 3

Figure 28:
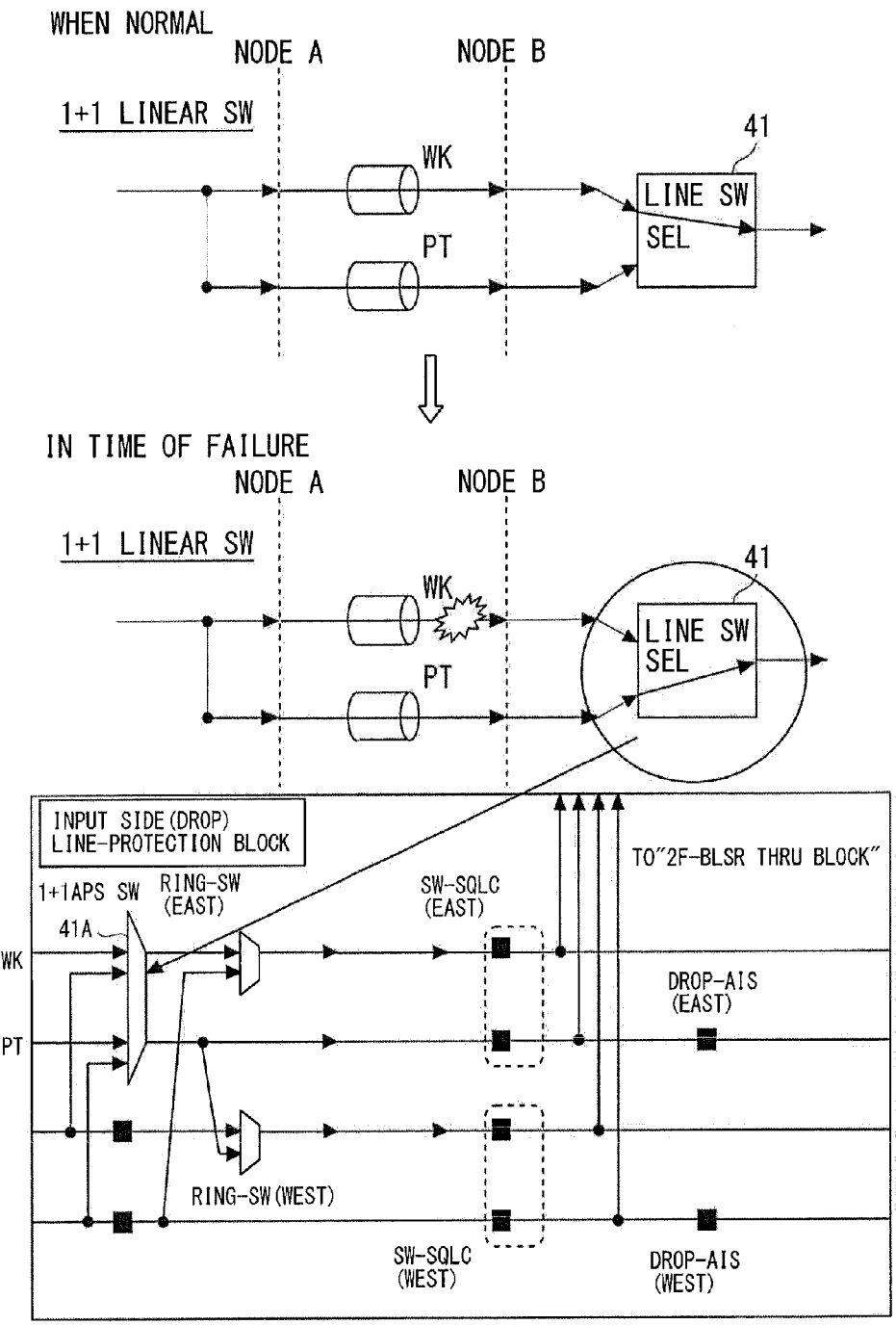
FIG. 28 illustrates a 1+1 linear automatic protection switching (1+1 APS LINE SW) configuration example.

FIG. 28 illustrates a configuration example of 1+1 linear automatic protection switching (1+1 APS line SW). In the 1+1 line switch configuration of FIG. 28, a signal is transmitted from the node A to the node B through both a working line (WK line) and a protection line (PT line). The node B includes a line switch selector (line SW SEL) 41 to choose one of the WL line and the PT line and output an input signal from the chosen side.

When the WK line is normal, the line switch selector 41 chooses and outputs a signal of the WK line. When a failure occurs along the WK line, on the other hand, the line switch selector 41 switches the chosen line from the WK line to the PT line and outputs a signal from the PT line.

This line switch selector 41 is incorporated as a line switch selector 41A in an input-side line protection block in the VSSC unit 133 (106) of FIG. 9. The VSSC unit 133 of an INF unit that has an input port for a signal of the WK line can thus figure out, through pseudo-logical calculus, switching operation of the line switch selector 41A suited to the failure in the WK line. A SONET transmission apparatus according to this embodiment accomplishes 1+1 APS line SW in this manner.

Two input ports can be selected arbitrarily from all INF units as input ports to which this 1+1 line switching is applied.

Application Example 4

Figure 29:
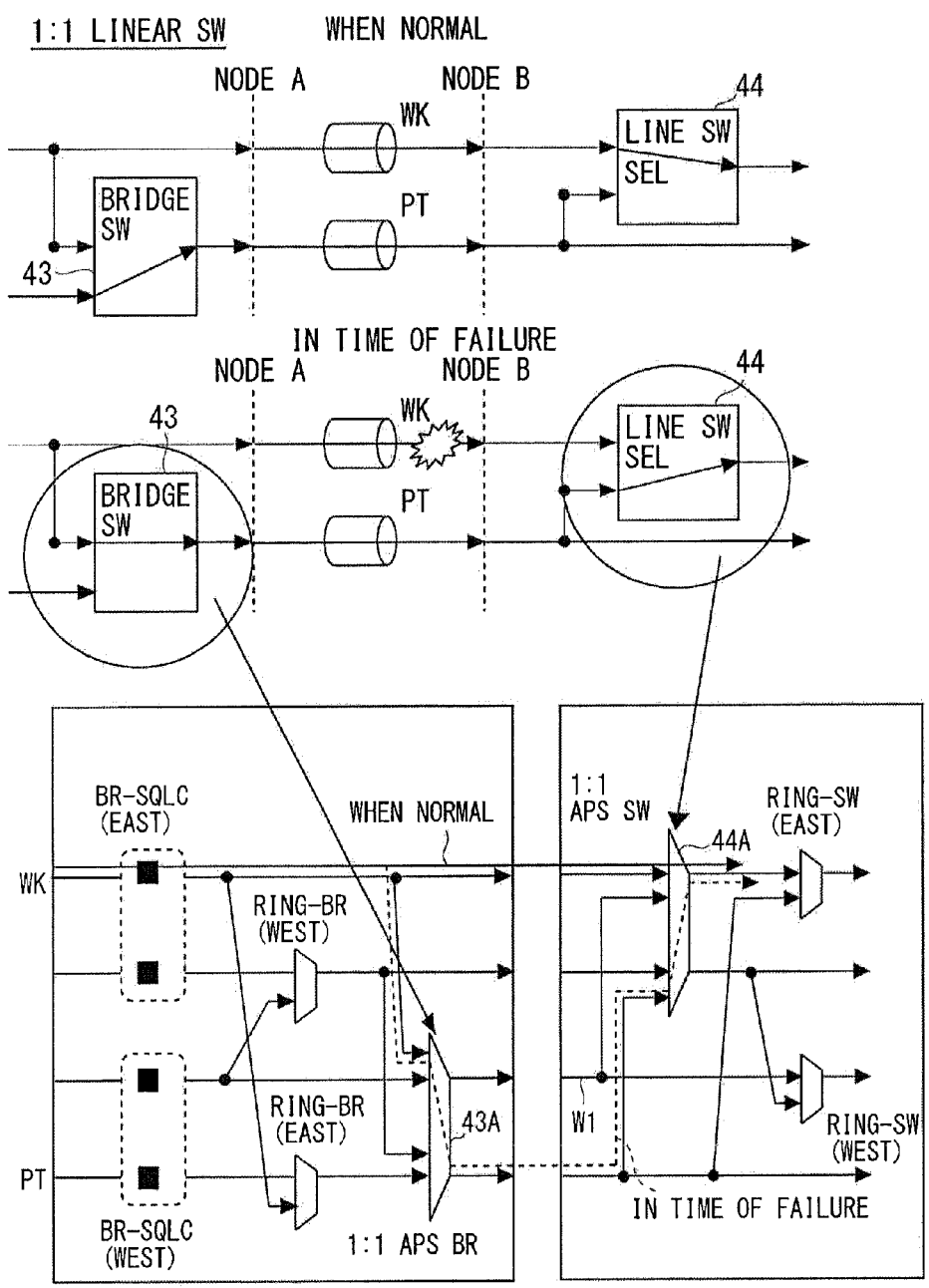
FIG. 29 illustrates a 1:1 linear automatic protection switching (1:1 APS LINE SW) configuration example.

FIG. 29 illustrates a configuration example of 1:1 linear automatic protection switching (1:1 APS line SW). A 1:1 line switch configuration is a line switch configuration in which the ratio of PT lines and WK lines is 1:1. In the 1:1 line switch configuration, a WK line and a PT line are provided between the node A and the node B, the node A includes a bridge switch 43, and the node B includes a line switch selector 44.

When the WK line is normal, the bridge switch 43 of the node A chooses the PT line side and a signal of the WK line side reaches the node B only through the WK line (the signal does not enter the PT line). In the node B, the line switch selector 44 chooses and outputs a signal of the WK line side.

When a failure occurs along the WK line, on the other hand, the bridge switch 43 performs switching operation to choose a signal of the WK line side. This causes the signal to be transmitted from the node A to the node B through the PT line. In the node B, the line switch selector 44 makes a switch to choose the signal of the PT line side, and outputs the signal from the PT line.

The bridge switch 43 described above is incorporated as a bridge switch 43A in an output-side line protection block in the VSSC unit 133 (106) of FIG. 9. The line switch selector 44 is incorporated as a line switch selector 44A in the input-side line protection block in the VSSC unit 133 (106).

The VSSC unit 133 of an INF unit that has an output port for the WK line can thus figure out, through pseudo-logical calculus, operation of the bridge switch 43A suited to the failure in the WK line. Also, the VSSC unit 133 of an INF unit that has input ports for the WK line and the PT line can figure out, through pseudo-logical calculus, operation of the line switch selector 44A suited to the failure in the WK line. An INF unit (SONET device) according to this embodiment accomplishes 1:1 APS line SW in this manner.

Two input ports can be selected arbitrarily from all INF units as input ports to which this 1+1 line switching is applied.

Application Example 5

Figure 30:
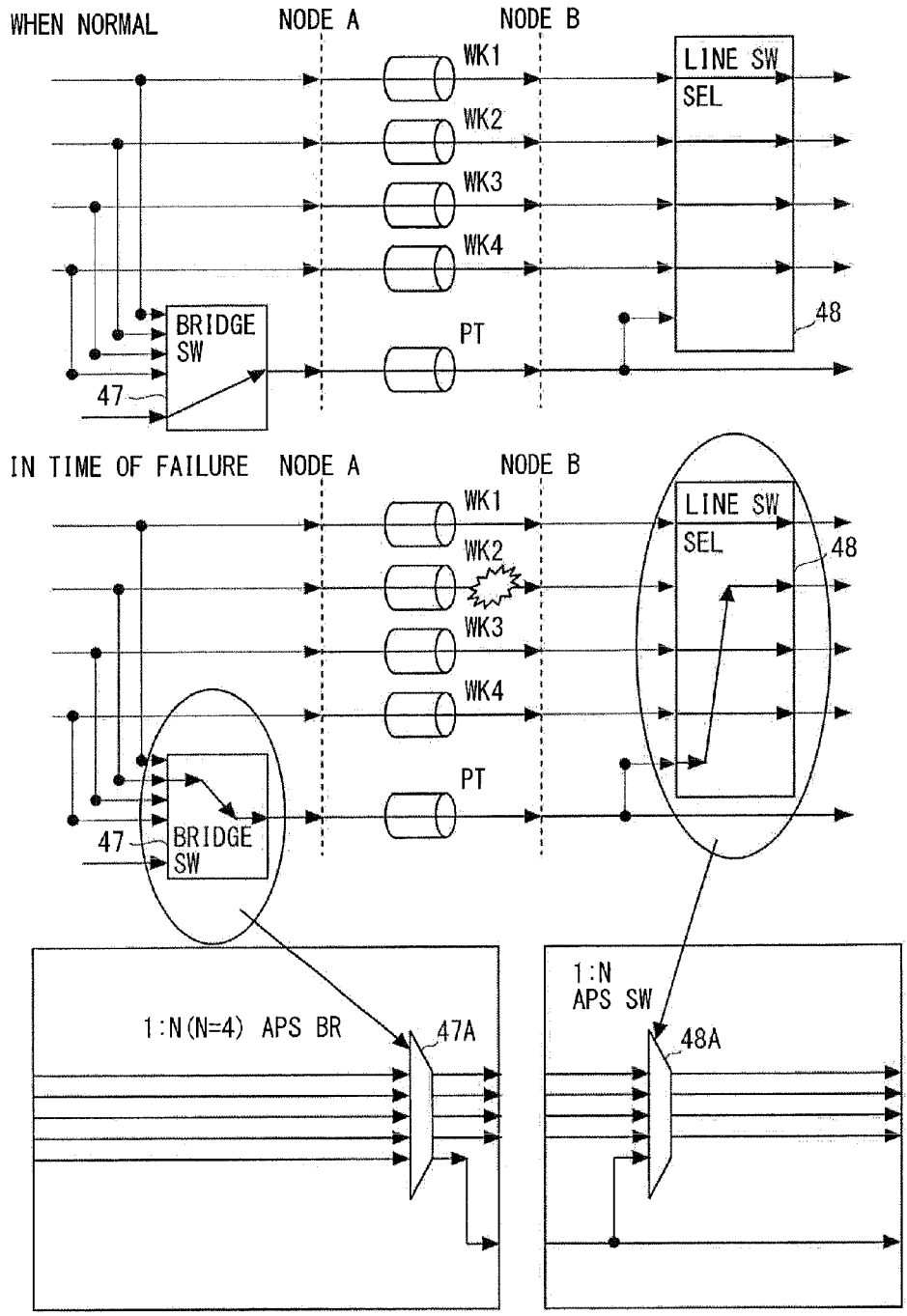
FIG. 30 illustrates a 1:N linear automatic protection switching (1:N APS LINE SW) configuration example.

FIG. 30 illustrates a configuration example of 1:N linear automatic protection switching (1:N APS line SW). A 1:N line switch configuration is a line switch configuration in which the ratio of PT lines and WK lines is 1:N. In the 1:N (N=4) line switch configuration of FIG. 30, WK lines WK1 to WK4 and a PT line are provided between the node A and the node B, the node A includes a bridge switch 47, and the node B includes a line switch selector 48.

When the WK lines WK1 to WK4 are normal, the bridge switch 47 of the node A selects the PT line side and signals of the side of the WK lines WK1 to WK4 reach the node B only through the WK lines WK1 to WK4 (the signals do not enter the PT line). In the node B, the line switch selector 48 selects and outputs signals from the WK lines WK1 to WK4.

When a failure occurs along one of the WK lines (WK2 in FIG. 30), on the other hand, the bridge switch 43 performs switching operation to output a signal to be delivered to the WK line WK2 to the PT line. This causes the signal to be transmitted from the node A to the node B through the PT line. In the node B, the line switch selector 48 makes a switch to select the signal of the PT line instead of the WK line WK2, and outputs the signal from the PT line.

The bridge switch 47 described above is incorporated as a bridge switch 47A in an output-side line protection block in the VSSC unit 133 (106) of FIG. 9. The line switch selector 48 is incorporated as a line switch selector 48A in the input-side line protection block in the VSSC unit 133 (106).

The VSSC unit 133 of an INF unit that has an output port for the WK lines can thus figure out, through pseudo-logical calculus, operation of the bridge switch 47A suited to the failure in any one of the WK lines W1 to W4. Also, the VSSC unit 133 of an INF unit that has input ports for the WK lines W1 to W4 and the PT line can figure out, through pseudo-logical calculus, operation of the line switch selector 48A suited to the failure in the any one of the WK lines W1 to W4. An INF unit (SONET device) according to this embodiment accomplishes 1:N APS line SW in this manner.

1+N input ports can be selected arbitrarily from all INF units as input ports to which this 1:N line switching is applied.

Application Example 6

Figure 31:
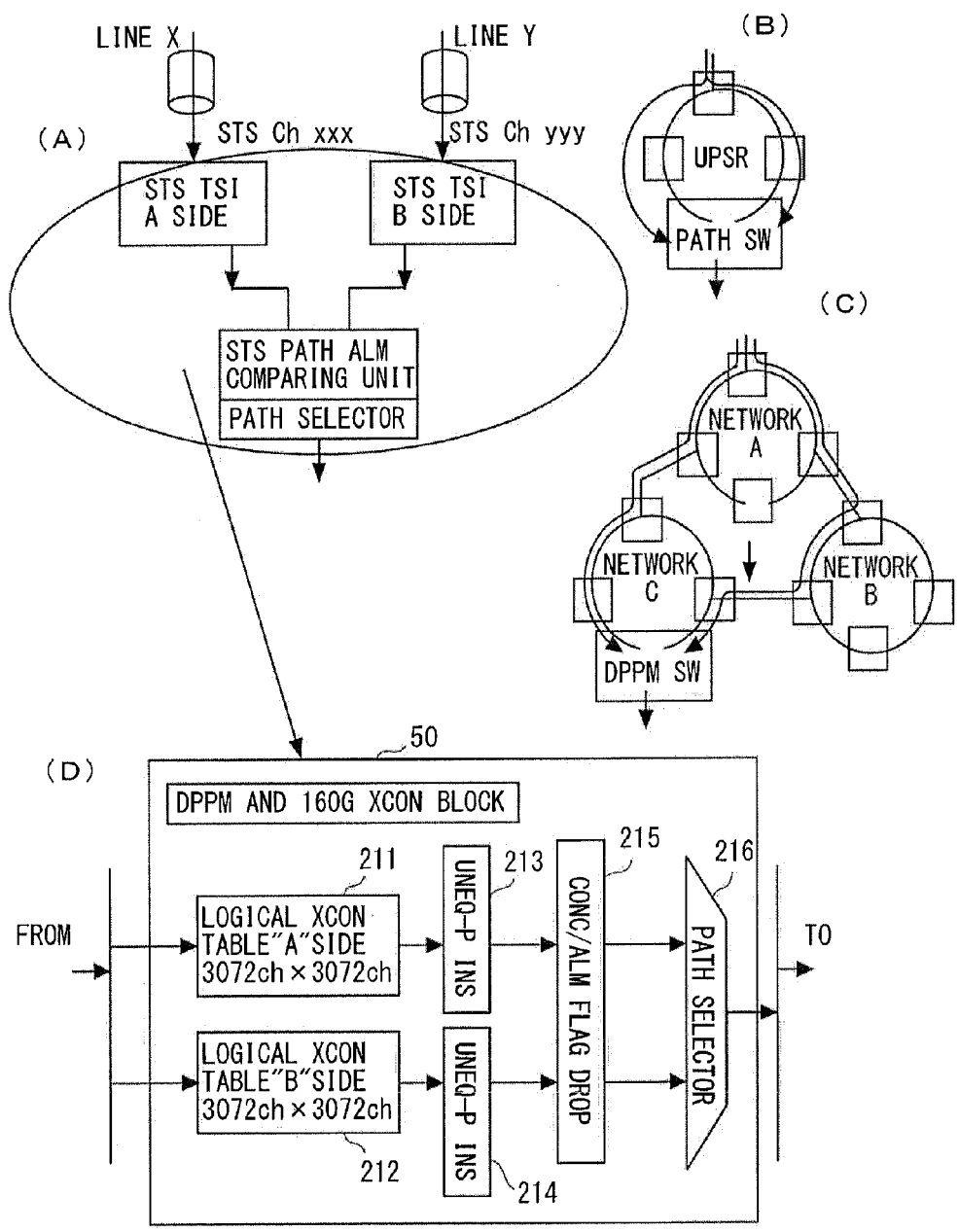
FIG. 31 illustrate UPSR/DPPM switch configurations.

FIG. 31 illustrate UPSR and DPPM SW configurations. FIG. 31(A) illustrates the principle of UPSR/DPPM. In the case where a signal on a line X that has an STS channel number "xxx" (STS signal "xxx") and a signal on a line Y that has an STS channel number "yyy" (STS signal "yyy") are the same signal, the STS signal "xxx" is cross-connected on an STS TSI (cross-connect) A side whereas the STS signal "yyy" is cross-connected on an STS TSI (cross-connect) B side.

The STS signal "xxx" and the STS signal "yyy" are thereafter input to an STS path alarm comparing unit. In the case where neither of the STS signals contains a path alarm at this point, a given STS signal (for example, "xxx") is chosen and output from a path selector (path switch). In the case where one of the STS signals contains a path alarm, the STS signal that contains no path alarm is chosen and output from the path selector. When it is the STS signal "xxx" that contains a path alarm, for example, the output from the path selector is switched from the STS signal "xxx" to the STS signal "yyy".

In the case where the channel number "xxx" and the channel number "yyy" are the same number as illustrated in FIG. 31(B), path protection control as the one illustrated in FIG. 31(A) is usually called UPSR. In UPSR, a path switch is provided in a reception node that receives two STS signals having the same channel number and traveling different routes in a ring network, and one of the two STS signals (paths) is chosen and output by the path switch.

FIG. 31(C) illustrates another mode of path protection operation in which two STS signals having different channel numbers and traveling different networks arrive at a reception node of one network, and a path switch (DPPM switch) provided in the reception node chooses and outputs one of the two STS signals (paths). This is called DPPM.

FIG. 31(D) illustrates a logic circuit block 50 incorporated in the VSSC unit 133 (106) in order to implement UPSR/DPPM. The logic circuit block 50 performs pseudo-logical calculus similar to the one performed by the path switch and cross-connection unit 204 of FIG. 9.

With this logic circuit block 50 incorporated in the VSSC unit within an INF unit of a SONET transmission apparatus that corresponds to the reception node of FIG. 31(B) or FIG. 31(C), TSI control data that reflects a result of path switching by UPSR/DPPM is obtained and UPSR/DPPM is accomplished.

Two arbitrary STS signals received by all INF units and given redundancy can be selected as STS signals to which UPSR/DPPM is applied.

Application Example 7

Figure 32:
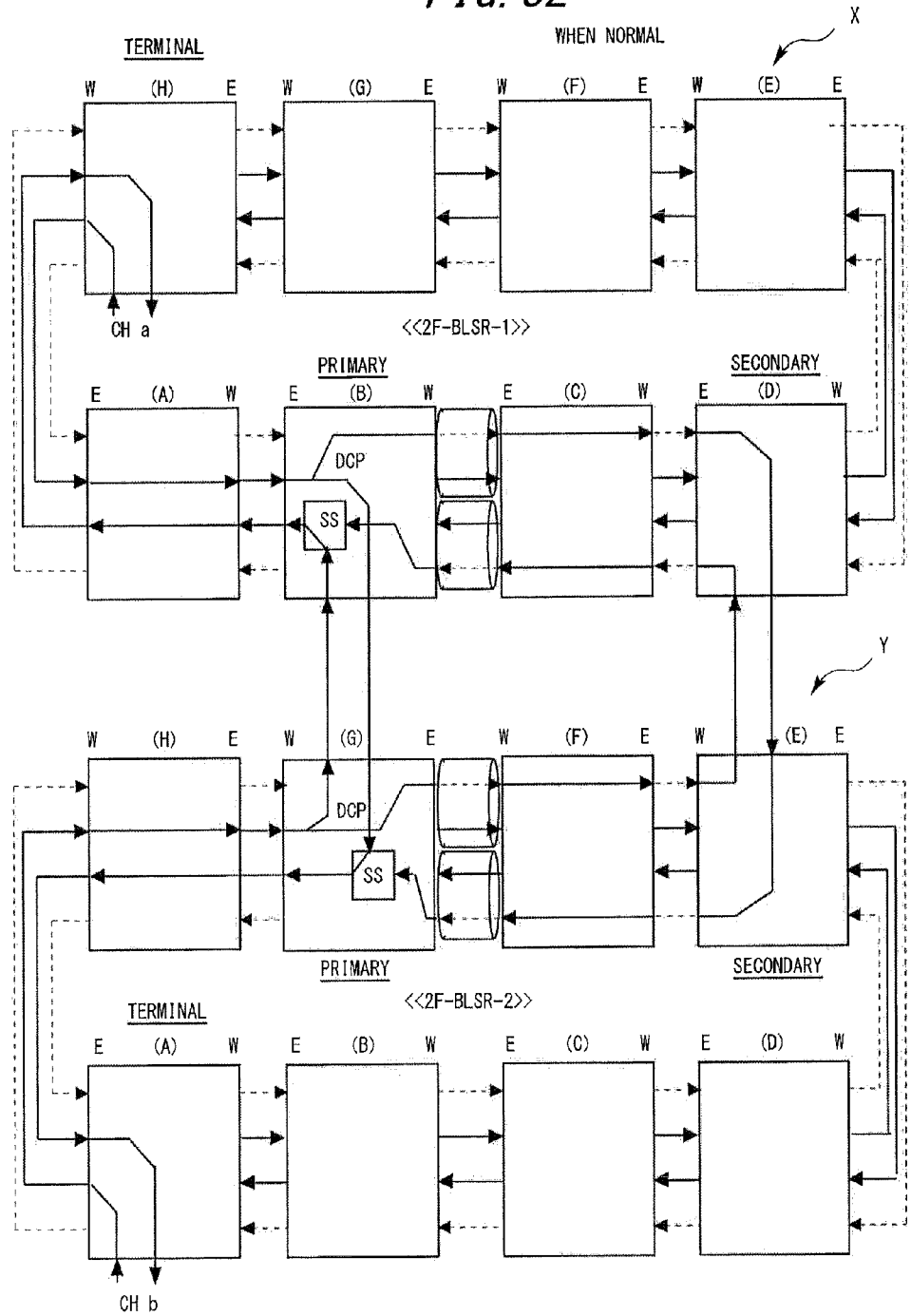
FIG. 32 is an explanatory diagram of 2F-BLSR RIP processing.
Figure 33:
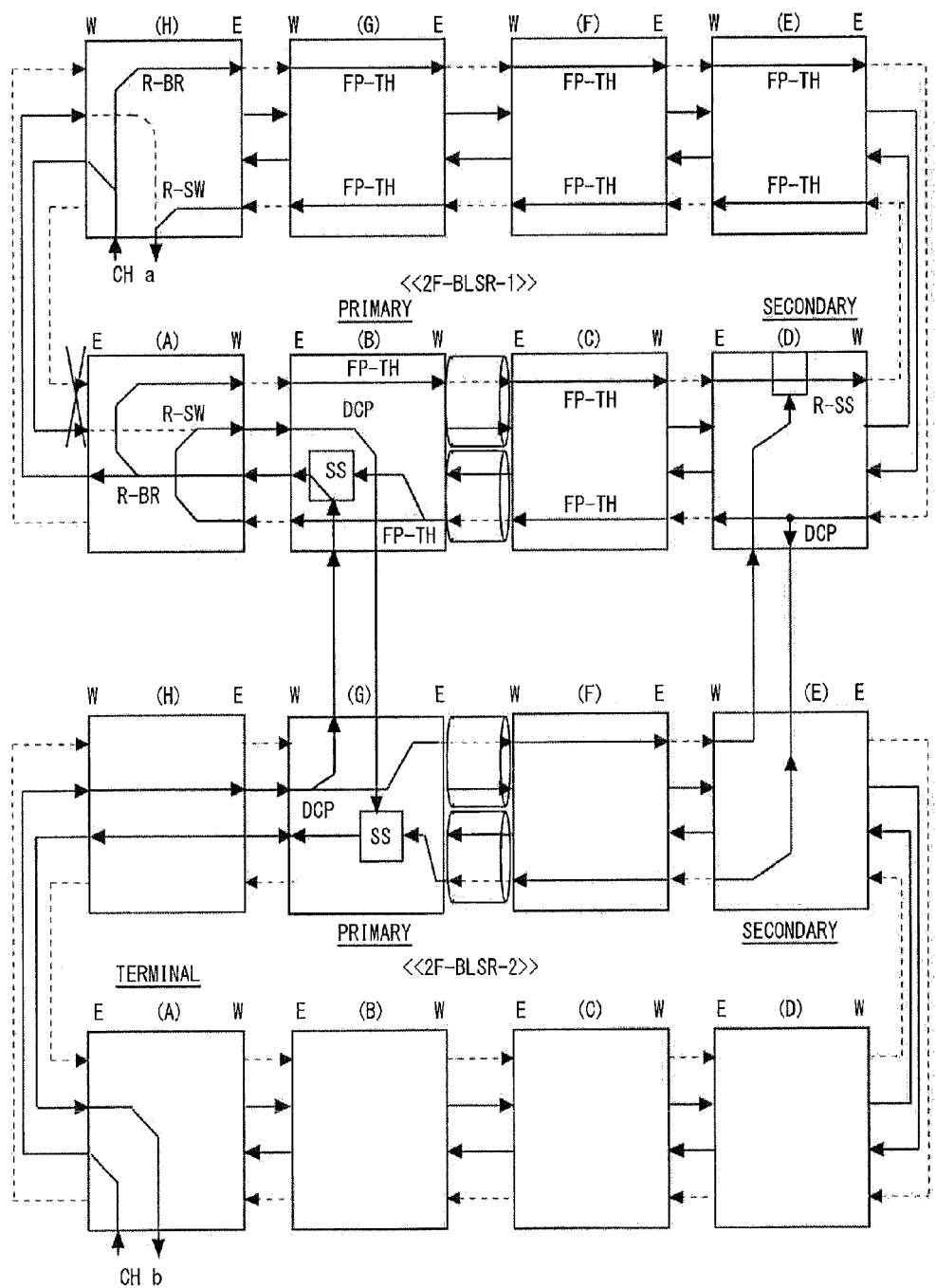
FIG. 33 is an explanatory diagram of 2F-BLSR RIP processing.

FIG. 32 and FIG. 33 are explanatory diagrams of RIP processing for 2F-BLSR. RIP is a technology for protecting a channel across two different ring networks. In FIG. 32, 2F-BLSR is applied to a ring network X and a ring network Y, and a signal input (added) from a channel "a" of a node H (called a terminal) in the ring network X reaches a node B through a node A to be transmitted from the node B to a node G in the ring network Y. The node G has a switch called a regular service selector (SS), and the SS connects the signal from the node B to a WK line. The signal thereafter reaches a node A through a node H to be dropped.

A signal input (added) from a channel "b" of the node A (terminal) in the ring network Y travels in a direction opposite from the signal transmission path of the channel "a", and is transmitted from the node G of the ring network Y to the node B of the ring network X. The node B, too, includes an SS and the SS connects the signal of the channel "b" to a WK line. Thereafter, the signal of the channel "b" reaches the node H through the node A to be dropped. This is the normal state. The nodes that include SSs (node B and node G) are called primary nodes.

When an optical fiber connecting the node H and node A of the ring network X is broken as illustrated in FIG. 33, the node H of the ring network X uses a ring bridge to output a signal of the channel "a" to the PT line side and send the signal to a route "node G→F→E→D→C→B→A." A ring switch in the node A then sends the signal back to the WK line (W), so that the signal returns to the route taken before the failure and reaches the node A through the node B, the node G, and the node H. The channel "a" is protected in this manner.

A signal of the channel "b" is sent back to the PT line (W) by a ring bridge of the node A in the ring network X, and reaches the node D through the node B and the node C. A relief service selector (R-SS) of the node D then makes a switch so that the signal travels along the WK line, reaches the node H through the nodes E, F, and G, and is dropped by a ring switch of the node H. The channel "b" is protected in this manner. The node D is called a secondary node.

Figure 34:
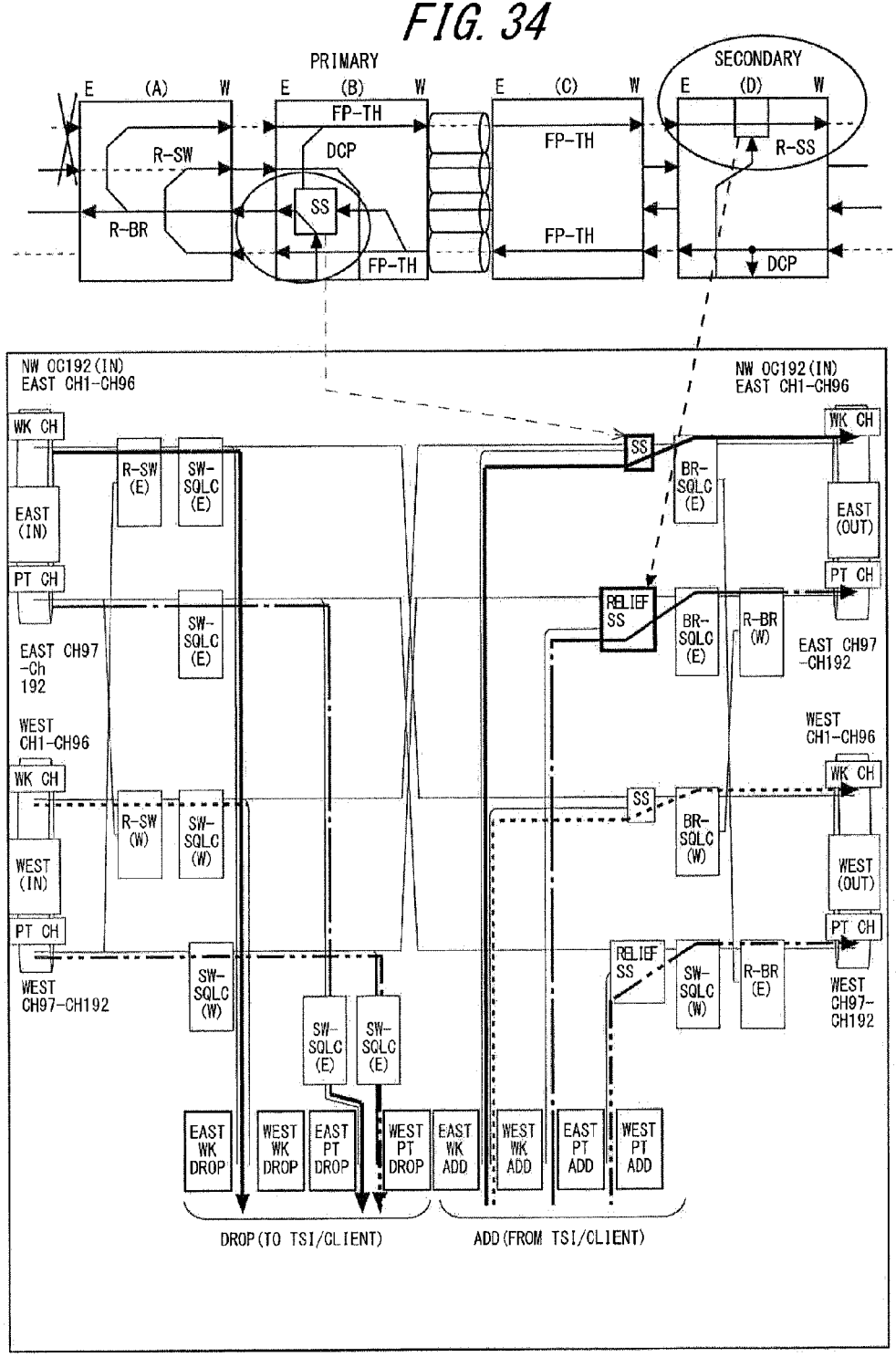
FIG. 34 illustrates an example of a function block that has an SS and R-SS illustrated in FIG. 33 and implements 2F-BLSR RIP operation.

FIG. 34 illustrates an example of a function block that has the SS in the node B (primary) of the ring network X illustrated in FIG. 33 as well as the R-SS in the node D (secondary) of the ring network X, and that implements 2F-BLSR RIP operation. Incorporating an SS and an R-SS as those in a VSSC logic circuit enables the VSSC to figure out 2F-BLSR RIP operation through pseudo-logical calculus, and TSI control data reflecting its result is obtained. By adding a logical switch circuit block as the one illustrated in FIG. 34 to a VSSC, RIP operation laid down by GR-1230 is accomplished.

Application Example 8

Figure 35:
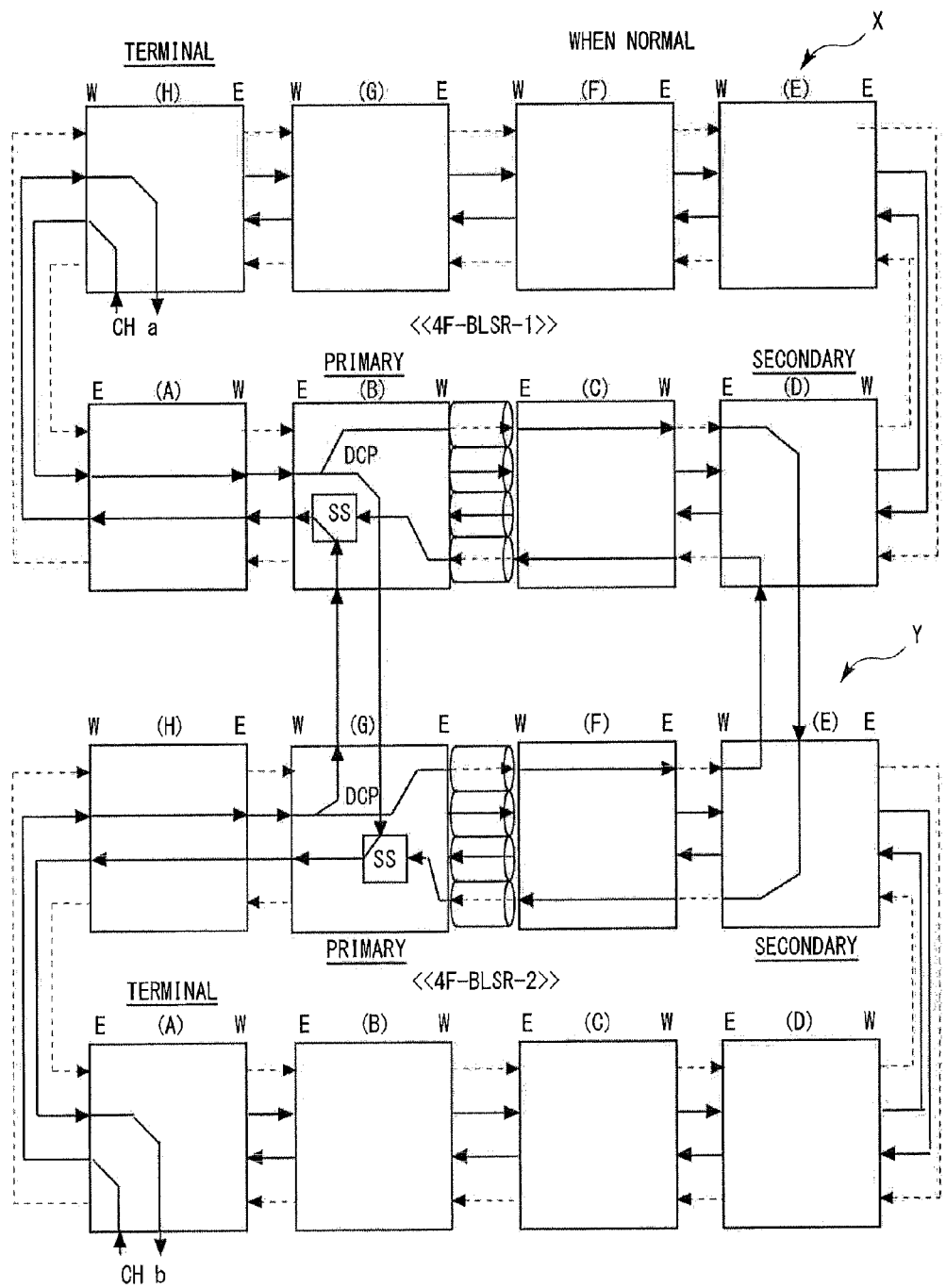
FIG. 35 illustrates a configuration example of a network in which the network is in a normal state and 4F-BLSR RIP operation is executed.
Figure 36:
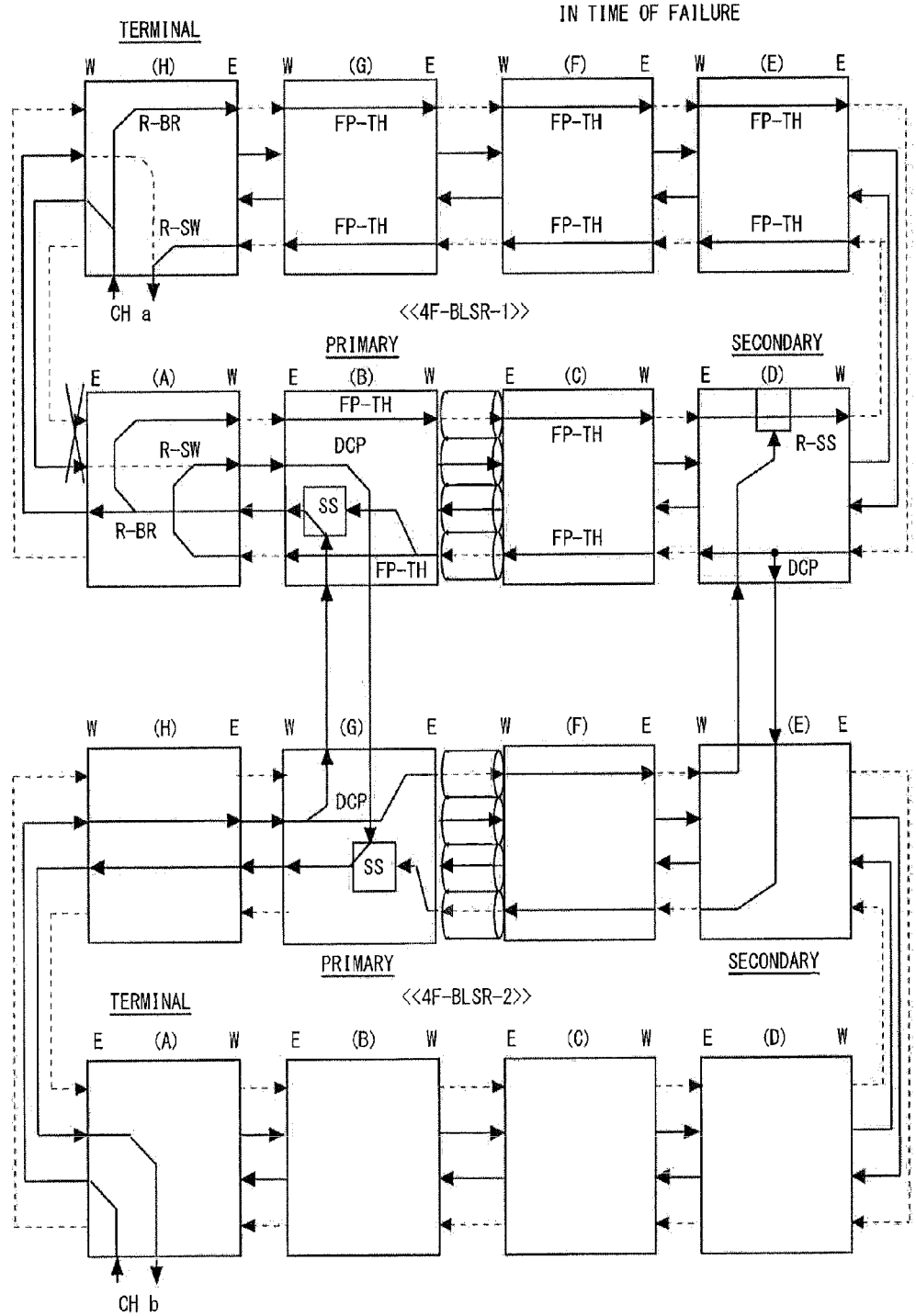
FIG. 36 illustrates how recovery is executed through RIP operation in the network illustrated in FIG. 35.
Figure 37:
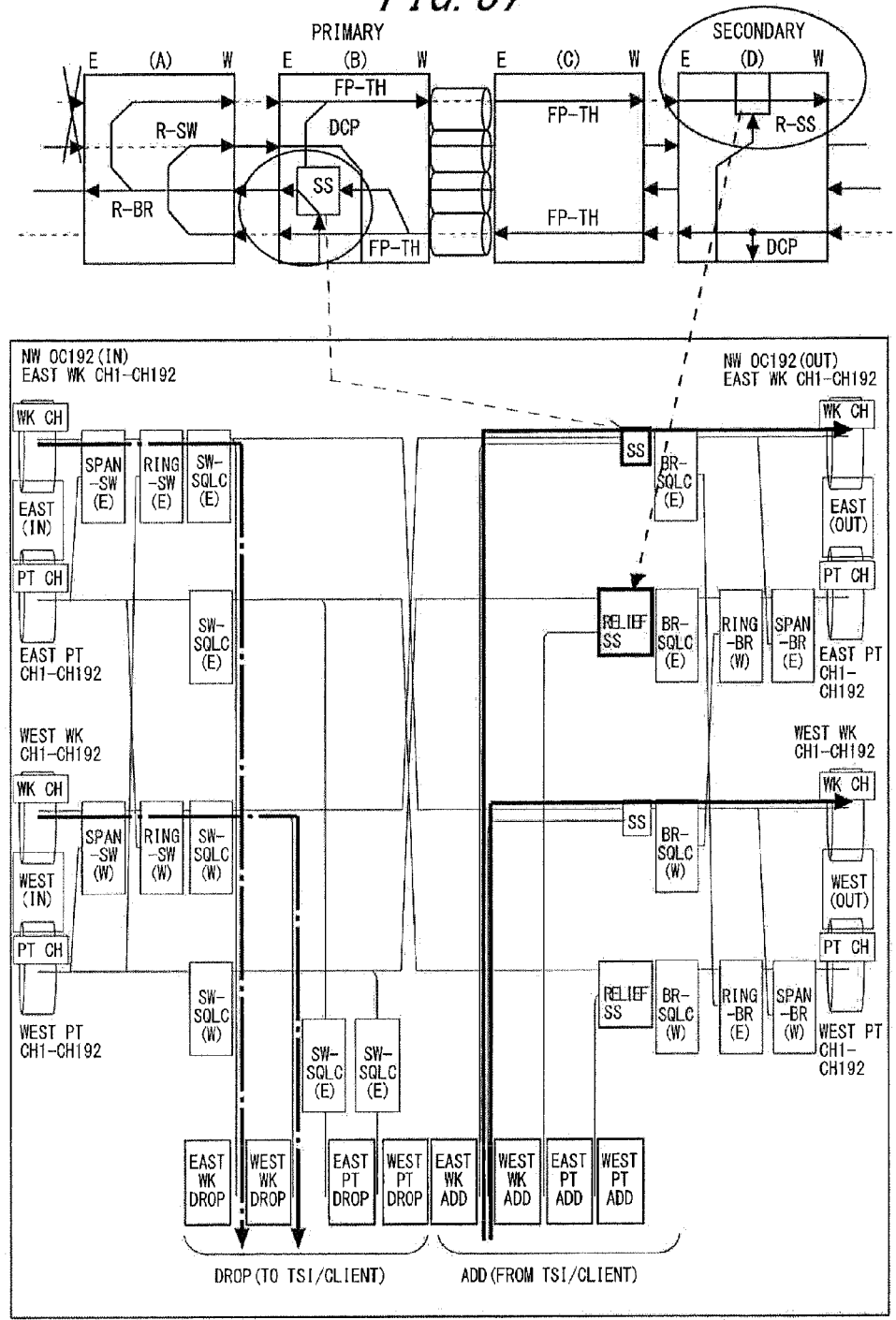
FIG. 37 illustrates an example of a function block that has an SS and R-SS illustrated in FIG. 35 and implements 4F-BLSR RIP operation.

FIG. 35 illustrates a configuration example of a network in which the network is in a normal state and 4F-BLSR RIP operation is executed. FIG. 36 illustrates how recovery is executed through RIP operation in the network illustrated in FIG. 35. The recovery operation is substantially the same as in the case of 2F-BLSR. In 4F-BLSR, too, a recovery is made through the operation of an SS and an R-SS. FIG. 37 illustrates an example of a block configuration for implementing 4F-BLSR RIP. Incorporating an SS and an R-SS as those in a VSSC logic circuit enables the VSSC to figure out 4F-BLSR RIP operation through pseudo-logical calculus, and TSI control data reflecting its result is obtained. By adding a logical switch circuit block as the one illustrated in FIG. 37 to a VSSC, RIP operation laid down by GR-1230 is accomplished.

Application Example 9

Figure 38:
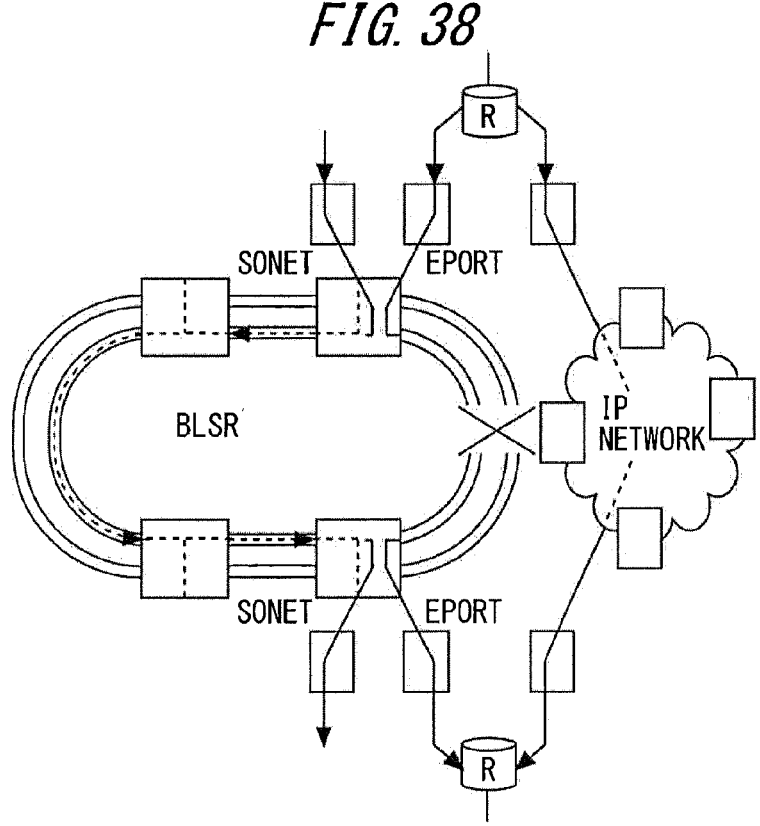
FIG. 38 is an explanatory diagram of NUT.
Figure 39:
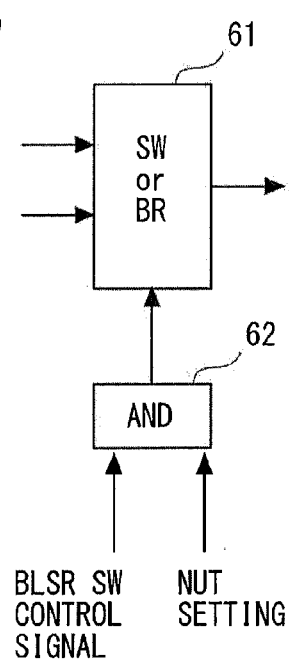
FIG. 39 is a diagram illustrating an example of a logic circuit for implementing a NUT function.

FIG. 38 is an explanatory diagram of a NUT (Non-preemptible Unprotected Traffic) function, and FIG. 39 illustrates an example of a logic circuit configuration for implementing the NUT function.

NUT means "traffic that does not have a protection band but has no fear of being 'preempted' at the time of a failure." An ordinary protection channel (PT line) allows a signal of the active system (work signal) to travel when a failure occurs, and is therefore occupied by the work signal. A channel to which NUT settings are set (NUT channel), on the other hand, is not occupied as a path for the work signal when a failure occurs. A NUT channel has no discrimination between a WK line and a PT line, and can be set in any band of the redundancy configuration.

NUT is used mainly in networks where BLSR is employed. In the example of FIG. 38, traffic that connects routers R partially runs through a ring network that employs BLSR. NUT settings are set to a channel along a ring for the inter-router traffic. This way, when a failure occurs in the channel, protection switch operation for the channel is not executed along the ring. Communication between the routers can therefore be continued when a channel fault occurs by switching to a redundant path that uses an IP network.

A logic circuit configuration for setting NUT settings as this is illustrated in FIG. 39. A block 61 illustrated in FIG. 39 is a bridge or switch for BLSR, and switches the output of an input signal based on a BLSR switching control signal.

In the case where NUT settings are not set, a configuration in which a BLSR switching control signal is input directly to the block 61 is employed. Then an AND circuit 62 is connected to an end of the block 61 from which the control signal is input.

The BLSR switching control signal (switching instruction) is input to one input end of the AND circuit 62. NUT settings (no settings: 1, settings found: 0) are set to the other input end of the AND circuit 62. When a signal with NUT settings is input to the AND circuit 62, a switching instruction "1" may be input but not delivered to the block 61. In short, the switching instruction is invalidated. With a logic circuit as this incorporated in a VSSC logic circuit, NUT is accomplished.

[Effects of the Embodiment]

According to this embodiment, by providing a VSSC circuit with a 1+1 APS line switch logic circuit, 1+1 APS line switching is implemented with two ports arbitrarily selected from all interface ports (INF ports (for example, OC3, OC12, OC48, OC192, and OC768)) that are housed in a SONET transmission apparatus.

According to this embodiment, by providing a VSSC circuit with a 1+N APS line switch logic circuit, 1:N APS line switching is implemented with 1+N ports (N is a positive integer) arbitrarily selected from all interface ports (INF ports (for example, OC3, OC12, OC48, OC192, and OC768)) that are housed in the SONET transmission apparatus.

According to this embodiment, by providing a VSSC circuit with a path switch logic circuit, Dedicated Path Protection Mesh (DPPM) and UPSR functions are implemented with two signals selected from all interface port STSs (INF port STSs) that are housed in the SONET transmission apparatus.

According to this embodiment, by providing a VSSC circuit with a 2F-BLSR logic circuit, 2F-BLSR is implemented with two ports arbitrarily selected from all interface ports (INF ports (for example, OC48, OC192, and OC768)) that are housed in the SONET transmission apparatus.

According to this embodiment, by providing a VSSC circuit with a 4F-BLSR logic circuit, 4F-BLSR is implemented with four ports arbitrarily selected from all interface ports (INF ports (for example, OC48, OC192, and OC768)) that are housed in the SONET transmission apparatus.

According to this embodiment, by adding a NUT logic circuit to the 2F-BLSR logic circuit or 4F-BLSR logic circuit described above, a NUT function can be added to the 2F-BLSR or 4F-BLSR logic circuit.

If the above-mentioned VSSC logic circuits are provided in one shared VSSC circuit, various protection switch functions described above (1+1, 1:N, DPPM, UPSR, BLSR (2F, 4F, NUT)) can be combined freely to be provided to an arbitrary interface port.

The employed TSI scale of the SONET transmission apparatus illustrated in this embodiment is not limited to the basic capacity (160 Gbps). This embodiment is made applicable to a SONET transmission apparatus whose TSI scale is 320 G or 640 G by using a different TSI device, changing the VSSC FPGA logic circuit, and increasing the number of mesh wiring lines.

On the other hand, a very small-sized, high-performance device can be provided by implementing the employed TSI scale at the basic capacity (160 G) or less (for example, 80 G, 40 G, or 20 G). In a small-capacity device configuration as this, a VT-based TSI function is provided instead of controlling on an STS basis, so that a VT-based protection switch function is implemented by exactly the same method as the one used for STS-based control.

Using APS CPU firmware that is installed in INF units to execute APS protocol processing of the SONET transmission apparatus shifts the processing load on a CPU unit (mounted in the SONET transmission apparatus), which communicates information from the OPS (OPeration System: device control system), to all INF units constituting a shelf. The processing load on the CPU unit is thus lessened.

The plurality of functions of the SONET transmission apparatus described above can be provided irrespective of the number of INF ports housed in an INF unit. Accordingly, protection switch functions can be provided in a multi-port unit (when the number of lines accommodated increases).

The plurality of functions of the SONET transmission apparatus described above are also applicable to SDH in addition to SONET by the same method. The only differences are that, in SDH, STM-1, STM-4, STM-16, and STM-64 correspond to line switching and that STS TSI is called AU3 or AU4. It only needs to adapt APS protocol specifications to SDH (ITU-T) specifications.

According to this embodiment, the following effects are obtained:

(1) Functions of the SONET transmission apparatus are dispersed among the plurality of interface units (INF units), with the result that an indispensable unit heavy in processing load such as an STS-SW unit is eliminated.

This way, the number of units necessary to build a minimum model of the SONET transmission apparatus is reduced and the number of indispensable units (indispensable units are often expensive) necessary to build the minimum model is also kept small.

(2) The major trend has been to base the development of a device on the conventional method (the method that uses an integrated (common TSI SW) unit), because implementing a BLSR function with distributed time slot interchange (TSI) presents difficulties in terms of how to exchange and manage control information thereof (and in order to put the product on the market early). However, it is also true that recent metro ADM devices are having a hard time acquiring customers unless they have overcome the difficulties. This embodiment realizes a BLSR function with distributed TSI and, when this BLSR function is made commercially available, it is of great advantage to customers.

(3) The most significant merit of thoroughly dispersing functions of the SONET transmission apparatus among the plurality of INF units is that the number of lines accommodated and the number of combinations of protection switch functions supported increase each time an INF unit is added. This provides ideal function update concept for customers because just purchasing an additional INF unit ensures an increase in number of lines accommodated and more protection switch functions. An adverse effect on existing INF units from the addition of an INF unit is eliminated by merely updating software and firmware that are installed in the SONET transmission apparatus (no hardware changes to existing INF units are necessary).

(4) In the basic configuration illustrated in the embodiment, "40 G TSI" and protection switching (1+1, UPSR, 2F-BLSR, DPPM) are supported if the SONET transmission apparatus houses two INF units.

(5) This embodiment uses a method in which a logic circuit is put to full use. Therefore, not much is requested of parts used. This means that a great cost reduction effect is obtained by selecting functions optimum for a customer in building the device. Also, several problems that arise when a large-scale device is employed are solved. Accordingly, it is considered that great effects are yielded in terms of function, cost reduction, and convenience.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A SONET/SDH transmission apparatus, comprising:
   a plurality of interface units that accommodate a plurality of lines; and
   mesh wiring that interconnects the plurality of interface units in a mesh pattern in order to allow the plurality of interface units to distribute, to one another, signals on the plurality of lines accommodated by each of the plurality of interface units and information with respect to protection switch operation that is obtained in each of the plurality of interface units,
   wherein the plurality of interface units each include:
      a transmission unit that sends a signal and information to the mesh wiring;
      a reception unit that receives a signal and information from the mesh wiring;
      a time slot interchange unit to which signals on a plurality of lines accommodated by the own interface unit and signals on a plurality of lines accommodated by all the other interface units which are received by the reception unit via the mesh wiring are input, and which can output a signal selected from among the plurality of signals through time slot interchange processing performed on a plurality of the input signals;
      a detection unit that detects alert information with respect to the plurality of lines accommodated by the interface unit itself and alert information with respect to the plurality of lines accommodated by all the other interface units which is received by the reception unit through the mesh wiring; and
      a control unit including a logic circuit that virtually executes protection switch operation to be executed based on the alert information detected by the detection unit with respect to the plurality of lines accommodated by the own interface unit to generate control data of the time slot interchange unit which reflects the protection switch operation and is obtained through calculation by the logic circuit and supply the generated control data to the time slot interchange unit.

2. The SONET/SDH transmission apparatus according to claim 1, wherein, when alert information is detected with respect to redundancy lines which are respectively accommodated by at least two of the plurality of interface units, and protection switch operation is requested for the redundancy lines in each of the at least two interface units, the time slot interchange units in the at least two interface units concurrently execute time slot interchange processing based on control data, which reflects virtual protection switch operation for the redundancy lines.

3. The SONET/SDH transmission apparatus according to claim 1, wherein the time slot interchange unit is constituted by a generalized ASIC for time slot interchange, and the control unit is constituted by an FPGA.

4. The SONET/SDH transmission apparatus according to claim 1, wherein the transmission unit broadcasts first information and second information to all the other interface units via the mesh wiring, the first information being set statically in the own interface unit, the second information containing the alert information that is detected in the own interface unit.

5. The SONET/SDH transmission apparatus according to claim 4, wherein the first information and the second information are stored in free areas of a data frame that is used to transmit the signal through the mesh wiring so as to be transmitted through the mesh wiring.

6. The SONET/SDH transmission apparatus according to claim 1, wherein the logic circuit comprises a 1+1 APS line switching logic circuit.

7. The SONET/SDH transmission apparatus according to claim 1, wherein the logic circuit comprises a 1:N APS line switching logic circuit.

8. The SONET/SDH transmission apparatus according to claim 1, wherein the logic circuit comprises a path switch logic circuit for UPSR and/or DPPM.

9. The SONET/SDH transmission apparatus according to claim 1, wherein the logic circuit comprises a 2F-BLSR logic circuit.

10. The SONET/SDH transmission apparatus according to claim 1, wherein the logic circuit comprises a 4F-BLSR logic circuit.

11. The SONET/SDH transmission apparatus according to claim 9, wherein the logic circuit comprises a NUT logic circuit.

* * * * *